(12) United States Patent
Kim et al.

(10) Patent No.: US 11,495,803 B2
(45) Date of Patent: Nov. 8, 2022

(54) CATHODE, LITHIUM-AIR BATTERY INCLUDING THE SAME, AND METHOD OF PREPARING THE SAME

(71) Applicant: Samsung Electronics Co., Ltd., Suwon-si (KR)

(72) Inventors: Mokwon Kim, Suwon-si (KR); Jungock Park, Yongin-si (KR); Hyunpyo Lee, Seoul (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 124 days.

(21) Appl. No.: 17/156,934

(22) Filed: Jan. 25, 2021

(65) Prior Publication Data
US 2021/0242470 A1    Aug. 5, 2021

(30) Foreign Application Priority Data

Jan. 30, 2020   (KR) ........................ 10-2020-0011358

(51) Int. Cl.
| | |
|---|---|
| *H01M 4/86* | (2006.01) |
| *H01M 12/08* | (2006.01) |
| *H01M 4/88* | (2006.01) |
| *H01M 4/38* | (2006.01) |
| *H01M 4/02* | (2006.01) |

(52) U.S. Cl.
CPC ......... *H01M 4/8621* (2013.01); *H01M 4/382* (2013.01); *H01M 4/8673* (2013.01); *H01M 4/8853* (2013.01); *H01M 12/08* (2013.01); *H01M 2004/027* (2013.01); *H01M 2004/8689* (2013.01)

(58) Field of Classification Search
None
See application file for complete search history.

(56) References Cited

U.S. PATENT DOCUMENTS

| | | |
|---|---|---|
| 6,210,832 B1 | 4/2001 | Visco et al. |
| 8,243,420 B2 | 8/2012 | Kim et al. |
| 2016/0164135 A1 | 6/2016 | Fasching et al. |

FOREIGN PATENT DOCUMENTS

| | | |
|---|---|---|
| JP | 5642654 B2 | 11/2014 |
| KR | 100947892 B1 | 3/2010 |
| WO | 2016089456 A1 | 6/2016 |

*Primary Examiner* — Sarah A. Slifka
(74) *Attorney, Agent, or Firm* — Cantor Colburn LLP

(57) ABSTRACT

A cathode configured to use oxygen as a cathode active material includes: a porous electrically conductive framework substrate; and a coating layer disposed on a surface of the porous electrically conductive framework substrate, wherein the coating layer includes at least one of a lithium-containing metal oxide or a composite including a lithium-containing metal oxide, and wherein a porosity of the porous electrically conductive framework substrate is about 70 percent to about 99 percent, based on a total volume of the cathode, and an areal resistance of the porous electrically conductive framework substrate is about 0.01 milliohms per square centimeter to about 100 milliohms per square centimeter.

21 Claims, 17 Drawing Sheets

500 μm

20 μm

500 μm

20 μm

500 μm

20 μm

200 μm

100 μm

CATHODE, LITHIUM-AIR BATTERY INCLUDING THE SAME, AND METHOD OF PREPARING THE SAME

CROSS-REFERENCE TO RELATED APPLICATION

This application claims priority to and the benefit of Korean Patent Application No. 10-2020-0011358, filed on Jan. 30, 2020, in the Korean Intellectual Property Office, and all the benefits accruing therefrom under 35 U.S.C. § 119, the content of which is incorporated herein in its entirety by reference.

BACKGROUND

1. Field

The present disclosure relates to a cathode, a lithium-air battery including the cathode, and a method of preparing the cathode.

2. Description of Related Art

When lithium-air batteries use lithium metal as an anode and do not have to store a cathode active material (i.e., oxygen in the air) within the battery, the battery may have high capacity.

A lithium-air battery has a high theoretical specific energy of about 3,500 watt-hour per kilogram (Wh/kg) or more. The energy density is about ten times greater than that of a lithium-ion battery.

A cathode of a commercially available lithium-air battery includes a binder and other components. The binder and other components may easily decompose due to generation of radicals involved in electrochemical reactions during charge and discharge of the lithium-air battery.

A lithium-air battery using a cathode including a binder and other components easily deteriorates.

Also, a cathode of a commercially available lithium-air battery is differentiated and disposed separately from a current collector. Electrochemical reactions during the charge and discharge of the lithium-air battery mainly occur at the interface between the cathode and the current collector, which causes discharge products to be irregularly produced.

The irregular production of the discharge products decreases efficiency of the electrochemical reactions and easily deteriorates the lithium-air battery.

In this regard, there is a need for a cathode that provides improved chemical stability and suppresses irregular production of discharge products.

SUMMARY

Provided is a chemically stable cathode having a novel structure.

Provided is a lithium-air battery including the cathode.

Provided is a method of preparing the cathode.

Additional aspects will be set forth in part in the description which follows and, in part, will be apparent from the description.

According to an aspect, a cathode configured to use oxygen as a cathode active material includes: a porous electrically conductive framework substrate; and a coating layer disposed on a surface the porous electrically conductive framework substrate, wherein the coating layer includes at least one of a lithium-containing metal oxide or a composite comprising a lithium-containing metal oxide, wherein a porosity of the porous electrically conductive framework substrate is about 70 percent to about 99 percent, based on a total volume of the cathode, and wherein an areal resistance of the porous electrically conductive framework substrate is about 0.01 milliohms per square centimeter to about 100 milliohms per square centimeter.

According to an aspect, a lithium-air battery includes the cathode; an anode including lithium; and an electrolyte disposed between the cathode and the anode.

According to an aspect, a method of preparing a cathode includes providing a suspension including a lithium-containing metal oxide particle; and electrophoretically depositing the lithium-containing metal oxide particle on an electrically conductive porous framework substrate to prepare the cathode, wherein an areal resistance of the porous electrically conductive framework substrate is about 0.01 milliohms per square centimeter to about 100 milliohms per square centimeter.

In an aspect, a cathode configured to use oxygen as a cathode active material includes: a porous electrically conductive electrically conductive framework substrate; and a coating layer disposed on a surface of the porous electrically conductive framework substrate, wherein the coating layer comprises at least one of a perovskite compound represented by Formula 1, a spinel compound represented by Formula 2, or a spinel compound represented by Formula 3:

  Formula 1 wherein, in Formula 1,
A and G are each independently at least one of a Group 2 to Group 16 element; and
$0<x<1$, $0<y<1$, $0<(x+y)\leq1$, $0<z\leq1.5$, and $0\leq\delta\leq1.5$,

  Formula 2

  Formula 3 wherein, in Formulae 2 and 3,
each M is independently selected and is at least one of a Group 2 to Group 16 element; and
$0<x<1$, $0<y<1$, $0\leq\delta1\leq1$, $0<a<2$, $0.3<b<5$, and $0\leq\delta2\leq3$.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
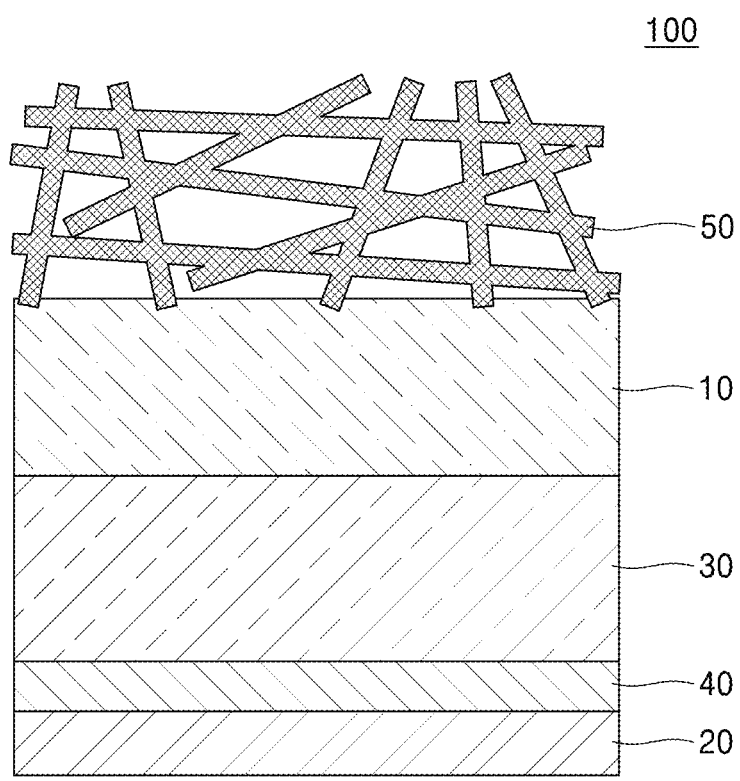
FIG. 1A is a cross-sectional schematic view of a lithium-air battery before discharge.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, as the present inventive concept allows for various changes and numerous embodiments, particular embodiments will be illustrated in the drawings and described in detail in the written description. However, this is not intended to limit the present inventive concept to particular modes of practice, and it is to be appreciated that all changes, equivalents, and substitutes that do not depart from the spirit and technical scope are encompassed in the present inventive concept.

The terms used herein are merely used to describe particular embodiments, and are not intended to limit the present inventive concept. An expression used in the singular encompasses the expression of the plural, unless it has a clearly different meaning in the context. As used herein, it is to be understood that the terms such as "including," "having," and "comprising" are intended to indicate the existence of the features, numbers, steps, actions, components, parts, ingredients, materials, or combinations thereof disclosed in the specification, and are not intended to preclude the possibility that one or more other features, numbers, steps, actions, components, parts, ingredients, materials, or combinations thereof may exist or may be added. The symbol "/" used herein may be interpreted as "and" or "or" according to the context.

In the drawings, the thicknesses of layers and regions are exaggerated or reduced for clarity. Like reference numerals in the drawings denote like elements. Throughout the specification, it will be understood that when a component, such as a layer, a film, a region, or a plate, is referred to as being "on" another component, the component may be directly on the other component or intervening components may be present thereon. In contrast, when an element is referred to as being "directly on" another element, there are no intervening elements present. Throughout the specification, while such terms as "first," "second," etc., may be used to describe various components, regions, layers, or sections, such terms must not are not limited to the above terms. The above terms are used only to distinguish one component, region, layer, or section from another. Thus, "a first element," "component," "region," "layer," or "section" discussed below could be termed a second element, component, region, layer or section without departing from the teachings herein.

The terminology used herein is for the purpose of describing particular embodiments only and is not intended to be limiting. For example, "an element" has the same meaning as "at least one element," unless the context clearly indicates otherwise. "At least one" is not to be construed as limiting "a" or "an." "or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, the term "relative density" refers to a ratio of a density calculated from a volume and a weight of an article prepared by using a material to a theoretical density of the material.

As used herein, the "size" of pores refers to an average diameter of the spherical pores and to a longitudinal length of the non-spherical pores. As used herein, the term "pores" refers to open pores. The average diameter of the pores may be measured by using, for example, a nitrogen adsorption method. Alternatively, the average diameter of the pores may be, for example, an arithmetic mean of pore sizes manually or automatically measured by software from a scanning electron microscopic (SEM) image.

As used herein, the term "size" refers to an average diameter of particles when the particles are spherical and to a longitudinal length of particles when the particles are non-spherical.

As used herein, the term "average diameter" refers to a median diameter (D50) of particles, which is defined as a particle diameter corresponding to 50% of cumulative particle diameter distribution, and this represents a particle diameter of 50% of a sample. The median diameter (D50) of particles may be measured by using a particle size analyzer (PSA).

As used herein, the term "inorganic material" refers to a material that does not include a carbon-hydrogen bond (C—H bond) or a carbon-halogen bond (C—X bond, where X is F, Cl, Br, or I) or, in other words, to any material that is not an organic material. For example, carbon fiber is an inorganic material, and a polymer binder or polymer dispersant is an organic material.

A spinel compound is a compound that is isostructural with spinel, i.e., $MgAl_2O_4$.

A perovskite compound is a compound that is isostructural with perovskite, i.e., $CaTiO_3$.

A layered compound is a compound having a layered structure, such as a compound which is isostructural with α-$NaFeO_2$, such as $LiCoO_2$.

A garnet compound is a compound of the formula $X_3Y_2(SiO_4)_3$, wherein X is a divalent cation, such as $Ca^{2+}$, $Mg^{2+}$, $Fe^{2+}$, $Mn^{2+}$, or a combination thereof, and Y is a trivalent cation, such as $Al^{3+}$, $Fe^{3+}$, $Cr^{3+}$, or a combination thereof, or a compound isostructural with a garnet compound.

A NASICON compound, as used herein, refers to a compound with the chemical formula $Na_{1+x}Zr_2Si_xP_{3-x}O_{12}$, wherein $0<x<3$, or a compound isostructural with NASICON.

A LISICON compound, as used herein, refers to a compound with the formula $Li_{2+2x}Zn_{1-x}GeO_4$, wherein $0<x<1$, or a compound isostructural with LISICON.

Tavorite is compound is a compound of the formula $LiFe(PO_4)(OH)$, or a compound isostructural with tavorite.

A triplite compound is a compound of the formula $(MnxFe_{1-x})_2(F_yOH_{1-y})$ wherein $0 \leq x < 1$ and $0 < y < 1$, or a compound isostructural with triplite.

An anti-perovskite compound is a compound that is isostructural with perovskite, i.e., $CaTiO_3$, except that the anion and cation positions are reversed, such as in $Li_3OBr$.

A silicate means a compound comprising a unit of the formula $[SiO^{4-2x})-_{(4-x)}]$, wherein $0 \leq x < 2$, or a compound isostructural with a silicate.

A borate compound means a compound comprising $BO_3$ or $Ba_4$ units, such as $Ca_3(BO_3)_2$, or a compound isostructural with a borate.

Ionic conductivity may be determined by a complex impedance method at 20° C., further details of which can be found in J.-M. Winand et al., "Measurement of Ionic Conductivity in Solid Electrolytes," Europhysics Letters, vol. 8, no. 5, p. 447-452, 1989.

A C rate means a current which will discharge a battery in one hour, e.g., a C rate for a battery having a discharge capacity of 1.6 ampere-hours would be 1.6 amperes.

Hereinafter, according to exemplary embodiments, a cathode, a lithium-air battery including the cathode, and a method of preparing the cathode will be described in further detail.

According to an embodiment, a cathode configured to use oxygen as a cathode active material includes a porous electrically conductive framework substrate having an electronic conductivity; and a coating layer disposed on a surface of the porous electrically conductive framework substrate, wherein the coating layer includes at least one of a lithium-containing metal oxide or a composite comprising a lithium-containing metal oxide. A porosity of the porous electrically conductive framework substrate is about 70 percent to about 99 percent, based on a total volume of the cathode, and an areal resistance of the porous electrically conductive framework substrate is about 0.01 milliohms per square centimeter to about 100 milliohms per square centimeter.

Figure 1B:
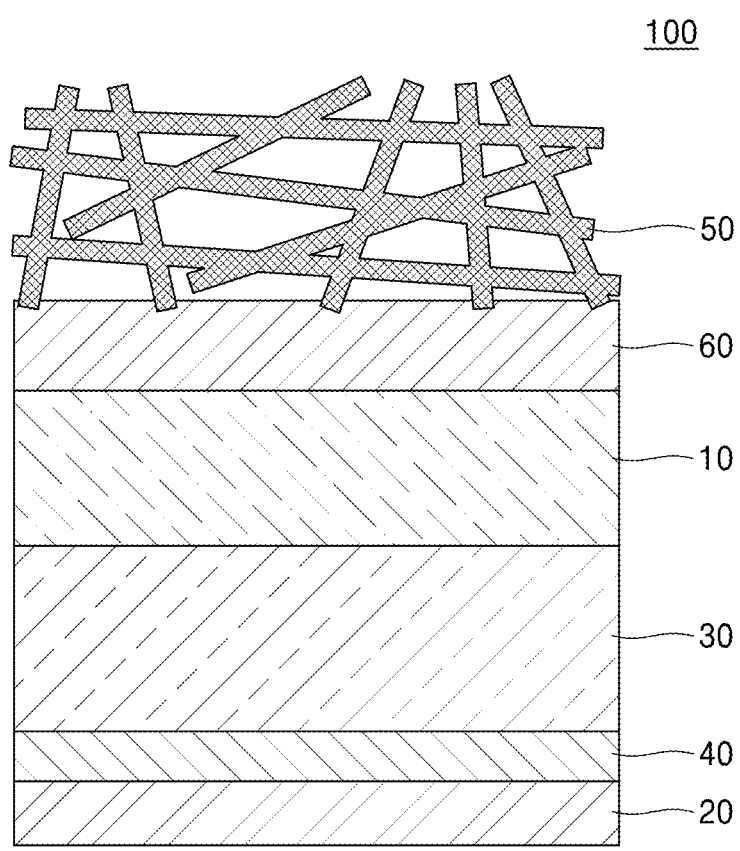
FIG. 1B is a cross-sectional schematic view of the lithium-air battery of FIG. 1A after discharge.

Referring to FIGS. 1A and 1B, a current collector/gas diffusion layer 50 is disposed on a cathode 10 in a lithium-air battery 100. A discharge product 60 is produced in the cathode 10 and between the cathode 10 and the current collector/gas diffusion layer 50 during a discharge process. An electronic conductivity of the cathode 10 and an ionic conductivity of the current collector/gas diffusion layer 50 are low, and thus electrode reactions primarily occur at an interface between the cathode 10 and the current collector/gas diffusion layer 50. In this regard, due to the discharge product 60 produced that exceeds a thickness of the cathode 10, the discharge product 60 may not be regularly produced in the cathode 10, volume change of the lithium-air battery 10 may be significant, reversibility of the electrode reactions may be decreased, and thus cycle characteristics of the lithium-air battery 100 may be deteriorated as a result.

Figure 2A:
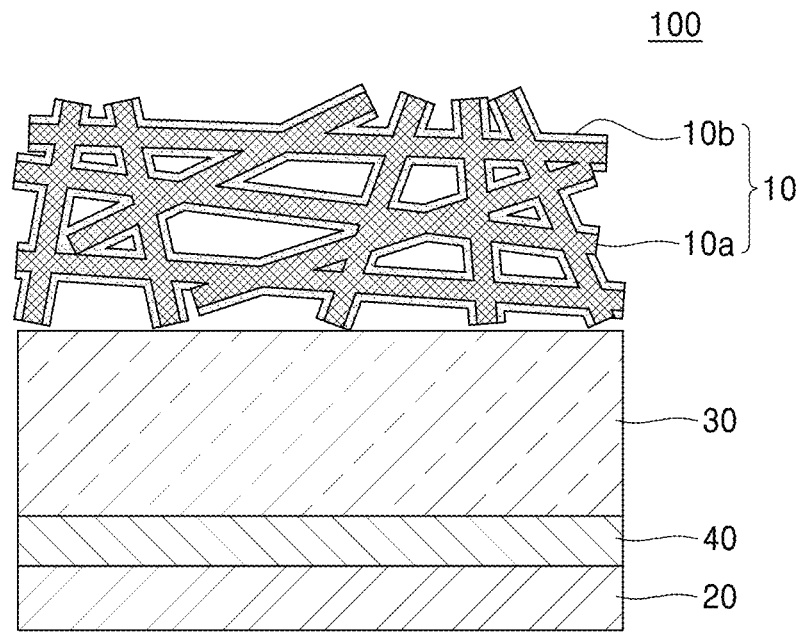
FIG. 2A is a cross-sectional schematic view of a lithium-air battery according to an embodiment before discharge.
Figure 2B:
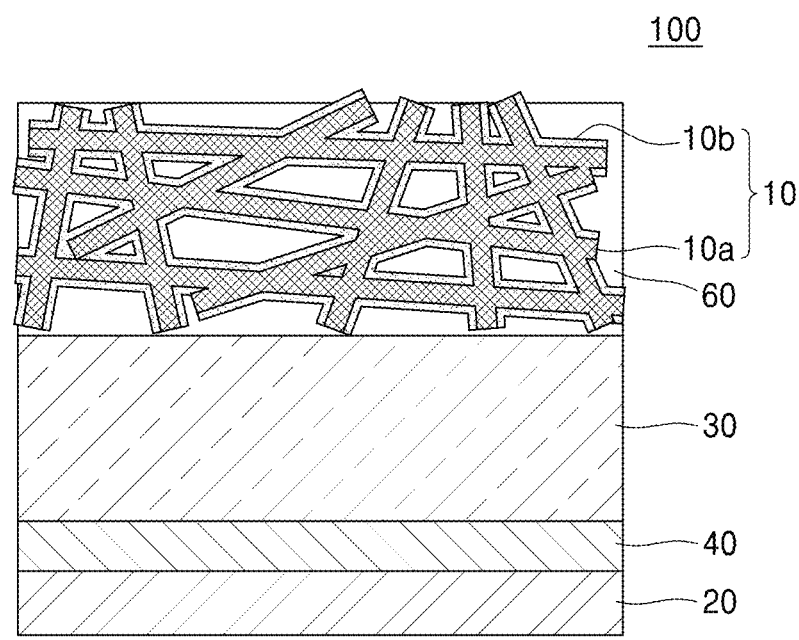
FIG. 2B is a cross-sectional schematic view of the lithium-air battery of FIG. 2A after discharge.

On the other hand, referring to FIGS. 2A and 2B, a cathode 10 according to an embodiment, includes a porous electrically conductive framework substrate 10a, and a coating layer 10b disposed along a surfaces of the porous electrically conductive framework substrate 10a, wherein the coating layer 10b includes at least one of a lithium-containing metal oxide or a composite of a lithium-containing metal oxide. The composite comprises a lithium metal oxide and at least one other compound. When the coating layer 10b including a lithium-containing metal oxide and/or a composite thereof is disposed on the porous framework substrate 10a, electrons migrating through the porous framework substrate 10a and lithium ions migrating through the coating layer 10b may more efficiently move throughout the cathode 10. Thus, when an effective reaction area where the electrons and lithium ions react with each other significantly increases, a discharge product 60 may be regularly produced in the cathode 10. Also, since the cathode 10 is porous, the discharge product 60 is primarily produced inside of the cathode 10. Therefore, volume change of the lithium-air battery 100 may be reduced, overvoltage of the lithium-air battery 100 may be suppressed as reversibility of an electrode reaction improves, and thus cycle characteristics of the lithium-air battery 100 may improve.

The lithium-containing metal oxide and/or a composite thereof in the coating layer 10b is structurally and chemically stable. Decomposition of the cathode 10 including the lithium-containing metal oxide and/or a composite thereof by radicals involved in electrochemical reactions is suppressed compared to a prior art cathode. Thus, charge/discharge characteristics of the lithium-air battery 100 including the cathode 10 may improve. The lithium-containing metal oxide may be an oxide including lithium and at least one metal other than lithium. The composite of a lithium-containing metal oxide and another compound may be, for example, a composite of lithium-containing metal oxides having different compositions or different crystal structures, a composite of a lithium-containing metal oxide and an electronic conductive metal oxide, or a composite of a lithium-containing metal oxide and an ionic conductive metal oxide. The composite of a lithium-containing metal oxide and an electron conductive metal oxide may be, for example, a composite of a lithium-containing metal oxide (LLRuO) and an electron conductive metal oxide such as $RuO_2$ or $LaRuO_3$ to increase an electronic conductivity and catalyst activity. The composite of a lithium-containing metal oxide and an electronic conductive metal oxide may be, for example, a composite of a lithium-containing metal oxide (e.g., LLRuO) and a lithium ion conductive metal oxide such as LATP, LAGP (also, referred to as NASICON), LLTO (a perovskite), or LLZO (a garnet), to increase an ionic conductivity in a cathode.

A porosity of the porous framework substrate 10a may be, for example, equal to or greater than about 70%, equal to or greater than about 75%, equal to or greater than about 80%, equal to or greater than about 85%, equal to or greater than about 90%, or equal to or greater than about 95%. A porosity of the porous framework substrate 10a may be, for example, in a range of about 70% to about 99%, about 75% to about 99%, about 80% to about 99%, about 85% to about 99%, about 90% to about 99%, or about 95% to about 99%. The porosity is a percentage of a volume occupied by pores in the total volume of the porous framework substrate 10a. When the porous framework substrate 10a has a porosity within these ranges, an energy density of a lithium-air battery including the cathode 10 may increase.

A local porosity of the porous framework substrate 10a may change, for example, according to a location in the porous framework substrate 10a. For example, the porous framework substrate 10a may include one surface and a surface facing opposite of the one surface, and a porosity of a surrounding region of the one surface may be less than or greater than a porosity of a surrounding region of the other surface. For example, a porosity of a surrounding region of the one surface of the porous framework substrate 10a may be about 70% or more, and a porosity of a surrounding region of the other surface facing opposite of the one surface may be about 70% or less. For example, a porosity of a surrounding region of the one surface of the porous framework substrate 10a may be in a range of about 70% to about 99%, and a porosity of a surrounding region of the other surface facing opposite of the one surface may be in a range of about 40% to about 70%. For example, the porous framework substrate 10a may have porosity gradient from the one surface to the other surface facing opposite of the one surface. For example, the porous framework substrate 10a may have the greatest porosity at the one surface and the least porosity at the other surface facing opposite of the one surface.

An areal resistance of the porous framework substrate 10a may be, for example, equal to or less than about 100 milliohms per square centimeter (ma cm$^2$), equal to or less than about 90 ma cm$^2$, equal to or less than about 80 ma cm$^2$, equal to or less than about 70 mΩ·cm$^2$, equal to or less than about 60 mΩ·cm$^2$, equal to or less than about 50 mΩ·cm$^2$, equal to or less than about 40 mΩ·cm$^2$, equal to or less than about 30 ma cm$^2$, equal to or less than about 20 ma cm$^2$, or equal to or less than about 10 ma cm$^2$. An areal resistance of the porous framework substrate 10a may be, for example, in a range of about 0.01 mΩ·cm$^2$ to about 100 mΩ·cm$^2$, about 0.1 mΩ·cm$^2$ to about 90 mΩ·cm$^2$, about 0.1 mΩ·cm$^2$ to about 80 mΩ·cm$^2$, about 0.1 ma cm$^2$ to about 70 mΩ·cm$^2$, about 1 ma cm$^2$ to about 60 mΩ·cm$^2$, about 1 mΩ·cm$^2$ to about 50 mΩ·cm$^2$, about 1 mΩ·cm$^2$ to about 40 mΩ·cm$^2$, about 1 mΩ·cm$^2$ to about 30 mΩ·cm$^2$, about 1 mΩ·cm$^2$ to about 20 mΩ·cm$^2$, or about 1 mΩ·cm$^2$ to about 10 mΩ·cm$^2$. The areal resistance corresponds to a through-plane resistance in a thickness direction of the porous framework substrate 10a. Therefore, the areal resistance is not relative to an area of the porous framework substrate 10a.

A thickness of the porous framework substrate 10a may be, for example, in a range of about 1 micrometer (μm) to about 500 μm, about 10 μm to about 450 μm, about 50 μm to about 450 μm, about 50 μm to about 400 μm, about 50 μm to about 350 μm, about 50 μm to about 300 μm, about 100 μm to about 300 μm, about 150 μm to about 300 μm, about 150 μm to about 250 μm, about 170 μm to about 230 μm, or about 180 μm to about 220 μm. When a thickness of the porous framework substrate 10a is too thin, a mechanical strength of the porous framework substrate 10a may become weak, and when a thickness of the porous framework substrate 10a is too thick, an energy density of the lithium-air battery 100 may deteriorate.

A size of pores in the porous framework substrate 10a may be, for example, equal to or less than about 50 μm, equal to or less than about 40 μm, equal to or less than about 30 μm, equal to or less than about 20 μm, equal to or less than about 10 μm, equal to or less than about 5 μm, equal to or less than about 1 μm, equal to or less than about 900 nm, equal to or less than about 800 nm, equal to or less than about 700 nm, equal to or less than about 600 nm, equal to or less than about 500 nm, equal to or less than about 400 nm, equal to or less than about 300 nm, or equal to or less than about 200 nm. A size of pores in the porous framework substrate 10a may be, for example, in a range of about 10 nanometers (nm) to about 50 μm, about 15 nm to about 40 μm, about 20 nm to about 30 μm, about 25 nm to about 20 μm, about 30 nm to about 10 μm, about 100 nm to about 9 μm, about 500 nm to about 8 μm, or about 1 μm to about 7 μm. When the porous framework substrate 10a includes the pores having a size within these ranges, the cathode 10 may provide a high specific surface area. In this regard, a reaction site area where an electrode reaction may occur in the cathode 10 increases, and thus high-rate characteristics of the lithium-air battery 100 including the cathode 10 may improve as a result.

The porous framework substrate 10a may include, for example, fibrous frameworks. The fibrous frameworks may be, for example, shown in FIG. 3A. An average diameter of the fibrous framework may be, for example, in a range of about 0.1 μm to about 20 μm, about 0.5 μm to about 15 μm, about 1 μm to about 12 μm, about 2 μm to about 10 μm, about 4 μm to about 9.5 μm, about 5 μm to about 9 μm, or about 6 μm to about 8 μm. When the fibrous framework has an average diameter within these ranges, cycle characteristics of a lithium-air battery may improve. The average diameter of the fibrous framework may be measured by analyzing the framework using a scanning electron microscopic (SEM) image.

The porous framework substrate 10a may include an inorganic material, for example, at least one of a carbon, a metal, or a metal oxide. The carbon may be, for example, at least one of carbon fibers or carbon tubes. The metal may be, for example, at least one of Ni, Cu, Ti, V, Cr, Mn, Fe, Co, Zn, Mo, W, Ag, Au, Ru, Pt, Ir, Al, Sn, Bi, Si, Sb, stainless steel, or an alloy thereof. The metal may be, for example, a metal inert to an electrode reaction. The metal may be, for example, stainless steel (SUS) or Ni. The metal oxide may be, for example, an oxide of a metal of at least one of Ru, Sb, Ba, Ga, Ge, Hf, In, La, Ma, Se, Si, Ta, Se, Ti, V, Y, Zn, or Zr. The metal oxide may be, for example, $RuO_2$.

The porous framework substrate 10a may be, for example, at least one of carbon paper, carbon woven fabric, carbon non-woven fabric, carbon mesh, carbon foam, metal mesh, or metal foam. The porous framework substrate 10a may be, for example, SUS mesh, Ni foam, or carbon paper.

A thickness of the coating layer 10b may be, for example, in a range of about 50 nm to about 5 μm, about 100 nm to about 4.5 μm, about 200 nm to about 4 μm, about 300 nm to about 3.5 μm, about 400 nm to about 3 μm, about 450 nm to about 2.5 μm, about 500 nm to about 2 μm, about 550 nm to about 1.5 μm, or about 600 nm to about 1 μm. When a thickness of the coating layer 10b is too thin, a mechanical strength of the coating layer 10b may be weak, and when a thickness of the coating layer 10b is too thick, a porosity of the cathode 10 may be deteriorated.

A thickness of the coating layer 10b may be, for example, about 30% or less, about 25% or less, about 20% or less, about 15% or less, about 10% or less, or about 5% or less of an average diameter of fibrous frameworks that constitute the porous framework substrate 10a. A thickness of the coating layer 10b may be, for example, about 1% to about 30%, about 1.5% to about 25%, about 2% to about 20%, about 2.5% to about 15%, about 3% to about 10%, or about 3.5% to about 5% of an average diameter of fibrous frameworks that constitute the porous framework substrate 10a.

When a thickness of the coating layer 10b is within these ranges, cycle characteristics of the lithium-air battery 100 may improve.

An average diameter of the lithium-containing metal oxide in the coating layer 10b may be, for example, in a range of about 10 nm to about 500 nm, about 50 nm to about 450 nm, about 100 nm to about 400 nm, about 150 nm to about 350 nm, about 200 nm to about 350 nm, or about 250 nm to about 350 nm.

A loading level of the coating layer 10b may be, for example, in a range of about 0.1 milligrams per square centimeter ($mg/cm^2$) to about 50 $mg/cm^2$, about 0.5 $mg/cm^2$ to about 45 $mg/cm^2$, about 1 $mg/cm^2$ to about 40 $mg/cm^2$, about 1.5 $mg/cm^2$ to about 35 $mg/cm^2$, about 2 $mg/cm^2$ to about 30 $mg/cm^2$, about 2.5 $mg/cm^2$ to about 20 $mg/cm^2$, about 3 $mg/cm^2$ to about 15 $mg/cm^2$, about 3.5 $mg/cm^2$ to about 10 $mg/cm^2$, about 4 $mg/cm^2$ to about 8 $mg/cm^2$, about 4.5 $mg/cm^2$ to about 7 $mg/cm^2$, or about 5 $mg/cm^2$ to about 7 $mg/cm^2$. When the coating layer 10b has a loading level in these ranges, an energy density of the lithium-air battery 100 may increase. The loading level is a weight of the lithium-containing metal oxide disposed in a unit area of the cathode 10.

A porosity of the cathode 10 may be, for example, equal to or greater than about 70%, equal to or greater than about 75%, equal to or greater than about 80%, equal to or greater than about 85%, equal to or greater than about 90%, or equal to or greater than about 95%. A porosity of the porous framework substrate 10a may be, for example, in a range of about 70% to about 99%, about 75% to about 98%, about 80% to about 97%, about 85% to about 96%, about 90% to about 95%, or about 91% to about 94%. The porosity is a percentage of a volume occupied by pores in the total volume of the cathode 10. When the cathode 10 has porosity in these ranges, an energy density of the lithium-air battery 100 including the cathode 10 may increase.

A size of the pores in the cathode 10 may be, for example, in a range of about 50 μm or less, about 40 μm or less, about 30 μm or less, about 20 μm or less, about 10 μm or less, about 5 μm or less, about 1 μm or less, about 900 nm or less, about 800 nm or less, about 700 nm or less, about 600 nm or less, about 500 nm or less, about 400 nm or less, about 300 nm or less, or about 200 nm or less. A size of the pores in the cathode 10 may be, for example, in a range of about 10 nm to about 50 μm, about 11 nm to about 40 μm, about 12 nm to about 30 μm, about 13 nm to about 20 μm, about 14 nm to about 10 μm, about 100 nm to about 9 μm, about 500 nm to about 8 μm, or about 1 μm to about 7 μm. When the cathode 10 includes the pores having a size within these ranges, a specific surface area of the cathode 10 may be large. Thus, as a reaction site area where an electrode reaction occurs increases in the cathode 10, high-rate characteristics of the lithium-air battery 100 including the cathode 10 may improve.

The pores in the cathode 10 may be, for example, irregularly or non-periodically disposed in the cathode 10. Thus, the cathode 10 including the irregular or non-periodic pores is different from a commercially available porous layer formed of an inorganic material including pores in a periodic and ordered manner as prepared by using an anodic oxidation method. The pores in the cathode 10 may be, for example, open pores.

The cathode 10 including the porous framework substrate 10a and the coating layer 10b may be, for example, substantially an inorganic film. The cathode 10 may include, for example, a substrate formed of carbon or metal and a lithium-containing metal oxide. In one embodiment, the cathode 10 may be a film that includes the porous framework substrate 10a and the coating layer 10b but does not include an organic material such as a binder. The cathode 10 may be, for example, a film that does not include an organic component such as an organic binder used for binding the components of the cathode 10. As used herein, the term "inorganic film" refers to a porous film substantially formed of an inorganic material that does not include an added organic material. The porous inorganic film may include an organic component and a residue or variant thereof such as dispersant used during a preparation of the porous inorganic film. An amount of the organic component or a residue or variant thereof contained in the porous inorganic film may be about 1 weight percent (wt %) or less, about 0.5 wt % or less, about 0.1 wt % or less, about 0.05 wt % or less, about 0.01 wt % or less, or about 0.001 wt % or less, based on the total weight of the porous inorganic film. The amount of the organic component or a residue or variant thereof contained in the porous inorganic film may be, for example, greater than 0 wt % to about 1 wt %, about 0.0001 wt % to about 0.9 wt %, about 0.001 wt % to about 0.85 wt %, about 0.01 wt % to about 0.8 wt %, about 0.05 wt % to about 0.75 wt %, about 0.1 wt % to about 0.7 wt %, or about 0.5 wt % to about 0.65 wt %, based on the total weight of the porous inorganic film. In an embodiment, a weight change of the inorganic film caused by evaporation and/or decomposition of the organic component during thermogravimetric analysis (TGA) from 25° C. to 900° C. may be about 1 wt % or less, about 0.5 wt % or less, about 0.1 wt % or less, about 0.05 wt % or less, or about 0.01 wt % or less of an initial weight. The cathode 10 may be, for example, a self-standing film. Therefore, handling and transporting the cathode 10 may be improved, and the cathode 10 may be easily used in a lithium-air battery of various forms. As used herein, the term "self-standing film" refers to a film that maintains a shape of a film without a supporting layer.

The shape of the cathode 10 is not limited. The cathode 10 may have a shape of a cathode 10 that is used in commercially available lithium-air batteries 100. The cathode 10 may have, for example, a 2-dimensional structure such as a sheet or a 3-dimensional structure such as a tube shape.

The lithium-containing metal oxide that forms the coating layer 10b may be, for example, a crystalline lithium ionic conductor. When the lithium-containing metal oxide includes lithium and has crystallinity, migration pathways for lithium ions may be provided. Therefore, the lithium-containing metal oxide may be a lithium ion conductor. When the lithium-containing metal oxide is a lithium ion conductor, the cathode 10 may not further include a separate electrolyte.

The lithium-containing metal oxide forming the coating layer 10b may be, for example, a crystalline electron conductor. When the lithium-containing metal oxide has crystallinity and electron conductivity, migration pathways for electrons may be provided. Therefore, the lithium-containing metal oxide may be an electron conductor. Since the lithium-containing metal oxide is an electron conductor, the cathode 10 may not further include a separate conducting agent.

The lithium-containing metal oxide forming the coating layer 10b may be, for example, a mixed conductor having a lithium ion conductivity and electron conductivity at the same time. At a temperature of 25° C., the mixed conductor may have, for example, an electronic conductivity of equal to or greater than about $1 \times 10^{-6}$ Siemens per centimeter (S/cm) and an ionic conductivity of equal to or greater than about $1 \times 10^{-7}$ S/cm. At a temperature of 25° C., the mixed conductor may have, for example, an electronic conductivity of about $5 \times 10^{-6}$ S/cm or more and an ionic conductivity of about $5 \times 10^{-7}$ S/cm or more. At a temperature of 25° C., the mixed conductor may have, for example, an electronic conductivity of about $1 \times 10^{-5}$ S/cm or more and an ionic conductivity of about $1 \times 10^{-6}$ S/cm or more. At a temperature of 25° C., the mixed conductor may have, for example, an electronic conductivity of about $5 \times 10^{-5}$ S/cm or more and an ionic conductivity of about $5 \times 10^{-6}$ S/cm or more. At a temperature of 25° C., the mixed conductor may have, for example, an electronic conductivity of about $1 \times 10^{-4}$ S/cm or more and an ionic conductivity of about $1 \times 10^{-5}$ S/cm or more. At a temperature of 25° C., the mixed conductor may have, for example, an electronic conductivity of about $5 \times 10^{-4}$ S/cm or more and an ionic conductivity of about $5 \times 10^{-5}$ S/cm or more. At a temperature of 25° C., the mixed conductor may have, for example, an electronic conductivity of about $1 \times 10^{-3}$ S/cm or more and an ionic conductivity of about $1 \times 10^{-4}$ S/cm or more. At a temperature of 25° C., the mixed conductor may have, for example, an electronic conductivity of about $5 \times 10^{-3}$ S/cm or more and an ionic conductivity of about $5 \times 10^{-4}$ S/cm or more. At a temperature of 25° C., the mixed conductor may have, for example, an electronic conductivity of about $1 \times 10^{-2}$ S/cm or more and an ionic conductivity of about $1 \times 10^{-3}$ S/cm or more. At a temperature of 25° C., the mixed conductor may have, for example, an electronic conductivity of about $1 \times 10^{-1}$ S/cm or more and an ionic conductivity of about $1 \times 10^{-2}$ S/cm or more. At a temperature of 25° C., the mixed conductor may have, for example, an electronic conductivity of about $1 \times 10^{-6}$ S/cm to about $1 \times 10^{1}$ S/cm, about $2 \times 10^{-6}$ S/cm to about $1 \times 10^{1}$ S/cm, about $2 \times 10^{-6}$ S/cm to about 5 S/cm, about $4 \times 10^{-6}$ S/cm to about 5 S/cm, about $4 \times 10^{-6}$ S/cm to about 1 S/cm, about $5 \times 10^{-6}$ S/cm to about 1 S/cm, about $1 \times 10^{-5}$ S/cm to about 1 S/cm, about $2 \times 10^{-5}$ S/cm to about 1 S/cm, about $4 \times 10^{-5}$ S/cm to about 1 S/cm, about $5 \times 10^{-5}$ S/cm to about 1 S/cm, about $1 \times 10^{-4}$ S/cm to about 1 S/cm, about $2 \times 10^{-4}$ S/cm to about 1 S/cm, about $2 \times 10^{-4}$ S/cm to about $5 \times 10^{-1}$ S/cm, or about $2 \times 10^{-4}$ S/cm to about $1 \times 10^{-1}$ S/cm. At a temperature of 25° C., the mixed conductor may have, for example, an ionic conductivity of about $1 \times 10^{-7}$ S/cm to about $1 \times 10^{1}$ S/cm, about $2 \times 10^{-7}$ S/cm to about $1 \times 10^{1}$ S/cm, about $2 \times 10^{-6}$ S/cm to about 5 S/cm, about $4 \times 10^{-6}$ S/cm to about 5 S/cm, about $4 \times 10^{-6}$ S/cm to about 1 S/cm, about $5 \times 10^{-6}$ S/cm to about 1 S/cm, about $1 \times 10^{-5}$ S/cm to about 1 S/cm, about $2 \times 10^{-5}$ S/cm to about 1 S/cm, about $4 \times 10^{-5}$ S/cm to about 1 S/cm, about $5 \times 10^{-5}$ S/cm to about 1 S/cm, about $1 \times 10^{-4}$ S/cm to about 1 S/cm, about $2 \times 10^{-4}$ S/cm to about 1 S/cm, about $2 \times 10^{-4}$ S/cm to about $5 \times 10^{-1}$ S/cm, or about $2 \times 10^{-4}$ S/cm to about $1 \times 10^{-1}$ S/cm. Since the lithium-containing metal oxide as a mixed conductor provides an ionic conductivity and an electronic conductivity at the same time, the cathode 10 may be prepared by disposing the coating layer 10b including the lithium-containing metal oxide on the porous framework substrate 10a without a conducting agent or an electrolyte.

The lithium-containing metal oxide may be, for example, at least one compound of a spinel compound or a perovskite compound. When the lithium-containing metal oxide includes a compound having the crystal structure, decomposition of the cathode 10 caused by radicals involved in an electrochemical reaction may be effectively suppressed.

The lithium-containing metal oxide may include, for example, a perovskite compound represented by Formula 1:

$$Li_xA_yG_zO_{3-\delta} \quad \text{Formula 1}$$

In Formula 1, A and G may be each independently at least one of a Group 2 to Group 16 element; and $0<x<1$, $0<y<1$, $0<x+y\leq 1$, $0\leq z\leq 1.5$, and $0\leq \delta \leq 1.5$. In an aspect, b is an oxygen vacancy content.

The perovskite compound may be a compound having a perovskite crystal structure or a perovskite-like crystal structure.

For example, in Formula 1, A may be at least one of H, Na, K, Rb, Cs, Ca, Sr, Ba, Y, La, Ce, Pr, Nd, Pm, Sm, Gd, Tb, Dy, Ho, or Er; G may be at least one of Ti, Pd, Pb, Fe, Ir, Co, Rh, Mn, Cr, Ru, Re, Sn, V, Ge, W, Zr, Ti, Mo, Hf, U, Nb, Th, Ta, Bi, Li, H, Na, K, Rb, Cs, Ca, Sr, Ba, Y, La, Ce, Pr, Nd, Pm, Sm, Gd, Tb, Dy, Ho, Er, Mg, Al, Si, Sc, Zn, Ga, Rb, Ag, Cd, In, Sb, Pt, Au, or Pb; and $0.2<x\leq 0.7$, $0<y\leq 0.7$, $0<x+y<1$, $0<z\leq 1.2$, and $0\leq \delta \leq 1.2$.

For example, in Formula 1, A is at least one of La, Ce, Pr, Gd, Ca, Sr, or Ba; M is at least one or Ti, Mn, Ni, Ru, Cr, Co, Ti, Ru, Ir, Fe, Pd, Pb, Rh, Sn, V, Re, Ge, W, Zr, Mo, Nb, Ta, Hf, or Bi; and $0.2<x\leq 0.5$, $0.4<y\leq 0.7$, $0<x+y<1$, $0.8<z\leq 1.2$, and $0\leq \delta \leq 1.0$.

The perovskite compound may have, for example, an $ABO_3$ phase. Vacancies and lithium (Li) ions are distributed in A sites in the perovskite structure. The perovskite compound may have a crystalline phase, and may comprise an orthorhombic phase, a cubic phase, a monoclinic phase, a triclinic phase, or a combination thereof. In an aspect, the perovskite may have an oxygen defect. Also, when a lithium concentration in the A-site is optimized, a metal (M) having an excellent lithium ion conductivity and a low oxygen vacancy generation energy are introduced to a B-site, and thus an electronic conductivity of the perovskite compound may increase.

The perovskite compound may include, for example, a $MO_6$ octahedron.

The $MO_6$ octahedron represents a structure in which six oxygens form vertices where M of Formula 1 is located in the center of the octahedron and share corners of the octahedron. Also, lanthanum (La), lithium (Li), and vacancies in a composition ratio are randomly distributed in a space formed by connecting the vertexes of the octahedron. In the perovskite compound, for example, lithium ions are conducted through an empty layer in the lanthanum (La), and electrons are conducted to a metal (M) ion layer.

The perovskite compound may have, for example, a primary peak at a diffraction angle $2\theta=32.5°\pm 2.5°$ and sub-peaks at a diffraction angle $2\theta=46.5°\pm 2.5°$ or at a diffraction angle $2\theta=57.5°\pm 2.5°$. The primary peak denotes a peak having the strongest intensity, and the sub-peaks have an intensity less than that of the primary peak.

For example, a ratio ($I_b/I_a$) of a peak intensity at a diffraction angle) $2\theta=46.5°\pm 2.5°$ ($I(46.5°\pm 2.5°=I_b$) to a peak intensity at a diffraction angle) $2\theta=32.5°\pm 2.5°$ ($I(32.5°\pm 2.5°=I_a$) in the X-ray diffraction of the perovskite compound may be about 0.1 or more or, for example, in a range of about 0.1 to about 0.9 or about 0.2 to about 0.6. For example, a ratio ($I_b/I_a$) of a peak intensity at a diffraction angle $2\theta=57.5°\pm 2.5°$ ($I(57.5°\pm 2.5°)=I_c$) to a peak intensity at a diffraction angle $2\theta=32.5°\pm 2.5°$ ($I(32.5°\pm 2.5°=I_a$) in the X-ray diffraction of the perovskite compound may be about 0.1 or more or, for example, in a range of about 0.1 to about 0.9, about 0.2 to about 0.8, or about 0.2 to about 0.4.

The perovskite compound may include, for example, at least one of
$Li_{0.34}La_{0.55}TiO_{3-\delta}$ (where $0\leq \delta \leq 1.0$), $Li_{0.34}La_{0.55}MnO_{3-\delta}$ (where $0\leq \delta \leq 1.0$), $Li_{0.34}La_{0.55}NiO_{3-\delta}$ (where $0\leq \delta \leq 1.0$), $Li_{0.34}La_{0.55}CrO_{3-\delta}$ (where $0\leq \delta \leq 1.0$), $Li_{0.34}La_{0.55}CoO_{3-\delta}$ (where $0\leq \delta \leq 1.0$), $Li_{0.34}La_{0.55}IrO_{3-\delta}$ (where $0\leq \delta \leq 1.0$), $Li_{0.34}La_{0.55}RuO_{3-\delta}$ (where $0\leq \delta \leq 1.0$), $Li_{0.34}La_{0.55}TiO_{3-\delta}$ (where $0\leq \delta \leq 1.0$), $Li_{0.34}La_{0.55}FeO_{3-\delta}$ (where $0\leq \delta \leq 1.0$), $Li_{0.34}La_{0.55}PdO_{3-\delta}$ (where $0\leq \delta \leq 1.0$), $Li_{0.34}La_{0.55}PbO_{3-\delta}$ (where $0\leq \delta \leq 1.0$), $Li_{0.34}La_{0.55}RhO_{3-\delta}$ (where $0\leq \delta \leq 1.0$), $Li_{0.34}La_{0.55}SnO_{3-\delta}$ (where $0\leq \delta \leq 1.0$), $Li_{0.34}La_{0.55}VO_{3-\delta}$ (where $0\leq \delta \leq 1.0$), $Li_{0.34}La_{0.55}ReO_{3-\delta}$ (where $0\leq \delta \leq 1.0$), $Li_{0.34}La_{0.55}GeO_{3-\delta}$ (where $0\leq \delta \leq 1.0$), $Li_{0.34}La_{0.55}WO_{3-\delta}$ (where $0\leq \delta \leq 1.0$), $Li_{0.34}La_{0.55}ZrO_{3-\delta}$ (where $0\leq \delta \leq 1.0$), $Li_{0.34}La_{0.55}MoO_{3-\delta}$ (where $0\leq \delta \leq 1.0$), $Li_{0.34}La_{0.55}NbO_{3-\delta}$ (where $0\leq \delta \leq 1.0$), $Li_{0.34}La_{0.55}TaO_{3-\delta}$ (where $0\leq \delta \leq 1.0$), $Li_{0.34}La_{0.55}HfO_{3-\delta}$ (where $0\leq \delta \leq 1.0$), $Li_{0.34}La_{0.55}BiO_{3-\delta}$ (where $0\leq \delta \leq 1.0$),
$Li_{0.10}La_{0.63}TiO_{3-\delta}$ (where $0\leq \delta \leq 1.0$), $Li_{0.10}La_{0.63}MnO_{3-\delta}$ (where $0\leq \delta \leq 1.0$), $Li_{0.10}La_{0.63}NiO_{3-\delta}$ (where $0\leq \delta \leq 1.0$), $Li_{0.10}La_{0.63}CrO_{3-\delta}$ (where $0\leq \delta \leq 1.0$), $Li_{0.10}La_{0.63}CoO_{3-\delta}$ (where $0\leq \delta \leq 1.0$), $Li_{0.10}La_{0.63}IrO_{3-\delta}$ (where $0\leq \delta \leq 1.0$), $Li_{0.10}La_{0.63}RuO_{3-\delta}$ (where $0\leq \delta \leq 1.0$), $Li_{0.10}La_{0.63}TiO_{3-\delta}$ (where $0\leq \delta \leq 1.0$), $Li_{0.10}La_{0.63}FeO_{3-\delta}$ (where $0\leq \delta \leq 1.0$), $Li_{0.10}La_{0.63}PdO_{3-\delta}$ (where $0\leq \delta \leq 1.0$), $Li_{0.10}La_{0.63}PbO_{3-\delta}$ (where $0\leq \delta \leq 1.0$), $Li_{0.10}La_{0.63}RhO_{3-\delta}$ (where $0\leq \delta \leq 1.0$), $Li_{0.10}La_{0.63}SnO_{3-\delta}$ (where $0\leq \delta \leq 1.0$), $Li_{0.10}La_{0.63}VO_{3-\delta}$ (where $0\leq \delta \leq 1.0$), $Li_{0.10}La_{0.63}ReO_{3-\delta}$ (where $0\leq \delta \leq 1.0$), $Li_{0.10}La_{0.63}GeO_{3-\delta}$ (where $0\leq \delta \leq 1.0$), $Li_{0.10}La_{0.63}WO_{3-\delta}$ (where $0\leq \delta \leq 1.0$), $Li_{0.10}La_{0.63}ZrO_{3-\delta}$ (where $0\leq \delta \leq 1.0$), $Li_{0.10}La_{0.63}MoO_{3-\delta}$ (where $0\leq \delta \leq 1.0$), $Li_{0.10}La_{0.63}NbO_{3-\delta}$ (where $0\leq \delta \leq 1.0$), $Li_{0.10}La_{0.63}TaO_{3-\delta}$ (where $0\leq \delta \leq 1.0$), $Li_{0.10}La_{0.63}HfO_{3-\delta}$ (where $0\leq \delta \leq 1.0$), $Li_{0.10}La_{0.63}BiO_{3-\delta}$ (where $0\leq \delta \leq 1.0$),
$Li_{0.20}La_{0.60}TiO_{3-\delta}$ (where $0\leq \delta \leq 1.0$), $Li_{0.20}La_{0.60}MnO_{3-\delta}$ (where $0\leq \delta \leq 1.0$), $Li_{0.20}La_{0.60}NiO_{3-\delta}$ (where $0\leq \delta \leq 1.0$), $Li_{0.20}La_{0.60}CrO_{3-\delta}$ (where $0\leq \delta \leq 1.0$), $Li_{0.20}La_{0.60}CoO_{3-\delta}$ (where $0\leq \delta \leq 1.0$), $Li_{0.20}La_{0.60}IrO_{3-\delta}$ (where $0\leq \delta \leq 1.0$), $Li_{0.20}La_{0.60}RuO_{3-\delta}$ (where $0\leq \delta \leq 1.0$), $Li_{0.20}La_{0.60}TiO_{3-\delta}$ (where $0\leq \delta \leq 1.0$), $Li_{0.20}La_{0.60}FeO_{3-\delta}$ (where $0\leq \delta \leq 1.0$), $Li_{0.20}La_{0.60}PdO_{3-\delta}$ (where $0\leq \delta \leq 1.0$), $Li_{0.20}La_{0.60}PbO_{3-\delta}$ (where $0\leq \delta \leq 1.0$), $Li_{0.20}La_{0.60}RhO_{3-\delta}$ (where $0\leq \delta \leq 1.0$), $Li_{0.20}La_{0.60}SnO_{3-\delta}$ (where $0\leq \delta \leq 1.0$), $Li_{0.20}La_{0.60}VO_{3-\delta}$ (where $0\leq \delta \leq 1.0$), $Li_{0.20}La_{0.60}ReO_{3-\delta}$ (where $0\leq \delta \leq 1.0$), $Li_{0.20}La_{0.60}GeO_{3-\delta}$ (where $0\leq \delta \leq 1.0$), $Li_{0.20}La_{0.60}WO_{3-\delta}$ (where $0\leq \delta \leq 1.0$), $Li_{0.20}La_{0.60}ZrO_{3-\delta}$ (where $0\leq \delta \leq 1.0$), $Li_{0.20}La_{0.60}MoO_{3-\delta}$ (where $0\leq \delta \leq 1.0$), $Li_{0.20}La_{0.60}NbO_{3-\delta}$ (where $0\leq \delta \leq 1.0$), $Li_{0.20}La_{0.60}TaO_{3-\delta}$ (where $0\leq \delta \leq 1.0$), $Li_{0.20}La_{0.60}HfO_{3-\delta}$ (where $0\leq \delta \leq 1.0$), $Li_{0.20}La_{0.60}BiO_{3-\delta}$ (where $0\leq \delta \leq 1.0$),
$Li_{0.30}La_{0.57}TiO_{3-\delta}$ (where $0\leq \delta \leq 1.0$), $Li_{0.30}La_{0.57}MnO_{3-\delta}$ (where $0\leq \delta \leq 1.0$), $Li_{0.30}La_{0.57}NiO_{3-\delta}$ (where $0\leq \delta \leq 1.0$), $Li_{0.30}La_{0.57}CrO_{3-\delta}$ (where $0\leq \delta \leq 1.0$), $Li_{0.30}La_{0.57}CoO_{3-\delta}$ (where $0\leq \delta \leq 1.0$), $Li_{0.30}La_{0.57}IrO_{3-\delta}$ (where $0\leq \delta \leq 1.0$), $Li_{0.30}La_{0.57}RuO_{3-\delta}$ (where $0\leq \delta \leq 1.0$), $Li_{0.30}La_{0.57}TiO_{3-\delta}$ (where $0\leq \delta \leq 1.0$), $Li_{0.30}La_{0.57}FeO_{3-\delta}$ (where $0\leq \delta \leq 1.0$), $Li_{0.30}La_{0.57}PdO_{3-\delta}$ (where $0\leq \delta \leq 1.0$), $Li_{0.30}La_{0.57}PbO_{3-\delta}$ (where $0\leq \delta \leq 1.0$), $Li_{0.30}La_{0.57}RhO_{3-\delta}$ (where $0\leq \delta \leq 1.0$), $Li_{0.30}La_{0.57}SnO_{3-\delta}$ (where $0\leq \delta \leq 1.0$), $Li_{0.30}La_{0.57}VO_{3-\delta}$ (where $0\leq \delta \leq 1.0$), $Li_{0.30}La_{0.57}ReO_{3-\delta}$ (where $0\leq \delta \leq 1.0$), $Li_{0.30}La_{0.57}GeO_{3-\delta}$ (where $0\leq \delta \leq 1.0$), $Li_{0.30}La_{0.57}WO_{3-\delta}$ (where $0\leq \delta \leq 1.0$), $Li_{0.30}La_{0.57}ZrO_{3-\delta}$ (where $0\leq \delta \leq 1.0$), $Li_{0.30}La_{0.57}MoO_{3-\delta}$ (where $0\leq \delta \leq 1.0$), $Li_{0.30}La_{0.57}NbO_{3-\delta}$ (where $0\leq \delta \leq 1.0$), $Li_{0.30}La_{0.57}TaO_{3-\delta}$ (where $0\leq \delta \leq 1.0$), $Li_{0.30}La_{0.57}HfO_{3-\delta}$ (where $0\leq \delta \leq 1.0$), $Li_{0.30}La_{0.57}BiO_{3-\delta}$ (where $0\leq \delta \leq 1.0$),
$Li_{0.40}La_{0.53}TiO_{3-\delta}$ (where $0\leq \delta \leq 1.0$), $Li_{0.40}La_{0.53}MnO_{3-\delta}$ (where $0\leq \delta \leq 1.0$), $Li_{0.40}La_{0.53}NiO_{3-\delta}$ (where $0\leq \delta \leq 1.0$), $Li_{0.40}La_{0.53}CrO_{3-\delta}$ (where $0\leq \delta \leq 1.0$), $Li_{0.40}La_{0.53}CoO_{3-\delta}$ (where $0\leq \delta \leq 1.0$), $Li_{0.40}La_{0.53}IrO_{3-\delta}$ (where $0\leq \delta \leq 1.0$), $Li_{0.40}La_{0.53}RuO_{3-\delta}$ (where $0\leq \delta \leq 1.0$), $Li_{0.40}La_{0.53}TiO_{3-\delta}$ (where $0\leq \delta \leq 1.0$), $Li_{0.40}La_{0.53}FeO_{3-\delta}$ (where $0\leq \delta \leq 1.0$), $Li_{0.40}La_{0.53}PdO_{3-\delta}$ (where $0\leq \delta \leq 1.0$), $Li_{0.40}La_{0.53}PbO_{3-\delta}$ (where $0\leq\delta\leq1.0$), $Li_{0.40}La_{0.53}RhO_{3-\delta}$ (where $0\leq\delta\leq1.0$), $Li_{0.40}La_{0.53}SnO_{3-\delta}$ (where $0\leq\delta\leq1.0$), $Li_{0.40}La_{0.53}VO_{3-\delta}$ (where $0\leq\delta\leq1.0$), $Li_{0.40}La_{0.53}ReO_{3-\delta}$ (where $0\leq\delta\leq1.0$), $Li_{0.40}La_{0.53}GeO_{3-\delta}$ (where $0\leq\delta\leq1.0$), $Li_{0.40}La_{0.53}WO_{3-\delta}$ (where $0\leq\delta\leq1.0$), $Li_{0.40}La_{0.53}ZrO_{3-\delta}$ (where $0\leq\delta\leq1.0$), $Li_{0.40}La_{0.53}MoO_{3-\delta}$ (where $0\leq\delta\leq1.0$), $Li_{0.40}La_{0.53}NbO_{3-\delta}$ (where $0\leq\delta\leq1.0$), $Li_{0.40}La_{0.53}TaO_{3-\delta}$ (where $0\leq\delta\leq1.0$), $Li_{0.40}La_{0.53}HfO_{3-\delta}$ (where $0\leq\delta\leq1.0$), $Li_{0.40}La_{0.53}BiO_{3-\delta}$ (where $0\leq\delta\leq1.0$), $Li_{0.45}La_{0.52}TiO_{3-\delta}$ (where $0\leq\delta\leq1.0$), $Li_{0.45}La_{0.52}MnO_{3-\delta}$ (where $0\leq\delta\leq1.0$), $Li_{0.45}La_{0.52}NiO_{3-\delta}$ (where $0\leq\delta\leq1.0$), $Li_{0.45}La_{0.52}CrO_{3-\delta}$ (where $0\leq\delta\leq1.0$), $Li_{0.45}La_{0.52}CoO_{3-\delta}$ (where $0\leq\delta\leq1.0$), $Li_{0.45}La_{0.52}IrO_{3-\delta}$ (where $0\leq\delta\leq1.0$), $Li_{0.45}La_{0.52}RuO_{3-\delta}$ (where $0\leq\delta\leq1.0$), $Li_{0.45}La_{0.52}TiO_{3-\delta}$ (where $0\leq\delta\leq1.0$), $Li_{0.45}La_{0.52}FeO_{3-\delta}$ (where $0\leq\delta\leq1.0$), $Li_{0.45}La_{0.52}PdO_{3-\delta}$ (where $0\leq\delta\leq1.0$), $Li_{0.45}La_{0.52}PbO_{3-\delta}$ (where $0\leq\delta\leq1.0$), $Li_{0.45}La_{0.52}RhO_{3-\delta}$ (where $0\leq\delta\leq1.0$), $Li_{0.45}La_{0.52}SnO_{3-\delta}$ (where $0\leq\delta\leq1.0$), $Li_{0.45}La_{0.52}VO_{3-\delta}$ (where $0\leq\delta\leq1.0$), $Li_{0.45}La_{0.52}ReO_{3-\delta}$ (where $0\leq\delta\leq1.0$), $Li_{0.45}La_{0.52}GeO_{3-\delta}$ (where $0\leq\delta\leq1.0$), $Li_{0.45}La_{0.52}WO_{3-\delta}$ (where $0\leq\delta\leq1.0$), $Li_{0.45}La_{0.52}ZrO_{3-\delta}$ (where $0\leq\delta\leq1.0$), $Li_{0.45}La_{0.52}MoO_{3-\delta}$ (where $0\leq\delta\leq1.0$), $Li_{0.45}La_{0.52}NbO_{3-\delta}$ (where $0\leq\delta\leq1.0$), $Li_{0.45}La_{0.52}TaO_{3-\delta}$ (where $0\leq\delta\leq1.0$), $Li_{0.45}La_{0.52}HfO_{3-\delta}$ (where $0\leq\delta\leq1.0$), $Li_{0.45}La_{0.52}BiO_{3-\delta}$ (where $0\leq\delta\leq1.0$), $Li_{0.34}Ce_{0.55}TiO_{3-\delta}$ (where $0\leq\delta\leq1.0$), $Li_{0.34}Ce_{0.55}MnO_{3-\delta}$ (where $0\leq\delta\leq1.0$), $Li_{0.34}Ce_{0.55}NiO_{3-\delta}$ (where $0\leq\delta\leq1.0$), $Li_{0.34}Ce_{0.55}CrO_{3-\delta}$ (where $0\leq\delta\leq1.0$), $Li_{0.34}Ce_{0.55}CoO_{3-\delta}$ (where $0\leq\delta\leq1.0$), $Li_{0.34}Ce_{0.55}IrO_{3-\delta}$ (where $0\leq\delta\leq1.0$), $Li_{0.34}Ce_{0.55}RuO_{3-\delta}$ (where $0\leq\delta\leq1.0$), $Li_{0.34}Ce_{0.55}TiO_{3-\delta}$ (where $0\leq\delta\leq1.0$), $Li_{0.34}Ce_{0.55}FeO_{3-\delta}$ (where $0\leq\delta\leq1.0$), $Li_{0.34}Ce_{0.55}PdO_{3-\delta}$ (where $0\leq\delta\leq1.0$), $Li_{0.34}Ce_{0.55}PbO_{3-\delta}$ (where $0\leq\delta\leq1.0$), $Li_{0.34}Ce_{0.55}RhO_{3-\delta}$ (where $0\leq\delta\leq1.0$), $Li_{0.34}Ce_{0.55}SnO_{3-\delta}$ (where $0\leq\delta\leq1.0$), $Li_{0.34}Ce_{0.55}VO_{3-\delta}$ (where $0\leq\delta\leq1.0$), $Li_{0.34}Ce_{0.55}ReO_{3-\delta}$ (where $0\leq\delta\leq1.0$), $Li_{0.34}Ce_{0.55}GeO_{3-\delta}$ (where $0\leq\delta\leq1.0$), $Li_{0.34}Ce_{0.55}WO_{3-\delta}$ (where $0\leq\delta\leq1.0$), $Li_{0.34}Ce_{0.55}ZrO_{3-\delta}$ (where $0\leq\delta\leq1.0$), $Li_{0.34}Ce_{0.55}MoO_{3-\delta}$ (where $0\leq\delta\leq1.0$), $Li_{0.34}Ce_{0.55}NbO_{3-\delta}$ (where $0\leq\delta\leq1.0$), $Li_{0.34}Ce_{0.55}TaO_{3-\delta}$ (where $0\leq\delta\leq1.0$), $Li_{0.34}Ce_{0.55}HfO_{3-\delta}$ (where $0\leq\delta\leq1.0$), $Li_{0.34}Ce_{0.55}BiO_{3-\delta}$ (where $0\leq\delta\leq1.0$), $Li_{0.10}Ce_{0.63}TiO_{3-\delta}$ (where $0\leq\delta\leq1.0$), $Li_{0.10}Ce_{0.63}MnO_{3-\delta}$ (where $0\leq\delta\leq1.0$), $Li_{0.10}Ce_{0.63}NiO_{3-\delta}$ (where $0\leq\delta\leq1.0$), $Li_{0.10}Ce_{0.63}CrO_{3-\delta}$ (where $0\leq\delta\leq1.0$), $Li_{0.10}Ce_{0.63}CoO_{3-\delta}$ (where $0\leq\delta\leq1.0$), $Li_{0.10}Ce_{0.63}IrO_{3-\delta}$ (where $0\leq\delta\leq1.0$)$_3$, $Li_{0.10}Ce_{0.63}RuO_{3-\delta}$ (where $0\leq\delta\leq1.0$), $Li_{0.10}Ce_{0.63}TiO_{3-\delta}$ (where $0\leq\delta\leq1.0$), $Li_{0.10}Ce_{0.63}FeO_{3-\delta}$ (where $0\leq\delta\leq1.0$), $Li_{0.10}Ce_{0.63}PdO_{3-\delta}$ (where $0\leq\delta\leq1.0$), $Li_{0.10}Ce_{0.63}PbO_{3-\delta}$ (where $0\leq\delta\leq1.0$), $Li_{0.10}Ce_{0.63}RhO_{3-\delta}$ (where $0\leq\delta\leq1.0$), $Li_{0.10}Ce_{0.63}SnO_{3-\delta}$ (where $0\leq\delta\leq1.0$), $Li_{0.10}Ce_{0.63}VO_{3-\delta}$ (where $0\leq\delta\leq1.0$), $Li_{0.10}Ce_{0.63}ReO_{3-\delta}$ (where $0\leq\delta\leq1.0$), $Li_{0.10}Ce_{0.63}GeO_{3-\delta}$ (where $0\leq\delta\leq1.0$), $Li_{0.10}Ce_{0.63}WO_{3-\delta}$ (where $0\leq\delta\leq1.0$), $Li_{0.10}Ce_{0.63}ZrO_{3-\delta}$ (where $0\leq\delta\leq1.0$), $Li_{0.10}Ce_{0.63}MoO_{3-\delta}$ (where $0\leq\delta\leq1.0$), $Li_{0.10}Ce_{0.63}NbO_{3-\delta}$ (where $0\leq\delta\leq1.0$), $Li_{0.10}Ce_{0.63}TaO_{3-\delta}$ (where $0\leq\delta\leq1.0$), $Li_{0.10}Ce_{0.63}HfO_{3-\delta}$ (where $0\leq\delta\leq1.0$), $Li_{0.10}Ce_{0.63}BiO_{3-\delta}$ (where $0\leq\delta\leq1.0$), $Li_{0.20}Ce_{0.60}TiO_{3-\delta}$ (where $0\leq\delta\leq1.0$), $Li_{0.20}Ce_{0.60}MnO_{3-\delta}$ (where $0\leq\delta\leq1.0$), $Li_{0.20}Ce_{0.60}NiO_{3-\delta}$ (where $0\leq\delta\leq1.0$), $Li_{0.20}Ce_{0.60}CrO_{3-\delta}$ (where $0\leq\delta\leq1.0$), $Li_{0.20}Ce_{0.60}CoO_{3-\delta}$ (where $0\leq\delta\leq1.0$), $Li_{0.20}Ce_{0.60}IrO_{3-\delta}$ (where $0\leq\delta\leq1.0$), $Li_{0.20}Ce_{0.60}RuO_{3-\delta}$ (where $0\leq\delta\leq1.0$), $Li_{0.20}Ce_{0.60}TiO_{3-\delta}$ (where $0\leq\delta\leq1.0$), $Li_{0.20}Ce_{0.60}FeO_{3-\delta}$ (where $0\leq\delta\leq1.0$), $Li_{0.20}Ce_{0.60}PdO_{3-\delta}$ (where $0\leq\delta\leq1.0$), $Li_{0.20}Ce_{0.60}PbO_{3-\delta}$ (where $0\leq\delta\leq1.0$), $Li_{0.20}Ce_{0.60}RhO_{3-\delta}$ (where $0\leq\delta\leq1.0$), $Li_{0.20}Ce_{0.60}SnO_{3-\delta}$ (where $0\leq\delta\leq1.0$), $Li_{0.20}Ce_{0.60}VO_{3-\delta}$ (where $0\leq\delta\leq1.0$), $Li_{0.20}Ce_{0.60}ReO_{3-\delta}$ (where $0\leq\delta\leq1.0$), $Li_{0.20}Ce_{0.60}GeO_{3-\delta}$ (where $0\leq\delta\leq1.0$), $Li_{0.20}Ce_{0.60}WO_{3-\delta}$ (where $0\leq\delta\leq1.0$), $Li_{0.20}Ce_{0.60}ZrO_{3-\delta}$ (where $0\leq\delta\leq1.0$), $Li_{0.20}Ce_{0.60}MoO_{3-\delta}$ (where $0\leq\delta\leq1.0$), $Li_{0.20}Ce_{0.60}PbO_{3-\delta}$ (where $0\leq\delta\leq1.0$), $Li_{0.20}Ce_{0.60}TaO_{3-\delta}$ (where $0\leq\delta\leq1.0$), $Li_{0.20}Ce_{0.60}HfO_{3-\delta}$ (where $0\leq\delta\leq1.0$), $Li_{0.20}Ce_{0.60}BiO_{3-\delta}$ (where $0\leq\delta\leq1.0$), $Li_{0.30}Ce_{0.57}TiO_{3-\delta}$ (where $0\leq\delta\leq1.0$), $Li_{0.30}Ce_{0.57}MnO_{3-\delta}$ (where $0\leq\delta\leq1.0$), $Li_{0.30}Ce_{0.57}NiO_{3-\delta}$ (where $0\leq\delta\leq1.0$), $Li_{0.30}Ce_{0.57}CrO_{3-\delta}$ (where $0\leq\delta\leq1.0$), $Li_{0.30}Ce_{0.57}CoO_{3-\delta}$ (where $0\leq\delta\leq1.0$), $Li_{0.30}Ce_{0.57}IrO_{3-\delta}$ (where $0\leq\delta\leq1.0$), $Li_{0.30}Ce_{0.57}RuO_{3-\delta}$ (where $0\leq\delta\leq1.0$), $Li_{0.30}Ce_{0.57}TiO_{3-\delta}$ (where $0\leq\delta\leq1.0$), $Li_{0.30}Ce_{0.57}FeO_{3-\delta}$ (where $0\leq\delta\leq1.0$), $Li_{0.30}Ce_{0.57}PdO_{3-\delta}$ (where $0\leq\delta\leq1.0$), $Li_{0.30}Ce_{0.57}PbO_{3-\delta}$ (where $0\leq\delta\leq1.0$), $Li_{0.30}Ce_{0.57}RhO_{3-\delta}$ (where $0\leq\delta\leq1.0$), $Li_{0.30}Ce_{0.57}SnO_{3-\delta}$ (where $0\leq\delta\leq1.0$), $Li_{0.30}Ce_{0.57}VO_{3-\delta}$ (where $0\leq\delta\leq1.0$), $Li_{0.30}Ce_{0.57}ReO_{3-\delta}$ (where $0\leq\delta\leq1.0$), $Li_{0.30}Ce_{0.57}GeO_{3-\delta}$ (where $0\leq\delta\leq1.0$), $Li_{0.30}Ce_{0.57}WO_{3-\delta}$ (where $0\leq\delta\leq1.0$), $Li_{0.30}Ce_{0.57}ZrO_{3-\delta}$ (where $0\leq\delta\leq1.0$), $Li_{0.30}Ce_{0.57}MoO_{3-\delta}$ (where $0\leq\delta\leq1.0$), $Li_{0.30}Ce_{0.57}NbO_{3-\delta}$ (where $0\leq\delta\leq1.0$), $Li_{0.30}Ce_{0.57}TaO_{3-\delta}$ (where $0\leq\delta\leq1.0$), $Li_{0.30}Ce_{0.57}HfO_{3-\delta}$ (where $0\leq\delta\leq1.0$), $Li_{0.30}Ce_{0.57}BiO_{3-\delta}$ (where $0\leq\delta\leq1.0$), $Li_{0.40}Ce_{0.53}TiO_{3-\delta}$ (where $0\leq\delta\leq1.0$), $Li_{0.40}Ce_{0.53}MnO_{3-\delta}$ (where $0\leq\delta\leq1.0$), $Li_{0.40}Ce_{0.53}NiO_{3-\delta}$ (where $0\leq\delta\leq1.0$), $Li_{0.40}Ce_{0.53}CrO_{3-\delta}$ (where $0\leq\delta\leq1.0$), $Li_{0.40}Ce_{0.53}CoO_{3-\delta}$ (where $0\leq\delta\leq1.0$), $Li_{0.40}Ce_{0.53}IrO_{3-\delta}$ (where $0\leq\delta\leq1.0$), $Li_{0.40}Ce_{0.53}RuO_{3-\delta}$ (where $0\leq\delta\leq1.0$), $Li_{0.40}Ce_{0.53}TiO_{3-\delta}$ (where $0\leq\delta\leq1.0$), $Li_{0.40}Ce_{0.53}FeO_{3-\delta}$ (where $0\leq\delta\leq1.0$), $Li_{0.40}Ce_{0.53}PdO_{3-\delta}$ (where $0\leq\delta\leq1.0$), $Li_{0.40}Ce_{0.53}PbO_{3-\delta}$ (where $0\leq\delta\leq1.0$), $Li_{0.40}Ce_{0.53}RhO_{3-\delta}$ (where $0\leq\delta\leq1.0$), $Li_{0.40}Ce_{0.53}SnO_{3-\delta}$ (where $0\leq\delta\leq1.0$), $Li_{0.40}Ce_{0.53}VO_{3-\delta}$ (where $0\leq\delta\leq1.0$), $Li_{0.40}Ce_{0.53}ReO_{3-\delta}$ (where $0\leq\delta\leq1.0$), $Li_{0.40}Ce_{0.53}GeO_{3-\delta}$ (where $0\leq\delta\leq1.0$), $Li_{0.40}Ce_{0.53}WO_{3-\delta}$ (where $0\leq\delta\leq1.0$), $Li_{0.40}Ce_{0.53}ZrO_{3-\delta}$ (where $0\leq\delta\leq1.0$), $Li_{0.40}Ce_{0.53}MoO_{3-\delta}$ (where $0\leq\delta\leq1.0$), $Li_{0.40}Ce_{0.53}NbO_{3-\delta}$ (where $0\leq\delta\leq1.0$), $Li_{0.40}Ce_{0.53}TaO_{3-\delta}$ (where $0\leq\delta\leq1.0$), $Li_{0.40}Ce_{0.53}HfO_{3-\delta}$ (where $0\leq\delta\leq1.0$), $Li_{0.40}Ce_{0.53}BiO_{3-\delta}$ (where $0\leq\delta\leq1.0$), $Li_{0.45}Ce_{0.52}TiO_{3-\delta}$ (where $0\leq\delta\leq1.0$), $Li_{0.45}Ce_{0.52}MnO_{3-\delta}$ (where $0\leq\delta\leq1.0$), $Li_{0.45}Ce_{0.52}NiO_{3-\delta}$ (where $0\leq\delta\leq1.0$), $Li_{0.45}Ce_{0.52}CrO_{3-\delta}$ (where $0\leq\delta\leq1.0$), $Li_{0.45}Ce_{0.52}CoO_{3-\delta}$ (where $0\leq\delta\leq1.0$), $Li_{0.45}Ce_{0.52}IrO_{3-\delta}$ (where $0\leq\delta\leq1.0$), $Li_{0.45}Ce_{0.52}RuO_{3-\delta}$ (where $0\leq\delta\leq1.0$), $Li_{0.45}Ce_{0.52}TiO_{3-\delta}$ (where $0\leq\delta\leq1.0$), $Li_{0.45}Ce_{0.52}FeO_{3-\delta}$ (where $0\leq\delta\leq1.0$), $Li_{0.45}Ce_{0.52}PdO_{3-\delta}$ (where $0\leq\delta\leq1.0$), $Li_{0.45}Ce_{0.52}PbO_{3-\delta}$ (where $0\leq\delta\leq1.0$), $Li_{0.45}Ce_{0.52}RhO_{3-\delta}$ (where $0\leq\delta\leq1.0$), $Li_{0.45}Ce_{0.52}SnO_{3-\delta}$ (where $0\leq\delta\leq1.0$), $Li_{0.45}Ce_{0.52}VO_{3-\delta}$ (where $0\leq\delta\leq1.0$), $Li_{0.45}Ce_{0.52}ReO_{3-\delta}$ (where $0\leq\delta\leq1.0$), $Li_{0.45}Ce_{0.52}GeO_{3-\delta}$ (where $0\leq\delta\leq1.0$), $Li_{0.45}Ce_{0.52}WO_{3-\delta}$ (where $0\leq\delta\leq1.0$), $Li_{0.45}Ce_{0.52}ZrO_{3-\delta}$ (where $0\leq\delta\leq1.0$), $Li_{0.45}Ce_{0.52}MoO_{3-\delta}$ (where $0\leq\delta\leq1.0$), $Li_{0.45}Ce_{0.52}NbO_{3-\delta}$ (where $0\leq\delta\leq1.0$), $Li_{0.45}Ce_{0.52}TaO_{3-\delta}$ (where $0\leq\delta\leq1.0$), $Li_{0.45}Ce_{0.52}HfO_{3-\delta}$ (where $0\leq\delta\leq1.0$), $Li_{0.45}Ce_{0.52}BiO_{3-\delta}$ (where $0\leq\delta\leq1.0$), $Li_{0.34}Pr_{0.55}TiO_{3-\delta}$ (where $0\leq\delta\leq1.0$), $Li_{0.34}Pr_{0.55}MnO_{3-\delta}$ (where $0\leq\delta\leq1.0$), $Li_{0.34}Pr_{0.55}NiO_{3-\delta}$ (where $0\leq\delta\leq1.0$), $Li_{0.34}Pr_{0.55}CrO_{3-\delta}$ (where $0\leq\delta\leq1.0$), $Li_{0.34}Pr_{0.55}CoO_{3-\delta}$ (where $Li_{0.34}Pr_{0.55}IrO_{3-\delta}$ (where $0\leq\delta\leq1.0$), $Li_{0.34}Pr_{0.55}RuO_{3-\delta}$ (where $0\leq\delta\leq1.0$), $Li_{0.34}Pr_{0.55}TiO_{3-\delta}$ (where $0\leq\delta\leq1.0$), $Li_{0.34}Pr_{0.55}FeO_{3-\delta}$ (where $0\leq\delta\leq1.0$), $Li_{0.34}Pr_{0.55}PdO_{3-\delta}$ (where $0\leq\delta\leq1.0$), $Li_{0.34}Pr_{0.55}PbO_{3-\delta}$ (where $0\leq\delta\leq1.0$), $Li_{0.34}Pr_{0.55}RhO_{3-\delta}$ (where $Li_{0.34}Pr_{0.55}SnO_{3-\delta}$ (where $0\leq\delta\leq1.0$), $Li_{0.34}Pr_{0.55}VO_{3-\delta}$ (where $0\leq\delta\leq1.0$), $Li_{0.34}Pr_{0.55}ReO_{3-\delta}$ (where $0\leq\delta\leq1.0$), $Li_{0.34}Pr_{0.55}GeO_{3-\delta}$ (where $0\leq\delta\leq1.0$), $Li_{0.34}Pr_{0.55}WO_{3-\delta}$ (where $0\leq\delta\leq1.0$), $Li_{0.34}Pr_{0.55}ZrO_{3-\delta}$ (where $0\leq\delta\leq1.0$), $Li_{0.34}Pr_{0.55}MoO_{3-\delta}$ (where $0\leq\delta\leq1.0$), $Li_{0.34}Pr_{0.55}NbO_{3-\delta}$ (where 0≤δ≤1.0), $Li_{0.34}Pr_{0.55}TaO_{3-\delta}$ (where 0≤δ≤1.0), $Li_{0.34}Pr_{0.55}HfO_{3-\delta}$ (where 0≤δ≤1.0), $Li_{0.34}Pr_{0.55}BiO_{3-\delta}$ (where 0≤δ≤1.0), $Li_{0.10}Pr_{0.63}TiO_{3-\delta}$ (where 0≤δ≤1.0), $Li_{0.10}Pr_{0.63}MnO_{3-\delta}$ (where 0≤δ≤1.0), $Li_{0.10}Pr_{0.63}NiO_{3-\delta}$ (where 0≤δ≤1.0), $Li_{0.10}Pr_{0.63}CrO_{3-\delta}$ (where 0≤δ≤1.0), $Li_{0.10}Pr_{0.63}CoO_{3-\delta}$ (where Li_{0.10}Pr_{0.63}IrO_{3-\delta} (where 0≤δ≤1.0), $Li_{0.10}Pr_{0.63}RuO_{3-\delta}$ (where 0≤δ≤1.0), $Li_{0.10}Pr_{0.63}TiO_{3-\delta}$ (where 0≤δ≤1.0), $Li_{0.10}Pr_{0.63}FeO_{3-\delta}$ (where 0≤δ≤1.0), $Li_{0.10}Pr_{0.63}PdO_{3-\delta}$ (where 0≤δ≤1.0), $Li_{0.10}Pr_{0.63}PbO_{3-\delta}$ (where 0≤δ≤1.0), $Li_{0.10}Pr_{0.63}RhO_{3-\delta}$ (where $Li_{0.10}Pr_{0.63}SnO_{3-\delta}$ (where 0≤δ≤1.0), $Li_{0.10}Pr_{0.63}VO_{3-\delta}$ (where 0≤δ≤1.0), $Li_{0.10}Pr_{0.63}ReO_{3-\delta}$ (where 0≤δ≤1.0), $Li_{0.10}Pr_{0.63}GeO_{3-\delta}$ (where 0≤δ≤1.0), $Li_{0.10}Pr_{0.63}WO_{3-\delta}$ (where 0≤δ≤1.0), $Li_{0.10}Pr_{0.63}ZrO_{3-\delta}$ (where 0≤δ≤1.0), $Li_{0.10}Pr_{0.63}MoO_{3-\delta}$ (where 0≤δ≤1.0), $Li_{0.10}Pr_{0.63}NbO_{3-\delta}$ (where 0≤δ≤1.0), $Li_{0.10}Pr_{0.63}TaO_{3-\delta}$ (where 0≤δ≤1.0), $Li_{0.10}Pr_{0.63}HfO_{3-\delta}$ (where 0≤δ≤1.0), $Li_{0.10}Pr_{0.63}BiO_{3-\delta}$ (where 0≤δ≤1.0), $Li_{0.20}Pr_{0.60}TiO_{3-\delta}$ (where 0≤δ≤1.0), $Li_{0.20}Pr_{0.60}MnO_{3-\delta}$ (where 0≤δ≤1.0), $Li_{0.20}Pr_{0.60}NiO_{3-\delta}$ (where 0≤δ≤1.0), $Li_{0.20}Pr_{0.60}CrO_{3-\delta}$ (where 0≤δ≤1.0), $Li_{0.20}Pr_{0.60}CoO_{3-\delta}$ (where Li_{0.20}Pr_{0.60}IrO_{3-\delta} (where 0≤δ≤1.0), $Li_{0.20}Pr_{0.60}RuO_{3-\delta}$ (where 0≤δ≤1.0), $Li_{0.20}Pr_{0.60}TiO_{3-\delta}$ (where 0≤δ≤1.0), $Li_{0.20}Pr_{0.60}FeO_{3-\delta}$ (where 0≤δ≤1.0), $Li_{0.20}Pr_{0.60}PdO_{3-\delta}$ (where 0≤δ≤1.0), $Li_{0.20}Pr_{0.60}PbO_{3-\delta}$ (where 0≤δ≤1.0), $Li_{0.20}Pr_{0.60}RhO_{3-\delta}$ (where $Li_{0.20}Pr_{0.60}SnO_{3-\delta}$ (where 0≤δ≤1.0), $Li_{0.20}Pr_{0.60}VO_{3-\delta}$ (where 0≤δ≤1.0), $Li_{0.20}Pr_{0.60}ReO_{3-\delta}$ (where 0≤δ≤1.0), $Li_{0.20}Pr_{0.60}GeO_{3-\delta}$ (where 0≤δ≤1.0), $Li_{0.20}Pr_{0.60}WO_{3-\delta}$ (where 0≤δ≤1.0), $Li_{0.20}Pr_{0.60}ZrO_{3-\delta}$ (where 0≤δ≤1.0), $Li_{0.20}Pr_{0.60}MoO_{3-\delta}$ (where 0≤δ≤1.0), $Li_{0.20}Pr_{0.60}NbO_{3-\delta}$ (where 0≤δ≤1.0), $Li_{0.20}Pr_{0.60}TaO_{3-\delta}$ (where 0≤δ≤1.0), $Li_{0.20}Pr_{0.60}HfO_{3-\delta}$ (where 0≤δ≤1.0), $Li_{0.20}Pr_{0.60}BiO_{3-\delta}$ (where 0≤δ≤1.0), $Li_{0.30}Pr_{0.57}TiO_{3-\delta}$ (where 0≤δ≤1.0), $Li_{0.30}Pr_{0.57}MnO_{3-\delta}$ (where 0≤δ≤1.0), $Li_{0.30}Pr_{0.57}NiO_{3-\delta}$ (where 0≤δ≤1.0), $Li_{0.30}Pr_{0.57}CrO_{3-\delta}$ (where 0≤δ≤1.0), $Li_{0.30}Pr_{0.57}Co_{3-\delta}$ (where 0≤δ≤1.0)3, $Li_{0.30}Pr_{0.57}IrO_{3-\delta}$ (where 0≤δ≤1.0), $Li_{0.30}Pr_{0.57}RuO_{3-\delta}$ (where 0≤δ≤1.0), $Li_{0.30}Pr_{0.57}TiO_{3-\delta}$ (where 0≤δ≤1.0), $Li_{0.30}Pr_{0.57}FeO_{3-\delta}$ (where 0≤δ≤1.0), $Li_{0.30}Pr_{0.57}PdO_{3-\delta}$ (where 0≤δ≤1.0), $Li_{0.30}Pr_{0.57}PbO_{3-\delta}$ (where 0≤δ≤1.0), $Li_{0.30}Pr_{0.57}RhO_{3-\delta}$ (where $Li_{0.30}Pr_{0.57}SnO_{3-\delta}$ (where 0≤δ≤1.0), $Li_{0.30}Pr_{0.57}VO_{3-\delta}$ (where 0≤δ≤1.0), $Li_{0.30}Pr_{0.57}ReO_{3-\delta}$ (where 0≤δ≤1.0), $Li_{0.30}Pr_{0.57}GeO_{3-\delta}$ (where 0≤δ≤1.0), $Li_{0.30}Pr_{0.57}WO_{3-\delta}$ (where 0≤δ≤1.0), $Li_{0.30}Pr_{0.57}ZrO_{3-\delta}$ (where 0≤δ≤1.0), $Li_{0.30}Pr_{0.57}MoO_{3-\delta}$ (where 0≤δ≤1.0), $Li_{0.30}Pr_{0.57}NbO_{3-\delta}$ (where 0≤δ≤1.0), $Li_{0.30}Pr_{0.57}TaO_{3-\delta}$ (where 0≤δ≤1.0), $Li_{0.30}Pr_{0.57}HfO_{3-\delta}$ (where 0≤δ≤1.0), $Li_{0.30}Pr_{0.57}BiO_{3-\delta}$ (where 0≤δ≤1.0), $Li_{0.40}Pr_{0.53}TiO_{3-\delta}$ (where 0≤δ≤1.0), $Li_{0.40}Pr_{0.53}MnO_{3-\delta}$ (where 0≤δ≤1.0), $Li_{0.40}Pr_{0.53}NiO_{3-\delta}$ (where 0≤δ≤1.0), $Li_{0.40}Pr_{0.53}CrO_{3-\delta}$ (where 0≤δ≤1.0), $Li_{0.40}Pr_{0.53}CoO_{3-\delta}$ (where Li_{0.40}Pr_{0.53}IrO_{3-\delta} (where 0≤δ≤1.0), $Li_{0.40}Pr_{0.53}RuO_{3-\delta}$ (where 0≤δ≤1.0), $Li_{0.40}Pr_{0.53}TiO_{3-\delta}$ (where 0≤δ≤1.0), $Li_{0.40}Pr_{0.53}FeO_{3-\delta}$ (where 0≤δ≤1.0), $Li_{0.40}Pr_{0.53}PdO_{3-\delta}$ (where 0≤δ≤1.0), $Li_{0.40}Pr_{0.53}PbO_{3-\delta}$ (where 0≤δ≤1.0), $Li_{0.40}Pr_{0.53}RhO_{3-\delta}$ (where $Li_{0.40}Pr_{0.53}SnO_{3-\delta}$ (where 0≤δ≤1.0), $Li_{0.40}Pr_{0.53}VO_{3-\delta}$ (where 0≤δ≤1.0), $Li_{0.40}Pr_{0.53}ReO_{3-\delta}$ (where 0≤δ≤1.0), $Li_{0.40}Pr_{0.53}GeO_{3-\delta}$ (where 0≤δ≤1.0), $Li_{0.40}Pr_{0.53}WO_{3-\delta}$ (where 0≤δ≤1.0), $Li_{0.40}Pr_{0.53}ZrO_{3-\delta}$ (where 0≤δ≤1.0), $Li_{0.40}Pr_{0.53}MoO_{3-\delta}$ (where 0≤δ≤1.0), $Li_{0.40}Pr_{0.53}NbO_{3-\delta}$ (where 0≤δ≤1.0), $Li_{0.40}Pr_{0.53}TaO_{3-\delta}$ (where 0≤δ≤1.0), $Li_{0.40}Pr_{0.53}HfO_{3-\delta}$ (where 0≤δ≤1.0), $Li_{0.40}Pr_{0.53}BiO_{3-\delta}$ (where 0≤δ≤1.0), $Li_{0.45}Pr_{0.52}TiO_{3-\delta}$ (where 0≤δ≤1.0), $Li_{0.45}Pr_{0.52}MnO_{3-\delta}$ (where 0≤δ≤1.0), $Li_{0.45}Pr_{0.52}NiO_{3-\delta}$ (where 0≤δ≤1.0), $Li_{0.45}Pr_{0.52}CrO_{3-\delta}$ (where 0≤δ≤1.0), $Li_{0.45}Pr_{0.52}CoO_{3-\delta}$ (where Li_{0.45}Pr_{0.52}IrO_{3-\delta} (where 0≤δ≤1.0), $Li_{0.45}Pr_{0.52}RuO_{3-\delta}$ (where 0≤δ≤1.0), $Li_{0.45}Pr_{0.52}TiO_{3-\delta}$ (where 0≤δ≤1.0), $Li_{0.45}Pr_{0.52}FeO_{3-\delta}$ (where 0≤δ≤1.0), $Li_{0.45}Pr_{0.52}PdO_{3-\delta}$ (where 0≤δ≤1.0), $Li_{0.45}Pr_{0.52}VO_{3-\delta}$ (where 0≤δ≤1.0), $Li_{0.45}Pr_{0.52}RhO_{3-\delta}$ (where $Li_{0.45}Pr_{0.52}SnO_{3-\delta}$ (where 0≤δ≤1.0), $Li_{0.45}Pr_{0.52}VO_{3-\delta}$ (where 0≤δ≤1.0), $Li_{0.45}Pr_{0.52}ReO_{3-\delta}$ (where 0≤δ≤1.0), $Li_{0.45}Pr_{0.52}GeO_{3-\delta}$ (where 0≤δ≤1.0), $Li_{0.45}Pr_{0.52}WO_{3-\delta}$ (where 0≤δ≤1.0), $Li_{0.45}Pr_{0.52}ZrO_{3-\delta}$ (where 0≤δ≤1.0), $Li_{0.45}Pr_{0.52}MoO_{3-\delta}$ (where 0≤δ≤1.0), $Li_{0.45}Pr_{0.52}NbO_{3-\delta}$ (where 0≤δ≤1.0), $Li_{0.45}Pr_{0.52}TaO_{3-\delta}$ (where 0≤δ≤1.0), $Li_{0.45}Pr_{0.52}HfO_{3-\delta}$ (where 0≤δ≤1.0), $Li_{0.45}Pr_{0.52}BiO_{3-\delta}$ (where 0≤δ≤1.0), $Li_{0.10}Ca_{0.80}TiO_{3-\delta}$ (where 0≤δ≤1.0), $Li_{0.10}Ca_{0.80}MnO_{3-\delta}$ (where 0≤δ≤1.0), $Li_{0.10}Ca_{0.80}NiO_{3-\delta}$ (where 0≤δ≤1.0), $Li_{0.10}Ca_{0.80}CrO_{3-\delta}$ (where 0≤δ≤1.0), $Li_{0.10}Ca_{0.80}CoO_{3-\delta}$ (where 0≤δ≤1.0), $Li_{0.10}Ca_{0.80}IrO_{3-\delta}$ (where 0≤δ≤1.0), $Li_{0.10}Ca_{0.80}RuO_{3-\delta}$ (where 0≤δ≤1.0), $Li_{0.10}Ca_{0.80}TiO_{3-\delta}$ (where 0≤δ≤1.0), $Li_{0.10}Ca_{0.80}FeO_{3-\delta}$ (where 0≤δ≤1.0), $Li_{0.10}Ca_{0.80}PdO_{3-\delta}$ (where 0≤δ≤1.0), $Li_{0.10}Ca_{0.80}PbO_{3-\delta}$ (where 0≤δ≤1.0), $Li_{0.10}Ca_{0.80}RhO_{3-\delta}$ (where 0≤δ≤1.0), $Li_{0.10}Ca_{0.80}SnO_{3-\delta}$ (where 0≤δ≤1.0), $Li_{0.10}Ca_{0.80}VO_{3-\delta}$ (where 0≤δ≤1.0), $Li_{0.10}Ca_{0.80}ReO_{3-\delta}$ (where 0≤δ≤1.0), $Li_{0.10}Ca_{0.80}GeO_{3-\delta}$ (where 0≤δ≤1.0), $Li_{0.10}Ca_{0.80}WO_{3-\delta}$ (where 0≤δ≤1.0), $Li_{0.10}Ca_{0.80}ZrO_{3-\delta}$ (where 0≤δ≤1.0), $Li_{0.10}Ca_{0.80}MoO_{3-\delta}$ (where 0≤δ≤1.0), $Li_{0.10}Ca_{0.80}NbO_{3-\delta}$ (where 0≤δ≤1.0), $Li_{0.10}Ca_{0.80}TaO_{3-\delta}$ (where 0≤δ≤1.0), $Li_{0.10}Ca_{0.80}HfO_{3-\delta}$ (where 0≤δ≤1.0), $Li_{0.10}Ca_{0.80}BiO_{3-\delta}$ (where 0≤δ≤1.0), $Li_{0.20}Ca_{0.60}TiO_{3-\delta}$ (where 0≤δ≤1.0), $Li_{0.20}Ca_{0.60}MnO_{3-\delta}$ (where 0≤δ≤1.0), $Li_{0.20}Ca_{0.60}NiO_{3-\delta}$ (where 0≤δ≤1.0), $Li_{0.20}Ca_{0.60}CrO_{3-\delta}$ (where 0≤δ≤1.0), $Li_{0.20}Ca_{0.60}CoO_{3-\delta}$ (where 0≤δ≤1.0), $Li_{0.20}Ca_{0.60}IrO_{3-\delta}$ (where 0≤δ≤1.0), $Li_{0.20}Ca_{0.60}RuO_{3-\delta}$ (where 0≤δ≤1.0), $Li_{0.20}Ca_{0.60}TiO_{3-\delta}$ (where 0≤δ≤1.0), $Li_{0.20}Ca_{0.60}FeO_{3-\delta}$ (where 0≤δ≤1.0), $Li_{0.20}Ca_{0.60}PdO_{3-\delta}$ (where 0≤δ≤1.0), $Li_{0.20}Ca_{0.60}PbO_{3-\delta}$ (where 0≤δ≤1.0), $Li_{0.20}Ca_{0.60}RhO_{3-\delta}$ (where 0≤δ≤1.0), $Li_{0.20}Ca_{0.60}SnO_{3-\delta}$ (where 0≤δ≤1.0), $Li_{0.20}Ca_{0.60}VO_{3-\delta}$ (where 0≤δ≤1.0), $Li_{0.20}Ca_{0.60}ReO_{3-\delta}$ (where 0≤δ≤1.0), $Li_{0.20}Ca_{0.60}GeO_{3-\delta}$ (where 0≤δ≤1.0), $Li_{0.20}Ca_{0.60}WO_{3-\delta}$ (where 0≤δ≤1.0), $Li_{0.20}Ca_{0.60}ZrO_{3-\delta}$ (where 0≤δ≤1.0), $Li_{0.20}Ca_{0.60}MoO_{3-\delta}$ (where 0≤δ≤1.0), $Li_{0.20}Ca_{0.60}NbO_{3-\delta}$ (where 0≤δ≤1.0), $Li_{0.20}Ca_{0.60}TaO_{3-\delta}$ (where 0≤δ≤1.0), $Li_{0.20}Ca_{0.60}Hf_{3-\delta}$ (where 0≤δ≤1.0), $Li_{0.20}Ca_{0.60}BiO_{3-\delta}$ (where 0≈δ≤1.0), $Li_{0.25}Ca_{0.50}TiO_{3-\delta}$ (where 0≤δ≤1.0), $Li_{0.25}Ca_{0.50}MnO_{3-\delta}$ (where 0≤δ≤1.0), $Li_{0.25}Ca_{0.50}NiO_{3-\delta}$ (where 0≤δ≤1.0), $Li_{0.25}Ca_{0.50}CrO_{3-\delta}$ (where 0≤δ≤1.0), $Li_{0.25}Ca_{0.50}CoO_{3-\delta}$ (where 0≤δ≤1.0), $Li_{0.25}Ca_{0.50}IrO_{3-\delta}$ (where 0≤δ≤1.0), $Li_{0.25}Ca_{0.50}RuO_{3-\delta}$ (where 0≤δ≤1.0), $Li_{0.25}Ca_{0.50}TiO_{3-\delta}$ (where 0≤δ≤1.0), $Li_{0.25}Ca_{0.50}FeO_{3-\delta}$ (where 0≤δ≤1.0), $Li_{0.25}Ca_{0.50}PdO_{3-\delta}$ (where 0≤δ≤1.0), $Li_{0.25}Ca_{0.50}PbO_{3-\delta}$ (where 0≤δ≤1.0), $Li_{0.25}Ca_{0.50}RhO_{3-\delta}$ (where 0≤δ≤1.0), $Li_{0.25}Ca_{0.50}SnO_{3-\delta}$ (where 0≤δ≤1.0), $Li_{0.25}Ca_{0.50}VO_{3-\delta}$ (where 0≤δ≤1.0), $Li_{0.25}Ca_{0.50}ReO_{3-\delta}$ (where 0≤δ≤1.0), $Li_{0.25}Ca_{0.50}GeO_{3-\delta}$ (where 0≤δ≤1.0), $Li_{0.25}Ca_{0.50}WO_{3-\delta}$ (where 0≤δ≤1.0), $Li_{0.25}Ca_{0.50}ZrO_{3-\delta}$ (where 0≤δ≤1.0), $Li_{0.25}Ca_{0.50}MoO_{3-\delta}$ (where 0≤δ≤1.0), $Li_{0.25}Ca_{0.50}NbO_{3-\delta}$ (where 0≤δ≤1.0), $Li_{0.25}Ca_{0.50}CaO_{3-\delta}$ (where 0≤δ≤1.0), $Li_{0.25}Ca_{0.50}HfO_{3-\delta}$ (where 0≤δ≤1.0), $Li_{0.25}Ca_{0.50}BiO_{3-\delta}$ (where 0≤δ≤1.0), $Li_{0.30}Ca_{0.40}TiO_{3-\delta}$ (where 0≤δ≤1.0), $Li_{0.30}Ca_{0.40}MnO_{3-\delta}$ (where 0≤δ≤1.0), $Li_{0.30}Ca_{0.40}NiO_{3-\delta}$ (where 0≤δ≤1.0), $Li_{0.30}Ca_{0.40}CrO_{3-\delta}$ (where 0≤δ≤1.0), $Li_{0.30}Ca_{0.40}CoO_{3-\delta}$ (where 0≤δ≤1.0), Li$_{0.30}$Ca$_{0.40}$IrO$_{3-δ}$ (where 0≤δ≤1.0), Li$_{0.30}$Ca$_{0.40}$RuO$_{3-δ}$ (where 0≤δ≤1.0), Li$_{0.30}$Ca$_{0.40}$TiO$_{3-δ}$ (where 0≤δ≤1.0), Li$_{0.30}$Ca$_{0.40}$FeO$_{3-δ}$ (where 0≤δ≤1.0), Li$_{0.30}$Ca$_{0.40}$PdO$_{3-δ}$ (where 0≤δ≤1.0), Li$_{0.30}$Ca$_{0.40}$PbO$_{3-δ}$ (where 0≤δ≤1.0), Li$_{0.30}$Ca$_{0.40}$RhO$_{3-δ}$ (where 0≤δ≤1.0), Li$_{0.30}$Ca$_{0.40}$SnO$_{3-δ}$ (where 0≤δ≤1.0), Li$_{0.30}$Ca$_{0.40}$VO$_{3-δ}$ (where 0≤δ≤1.0), Li$_{0.30}$Ca$_{0.40}$ReO$_{3-δ}$ (where 0≤δ≤1.0), Li$_{0.30}$Ca$_{0.40}$GeO$_{3-δ}$ (where 0≤δ≤1.0), Li$_{0.30}$Ca$_{0.40}$WO$_{3-δ}$ (where 0≤δ≤1.0), Li$_{0.30}$Ca$_{0.40}$ZrO$_{3-δ}$ (where 0≤δ≤1.0), Li$_{0.30}$Ca$_{0.40}$MoO$_{3-δ}$ (where 0≤δ≤1.0), Li$_{0.30}$Ca$_{0.40}$NbO$_{3-δ}$ (where 0≤δ≤1.0), Li$_{0.30}$Ca$_{0.40}$TaO$_{3-δ}$ (where 0≤δ≤1.0), Li$_{0.30}$Ca$_{0.40}$HfO$_{3-δ}$ (where 0≤δ≤1.0), Li$_{0.30}$Ca$_{0.40}$BiO$_{3-δ}$ (where 0≤δ≤1.0), Li$_{0.40}$Ca$_{0.20}$TiO$_{3-δ}$ (where 0≤δ≤1.0), Li$_{0.40}$Ca$_{0.20}$MnO$_{3-δ}$ (where 0≤δ≤1.0), Li$_{0.40}$Ca$_{0.20}$NiO$_{3-δ}$ (where 0≤δ≤1.0), Li$_{0.40}$Ca$_{0.20}$CrO$_{3-δ}$ (where 0≤δ≤1.0), Li$_{0.40}$Ca$_{0.20}$CoO$_{3-δ}$ (where 0≤δ≤1.0), Li$_{0.40}$Ca$_{0.20}$IrO$_{3-δ}$ (where 0≤δ≤1.0), Li$_{0.40}$Ca$_{0.20}$RuO$_{3-δ}$ (where 0≤δ≤1.0), Li$_{0.40}$Ca$_{0.20}$TiO$_{3-δ}$ (where 0≤δ≤1.0), Li$_{0.40}$Ca$_{0.20}$FeO$_{3-δ}$ (where 0≤δ≤1.0), Li$_{0.40}$Ca$_{0.20}$PdO$_{3-δ}$ (where 0≤δ≤1.0), Li$_{0.40}$Ca$_{0.20}$PbO$_{3-δ}$ (where 0≤δ≤1.0), Li$_{0.40}$Ca$_{0.20}$RhO$_{3-δ}$ (where 0≤δ≤1.0), Li$_{0.40}$Ca$_{0.20}$SnO$_{3-δ}$ (where 0≤δ≤1.0), Li$_{0.40}$Ca$_{0.20}$VO$_{3-δ}$ (where 0≤δ≤1.0), Li$_{0.40}$Ca$_{0.20}$ReO$_{3-δ}$ (where 0≤δ≤1.0), Li$_{0.40}$Ca$_{0.20}$GeO$_{3-δ}$ (where 0≤δ≤1.0), Li$_{0.40}$Ca$_{0.20}$WO$_{3-δ}$ (where 0≤δ≤1.0), Li$_{0.40}$Ca$_{0.20}$ZrO$_{3-δ}$ (where 0≤δ≤1.0), Li$_{0.40}$Ca$_{0.20}$MoO$_{3-δ}$ (where 0≤δ≤1.0), Li$_{0.40}$Ca$_{0.20}$NbO$_{3-δ}$ (where 0≤δ≤1.0), Li$_{0.40}$Ca$_{0.20}$TaO$_{3-δ}$ (where 0≤δ≤1.0), Li$_{0.40}$Ca$_{0.20}$HfO$_{3-δ}$ (where 0≤δ≤1.0), Li$_{0.40}$Ca$_{0.20}$BiO$_{3-δ}$ (where 0≤δ≤1.0), Li$_{0.10}$Sr$_{0.80}$TiO$_{3-δ}$ (where 0≤δ≤1.0), Li$_{0.10}$Sr$_{0.80}$Mn$_{3-δ}$ (where 0≤δ≤1.0), Li$_{0.10}$Sr$_{0.80}$NiO$_{3-δ}$ (where 0≤δ≤1.0), Li$_{0.10}$Sr$_{0.80}$CrO$_{3-δ}$ (where 0≤δ≤1.0), Li$_{0.10}$Sr$_{0.80}$CoO$_{3-δ}$ (where Li$_{0.10}$Sr$_{0.80}$IrO$_{3-δ}$ (where 0≤δ≤1.0), Li$_{0.10}$Sr$_{0.80}$RuO$_{3-δ}$ (where 0≤δ≤1.0), Li$_{0.10}$Sr$_{0.80}$TiO$_{3-δ}$ (where 0≤δ≤1.0), Li$_{0.10}$Sr$_{0.80}$FeO$_{3-δ}$ (where 0≤δ≤1.0), Li$_{0.10}$Sr$_{0.80}$PdO$_{3-δ}$ (where 0≤δ≤1.0), Li$_{0.10}$Sr$_{0.80}$PbO$_{3-δ}$ (where 0≤δ≤1.0), Li$_{0.10}$Sr$_{0.80}$RhO$_{3-δ}$ (where 0≤δ≤1.0), Li$_{0.10}$Sr$_{0.80}$SnO$_{3-δ}$ (where 0≤δ≤1.0), Li$_{0.10}$Sr$_{0.80}$VO$_{3-δ}$ (where 0≤δ≤1.0), Li$_{0.10}$Sr$_{0.80}$ReO$_{3-δ}$ (where 0≤δ≤1.0), Li$_{0.10}$Sr$_{0.80}$GeO$_{3-δ}$ (where 0≤δ≤1.0), Li$_{0.10}$Sr$_{0.80}$WO$_{3-δ}$ (where 0≤δ≤1.0), Li$_{0.10}$Sr$_{0.80}$ZrO$_{3-δ}$ (where 0≤δ≤1.0), Li$_{0.10}$Sr$_{0.80}$MoO$_{3-δ}$ (where 0≤δ≤1.0), Li$_{0.10}$Sr$_{0.80}$NbO$_{3-δ}$ (where 0≤δ≤1.0), Li$_{0.10}$Sr$_{0.80}$TaO$_{3-δ}$ (where 0≤δ≤1.0), Li$_{0.10}$Sr$_{0.80}$HfO$_{3-δ}$ (where 0≤δ≤1.0), Li$_{0.10}$Sr$_{0.80}$BiO$_{3-δ}$ (where 0≤δ≤1.0), Li$_{0.20}$Sr$_{0.60}$TiO$_{3-δ}$ (where 0≤δ≤1.0), Li$_{0.20}$Sr$_{0.60}$Mn$_{3-δ}$ (where 0≤δ≤1.0), Li$_{0.20}$Sr$_{0.60}$NiO$_{3-δ}$ (where 0≤δ≤1.0), Li$_{0.20}$Sr$_{0.60}$CrO$_{3-δ}$ (where 0≤δ≤1.0), Li$_{0.20}$Sr$_{0.60}$CoO$_{3-δ}$ (where Li$_{0.20}$Sr$_{0.60}$IrO$_{3-δ}$ (where 0≤δ≤1.0), Li$_{0.20}$Sr$_{0.60}$RuO$_{3-δ}$ (where 0≤δ≤1.0), Li$_{0.20}$Sr$_{0.60}$TiO$_{3-δ}$ (where 0≤δ≤1.0), Li$_{0.20}$Sr$_{0.60}$FeO$_{3-δ}$ (where 0≤δ≤1.0), Li$_{0.20}$Sr$_{0.60}$PdO$_{3-δ}$ (where 0≤δ≤1.0), Li$_{0.20}$Sr$_{0.60}$PbO$_{3-δ}$ (where 0≤δ≤1.0), Li$_{0.20}$Sr$_{0.60}$RhO$_{3-δ}$ (where 0≤δ≤1.0), Li$_{0.20}$Sr$_{0.60}$SnO$_{3-δ}$ (where 0≤δ≤1.0), Li$_{0.20}$Sr$_{0.60}$VO$_{3-δ}$ (where 0≤δ≤1.0), Li$_{0.20}$Sr$_{0.60}$ReO$_{3-δ}$ (where 0≤δ≤1.0), Li$_{0.20}$Sr$_{0.60}$GeO$_{3-δ}$ (where 0≤δ≤1.0), Li$_{0.20}$Sr$_{0.60}$WO$_{3-δ}$ (where 0≤δ≤1.0), Li$_{0.20}$Sr$_{0.60}$ZrO$_{3-δ}$ (where 0≤δ≤1.0), Li$_{0.20}$Sr$_{0.60}$MoO$_{3-δ}$ (where 0≤δ≤1.0), Li$_{0.20}$Sr$_{0.60}$NbO$_{3-δ}$ (where 0≤δ≤1.0), Li$_{0.20}$Sr$_{0.60}$TaO$_{3-δ}$ (where 0≤δ≤1.0), Li$_{0.20}$Sr$_{0.60}$HfO$_{3-δ}$ (where 0≤δ≤1.0), Li$_{0.20}$Sr$_{0.60}$BiO$_{3-δ}$ (where 0≤δ≤1.0), Li$_{0.25}$Sr$_{0.50}$TiO$_{3-δ}$ (where 0≤δ≤1.0), Li$_{0.25}$Sr$_{0.50}$MnO$_{3-δ}$ (where 0≤δ≤1.0), Li$_{0.25}$Sr$_{0.50}$NiO$_{3-δ}$ (where 0≤δ≤1.0), Li$_{0.25}$Sr$_{0.50}$CrO$_{3-δ}$ (where 0≤δ≤1.0), Li$_{0.25}$Sr$_{0.50}$CoO$_{3-δ}$ (where Li$_{0.25}$Sr$_{0.50}$IrO$_{3-δ}$ (where 0≤δ≤1.0), Li$_{0.25}$Sr$_{0.50}$RuO$_{3-δ}$ (where 0≤δ≤1.0), Li$_{0.25}$Sr$_{0.50}$TiO$_{3-δ}$ (where 0≤δ≤1.0), Li$_{0.25}$Sr$_{0.50}$FeO$_{3-δ}$ (where 0≤δ≤1.0), Li$_{0.25}$Sr$_{0.50}$PdO$_{3-δ}$ (where 0≤δ≤1.0), Li$_{0.25}$Sr$_{0.50}$PbO$_{3-δ}$ (where 0≤δ≤1.0), Li$_{0.25}$Sr$_{0.50}$RhO$_{3-δ}$ (where 0≤δ≤1.0), Li$_{0.25}$Sr$_{0.50}$SnO$_{3-δ}$ (where 0≤δ≤1.0), Li$_{0.25}$Sr$_{0.50}$VO$_{3-δ}$ (where 0≤δ≤1.0), Li$_{0.25}$Sr$_{0.50}$ReO$_{3-δ}$ (where 0≤δ≤1.0), Li$_{0.25}$Sr$_{0.50}$GeO$_{3-δ}$ (where 0≤δ≤1.0), Li$_{0.25}$Sr$_{0.50}$WO$_{3-δ}$ (where 0≤δ≤1.0), Li$_{0.25}$Sr$_{0.50}$ZrO$_{3-δ}$ (where 0≤δ≤1.0), Li$_{0.25}$Sr$_{0.50}$MoO$_{3-δ}$ (where 0≤δ≤1.0), Li$_{0.25}$Sr$_{0.50}$NbO$_{3-δ}$ (where 0≤δ≤1.0), Li$_{0.25}$Sr$_{0.50}$TaO$_{3-δ}$ (where 0≤δ≤1.0), Li$_{0.25}$Sr$_{0.50}$HfO$_{3-δ}$ (where 0≤δ≤1.0), Li$_{0.25}$Sr$_{0.50}$BiO$_{3-δ}$ (where 0≤δ≤1.0), Li$_{0.30}$Sr$_{0.40}$TiO$_{3-δ}$ (where 0≤δ≤1.0), Li$_{0.30}$Sr$_{0.40}$MnO$_{3-δ}$ (where 0≤δ≤1.0), Li$_{0.30}$Sr$_{0.40}$NO$_{3-δ}$ (where 0≤δ≤1.0), Li$_{0.30}$Sr$_{0.40}$CrO$_{3-δ}$ (where 0≤δ≤1.0), Li$_{0.30}$Sr$_{0.40}$CoO$_{3-δ}$ (where Li$_{0.30}$Sr$_{0.40}$IrO$_{3-δ}$ (where 0≤δ≤1.0), Li$_{0.30}$Sr$_{0.40}$RuO$_{3-δ}$ (where 0≤δ≤1.0), Li$_{0.30}$Sr$_{0.40}$TiO$_{3-δ}$ (where 0≤δ≤1.0), Li$_{0.30}$Sr$_{0.40}$FeO$_{3-δ}$ (where 0≤δ≤1.0), Li$_{0.30}$Sr$_{0.40}$PdO$_{3-δ}$ (where 0≤δ≤1.0), Li$_{0.30}$Sr$_{0.40}$PbO$_{3-δ}$ (where 0≤δ≤1.0), Li$_{0.30}$Sr$_{0.40}$RhO$_{3-δ}$ (where 0≤δ≤1.0), Li$_{0.30}$Sr$_{0.40}$SnO$_{3-δ}$ (where 0≤δ≤1.0), Li$_{0.30}$Sr$_{0.40}$VO$_{3-δ}$ (where 0≤δ≤1.0), Li$_{0.30}$Sr$_{0.40}$ReO$_{3-δ}$ (where 0≤δ≤1.0), Li$_{0.30}$Sr$_{0.40}$GeO$_{3-δ}$ (where 0≤δ≤1.0), Li$_{0.30}$Sr$_{0.40}$WO$_{3-δ}$ (where 0≤δ≤1.0), Li$_{0.30}$Sr$_{0.40}$ZrO$_{3-δ}$ (where 0≤δ≤1.0), Li$_{0.30}$Sr$_{0.40}$MoO$_{3-δ}$ (where 0≤δ≤1.0), Li$_{0.30}$Sr$_{0.40}$NbO$_{3-δ}$ (where 0≤δ≤1.0), Li$_{0.30}$Sr$_{0.40}$TaO$_{3-δ}$ (where 0≤δ≤1.0), Li$_{0.30}$Sr$_{0.40}$HfO$_{3-δ}$ (where 0≤δ≤1.0), Li$_{0.30}$Sr$_{0.40}$BiO$_{3-δ}$ (where 0≤δ≤1.0), Li$_{0.40}$Sr$_{0.20}$TiO$_{3-δ}$ (where 0≤δ≤1.0), Li$_{0.40}$Sr$_{0.20}$MnO$_{3-δ}$ (where 0≤δ≤1.0), Li$_{0.40}$Sr$_{0.20}$NiO$_{3-δ}$ (where 0≤δ≤1.0), Li$_{0.40}$Sr$_{0.20}$CrO$_{3-δ}$ (where 0≤δ≤1.0), Li$_{0.40}$Sr$_{0.20}$CoO$_{3-δ}$ (where Li$_{0.40}$Sr$_{0.20}$IrO$_{3-δ}$ (where 0≤δ≤1.0), Li$_{0.40}$Sr$_{0.20}$RuO$_{3-δ}$ (where 0≤δ≤1.0), Li$_{0.40}$Sr$_{0.20}$TiO$_{3-δ}$ (where 0≤δ≤1.0), Li$_{0.40}$Sr$_{0.20}$FeO$_{3-δ}$ (where 0≤δ≤1.0), Li$_{0.40}$Sr$_{0.20}$PdO$_{3-δ}$ (where 0≤δ≤1.0), Li$_{0.40}$Sr$_{0.20}$PbO$_{3-δ}$ (where 0≤δ≤1.0), Li$_{0.40}$Sr$_{0.20}$RhO$_{3-δ}$ (where 0≤δ≤1.0), Li$_{0.40}$Sr$_{0.20}$SnO$_{3-δ}$ (where 0≤δ≤1.0), Li$_{0.40}$Sr$_{0.20}$VO$_{3-δ}$ (where 0≤δ≤1.0), Li$_{0.40}$Sr$_{0.20}$ReO$_{3-δ}$ (where 0≤δ≤1.0), Li$_{0.40}$Sr$_{0.20}$GeO$_{3-δ}$ (where 0≤δ≤1.0), Li$_{0.40}$Sr$_{0.20}$WO$_{3-δ}$ (where 0≤δ≤1.0), Li$_{0.40}$Sr$_{0.20}$ZrO$_{3-δ}$ (where 0≤δ≤1.0), Li$_{0.40}$Sr$_{0.20}$MoO$_{3-δ}$ (where 0≤δ≤1.0), Li$_{0.20}$Sr$_{0.20}$NbO$_{3-δ}$ (where 0≤δ≤1.0), Li$_{0.40}$Sr$_{0.20}$Te$_{3-δ}$ (where 0≤δ≤1.0), Li$_{0.40}$Sr$_{0.20}$HfO$_{3-δ}$ (where 0≤δ≤1.0), Li$_{0.40}$Sr$_{0.20}$BiO$_{3-δ}$ (where 0≤δ≤1.0), Li$_{0.10}$Ba$_{0.80}$TiO$_{3-δ}$ (where 0≤δ≤1.0), Li$_{0.10}$Ba$_{0.80}$MnO$_{3-δ}$ (where 0≤δ≤1.0), Li$_{0.10}$Ba$_{0.80}$NiO$_{3-δ}$ (where 0≤δ≤1.0), Li$_{0.10}$Ba$_{0.80}$CrO$_{3-δ}$ (where 0≤δ≤1.0), Li$_{0.10}$Ba$_{0.80}$CoO$_{3-δ}$ (where 0≤δ≤1.0), Li$_{0.10}$Ba$_{0.80}$IrO$_{3-δ}$ (where 0≤δ≤1.0), Li$_{0.10}$Ba$_{0.80}$RuO$_{3-δ}$ (where 0≤δ≤1.0), Li$_{0.10}$Ba$_{0.80}$TiO$_{3-δ}$ (where 0≤δ≤1.0), Li$_{0.10}$Ba$_{0.80}$FeO$_{3-δ}$ (where 0≤δ≤1.0), Li$_{0.10}$Ba$_{0.80}$PdO$_{3-δ}$ (where 0≤δ≤1.0), Li$_{0.10}$Ba$_{0.80}$PbO$_{3-δ}$ (where 0≤δ≤1.0), Li$_{0.10}$Ba$_{0.80}$RhO$_{3-δ}$ (where 0≤δ≤1.0), Li$_{0.10}$Ba$_{0.80}$SnO$_{3-δ}$ (where 0≤δ≤1.0), Li$_{0.10}$Ba$_{0.80}$VO$_{3-δ}$ (where 0≤δ≤1.0), Li$_{0.10}$Ba$_{0.80}$ReO$_{3-δ}$ (where 0≤δ≤1.0), Li$_{0.10}$Ba$_{0.80}$GeO$_{3-δ}$ (where 0≤δ≤1.0), Li$_{0.10}$Ba$_{0.80}$WO$_{3-δ}$ (where 0≤δ≤1.0), Li$_{0.10}$Ba$_{0.80}$ZrO$_{3-δ}$ (where 0≤δ≤1.0), Li$_{0.10}$Ba$_{0.80}$MoO$_{3-δ}$ (where 0≤δ≤1.0), Li$_{0.10}$Ba$_{0.80}$NbO$_{3-δ}$ (where 0≤δ≤1.0), Li$_{0.10}$Ba$_{0.80}$TaO$_{3-δ}$ (where 0≤δ≤1.0), Li$_{0.10}$Ba$_{0.80}$HfO$_{3-δ}$ (where 0≤δ≤1.0), Li$_{0.10}$Ba$_{0.80}$BiO$_{3-δ}$ (where 0≤δ≤1.0), Li$_{0.20}$Ba$_{0.60}$TiO$_{3-δ}$ (where 0≤δ≤1.0), Li$_{0.20}$Ba$_{0.60}$MnO$_{3-δ}$ (where 0≤δ≤1.0), Li$_{0.20}$Ba$_{0.60}$NiO$_{3-δ}$ (where 0≤δ≤1.0), Li$_{0.20}$Ba$_{0.60}$CrO$_{3-δ}$ (where 0≤δ≤1.0), Li$_{0.20}$Ba$_{0.60}$CoO$_{3-δ}$ (where 0≤δ≤1.0), Li$_{0.20}$Ba$_{0.60}$IrO$_{3-δ}$ (where 0≤δ≤1.0), Li$_{0.20}$Ba$_{0.60}$RuO$_{3-δ}$ (where 0≤δ≤1.0), Li$_{0.20}$Ba$_{0.60}$TiO$_{3-δ}$ (where 0≤δ≤1.0), Li$_{0.20}$Ba$_{0.60}$FeO$_{3-δ}$ (where 0≤δ≤1.0), Li$_{0.20}$Ba$_{0.60}$PdO$_{3-δ}$ (where 0≤δ≤1.0), Li$_{0.20}$Ba$_{0.60}$PbO$_{3-δ}$ (where 0≤δ≤1.0), Li$_{0.20}$Ba$_{0.60}$RhO$_{3-δ}$ (where 0≤δ≤1.0), Li$_{0.20}$Ba$_{0.60}$SnO$_{3-δ}$ (where 0≤δ≤1.0), Li$_{0.20}$Ba$_{0.60}$VO$_{3-δ}$ (where $0 \leq \delta \leq 1.0$), $Li_{0.20}Ba_{0.60}ReO_{3-\delta}$ (where $0 \leq \delta \leq 1.0$), $Li_{0.20}Ba_{0.60}GeO_{3-\delta}$ (where $0 \leq \delta \leq 1.0$), $Li_{0.20}Ba_{0.60}WO_{3-\delta}$ (where $0 \leq \delta \leq 1.0$), $Li_{0.20}Ba_{0.60}ZrO_{3-\delta}$ (where $0 \leq \delta \leq 1.0$), $Li_{0.20}Ba_{0.60}MoO_{3-\delta}$ (where $0 \leq \delta \leq 1.0$), $Li_{0.20}Ba_{0.60}NbO_{3-\delta}$ (where $0 \leq \delta \leq 1.0$), $Li_{0.20}Ba_{0.60}TaO_{3-\delta}$ (where $0 \leq \delta \leq 1.0$), $Li_{0.20}Ba_{0.60}HfO_{3-\delta}$ (where $0 \leq \delta \leq 1.0$), $Li_{0.20}Ba_{0.60}BiO_{3-\delta}$ (where $0 \leq \delta \leq 1.0$), $Li_{0.25}Ba_{0.50}TiO_{3-\delta}$ (where $0 \leq \delta \leq 1.0$), $Li_{0.25}Ba_{0.50}Mn_{3-\delta}$ (where $0 \leq \delta \leq 1.0$), $Li_{0.25}Ba_{0.50}NiO_{3-\delta}$ (where $0 \leq \delta \leq 1.0$), $Li_{0.25}Ba_{0.50}CrO_{3-\delta}$ (where $0 \leq \delta \leq 1.0$), $Li_{0.25}Ba_{0.50}CoO_{3-\delta}$ (where $0 \leq \delta \leq 1.0$), $Li_{0.25}Ba_{0.50}IrO_{3-\delta}$ (where $0 \leq \delta \leq 1.0$), $Li_{0.25}Ba_{0.50}RuO_{3-\delta}$ (where $0 \leq \delta \leq 1.0$), $Li_{0.25}Ba_{0.50}TiO_{3-\delta}$ (where $0 \leq \delta \leq 1.0$), $Li_{0.25}Ba_{0.50}FeO_{3-\delta}$ (where $0 \leq \delta \leq 1.0$), $Li_{0.25}Ba_{0.50}PdO_{3-\delta}$ (where $0 \leq \delta \leq 1.0$), $Li_{0.25}Ba_{0.50}PbO_{3-\delta}$ (where $0 \leq \delta \leq 1.0$), $Li_{0.25}Ba_{0.50}RhO_{3-\delta}$ (where $0 \leq \delta \leq 1.0$), $Li_{0.25}Ba_{0.50}SnO_{3-\delta}$ (where $0 \leq \delta \leq 1.0$), $Li_{0.25}Ba_{0.50}VO_{3-\delta}$ (where $0 \leq \delta \leq 1.0$), $Li_{0.25}Ba_{0.50}ReO_{3-\delta}$ (where $0 \leq \delta \leq 1.0$), $Li_{0.25}Ba_{0.50}GeO_{3-\delta}$ (where $0 \leq \delta \leq 1.0$), $Li_{0.25}Ba_{0.50}WO_{3-\delta}$ (where $0 \leq \delta \leq 1.0$), $Li_{0.25}Ba_{0.50}ZrO_{3-\delta}$ (where $0 \leq \delta \leq 1.0$), $Li_{0.25}Ba_{0.50}MoO_{3-\delta}$ (where $0 \leq \delta \leq 1.0$), $Li_{0.25}Ba_{0.50}NbO_{3-\delta}$ (where $0 \leq \delta \leq 1.0$), $Li_{0.25}Ba_{0.50}TaO_{3-\delta}$ (where $0 \leq \delta \leq 1.0$), $Li_{0.25}Ba_{0.50}HfO_{3}$, $Li_{0.25}Ba_{0.50}BiO_{3-\delta}$ (where $Li_{0.30}Ba_{0.40}TiO_{3-\delta}$ (where $0 \leq \delta \leq 1.0$), $Li_{0.30}Ba_{0.40}MnO_{3-\delta}$ (where $0 \leq \delta \leq 1.0$), $Li_{0.30}Ba_{0.40}NiO_{3-\delta}$ (where $0 \leq \delta \leq 1.0$), $Li_{0.30}Ba_{0.40}CrO_{3-\delta}$ (where $0 \leq \delta \leq 1.0$), $Li_{0.30}Ba_{0.40}CoO_{3-\delta}$ (where $0 \leq \delta \leq 1.0$), $Li_{0.30}Ba_{0.40}IrO_{3-\delta}$ (where $0 \leq \delta \leq 1.0$), $Li_{0.30}Ba_{0.40}RuO_{3-\delta}$ (where $0 \leq \delta \leq 1.0$), $Li_{0.30}Ba_{0.40}TiO_{3-\delta}$ (where $0 \leq \delta \leq 1.0$), $Li_{0.30}Ba_{0.40}FeO_{3-\delta}$ (where $0 \leq \delta \leq 1.0$), $Li_{0.30}Ba_{0.40}PdO_{3-\delta}$ (where $0 \leq \delta \leq 1.0$), $Li_{0.30}Ba_{0.40}PbO_{3-\delta}$ (where $0 \leq \delta \leq 1.0$), $Li_{0.30}Ba_{0.40}RhO_{3-\delta}$ (where $0 \leq \delta \leq 1.0$), $Li_{0.30}Ba_{0.40}SnO_{3-\delta}$ (where $0 \leq \delta \leq 1.0$), $Li_{0.30}Ba_{0.40}VO_{3-\delta}$ (where $0 \leq \delta \leq 1.0$), $Li_{0.30}Ba_{0.40}ReO_{3-\delta}$ (where $0 \leq \delta \leq 1.0$), $Li_{0.30}Ba_{0.40}GeO_{3-\delta}$ (where $0 \leq \delta \leq 1.0$), $Li_{0.30}Ba_{0.40}WO_{3-\delta}$ (where $0 \leq \delta \leq 1.0$), $Li_{0.30}Ba_{0.40}ZrO_{3-\delta}$ (where $0 \leq \delta \leq 1.0$), $Li_{0.30}Ba_{0.40}MoO_{3-\delta}$ (where $0 \leq \delta \leq 1.0$), $Li_{0.30}Ba_{0.40}NbO_{3-\delta}$ (where $0 \leq \delta \leq 1.0$), $Li_{0.30}Ba_{0.40}TaO_{3-\delta}$ (where $0 \leq \delta \leq 1.0$), $Li_{0.30}Ba_{0.40}HfO_{3-\delta}$ (where $0 \leq \delta \leq 1.0$), $Li_{0.30}Ba_{0.40}BiO_{3-\delta}$ (where $0 \leq \delta \leq 1.0$), $Li_{0.40}Ba_{0.20}TiO_{3-\delta}$ (where $0 \leq \delta \leq 1.0$), $Li_{0.40}Ba_{0.20}MnO_{3-\delta}$ (where $0 \leq \delta \leq 1.0$), $Li_{0.40}Ba_{0.20}NiO_{3-\delta}$ (where $0 \leq \delta \leq 1.0$), $Li_{0.40}Ba_{0.20}CrO_{3-\delta}$ (where $0 \leq \delta \leq 1.0$), $Li_{0.40}Ba_{0.20}CoO_{3-\delta}$ (where $0 \leq \delta \leq 1.0$), $Li_{0.40}Ba_{0.20}IrO_{3-\delta}$ (where $0 \leq \delta \leq 1.0$), $Li_{0.40}Ba_{0.20}RuO_{3-\delta}$ (where $0 \leq \delta \leq 1.0$), $Li_{0.40}Ba_{0.20}TiO_{3-\delta}$ (where $0 \leq \delta \leq 1.0$), $Li_{0.40}Ba_{0.20}FeO_{3-\delta}$ (where $0 \leq \delta \leq 1.0$), $Li_{0.40}Ba_{0.20}PdO_{3-\delta}$ (where $0 \leq \delta \leq 1.0$), $Li_{0.40}Ba_{0.20}PbO_{3-\delta}$ (where $0 \leq \delta \leq 1.0$), $Li_{0.40}Ba_{0.20}RhO_{3-\delta}$ (where $0 \leq \delta \leq 1.0$), $Li_{0.40}Ba_{0.20}SnO_{3-\delta}$ (where $0 \leq \delta \leq 1.0$), $Li_{0.40}Ba_{0.20}VO_{3-\delta}$ (where $0 \leq \delta \leq 1.0$), $Li_{0.40}Ba_{0.20}ReO_{3-\delta}$ (where $0 \leq \delta \leq 1.0$), $Li_{0.40}Ba_{0.20}GeO_{3-\delta}$ (where $0 \leq \delta \leq 1.0$), $Li_{0.40}Ba_{0.20}WO_{3-\delta}$ (where $0 \leq \delta \leq 1.0$), $Li_{0.40}Ba_{0.20}ZrO_{3-\delta}$ (where $0 \leq \delta \leq 1.0$), $Li_{0.40}Ba_{0.20}MoO_{3-\delta}$ (where $0 \leq \delta \leq 1.0$), $Li_{0.40}Ba_{0.20}NbO_{3-\delta}$ (where $0 \leq \delta \leq 1.0$), $Li_{0.40}Ba_{0.20}TaO_{3-\delta}$ (where $0 \leq \delta \leq 1.0$), $Li_{0.40}Ba_{0.20}HfO_{3-\delta}$ (where $0 \leq \delta \leq 1.0$), $Li_{0.40}Ba_{0.20}BiO_{3-\delta}$ (where $0 \leq \delta \leq 1.0$), $Li_{0.25}La_{0.50}TiO_{3-\delta}$ (where $0 \leq \delta \leq 1.0$), $Li_{0.25}La_{0.50}MnO_{3-\delta}$ (where $0 \leq \delta \leq 1.0$), $Li_{0.25}La_{0.50}NiO_{3-\delta}$ (where $0 \leq \delta \leq 1.0$), $Li_{0.25}La_{0.50}CrO_{3-\delta}$ (where $0 \leq \delta \leq 1.0$), $Li_{0.25}La_{0.50}CoO_{3-\delta}$ (where $0 \leq \delta \leq 1.0$), $Li_{0.25}La_{0.50}IrO_{3-\delta}$ (where $0 \leq \delta \leq 1.0$), $Li_{0.25}La_{0.50}RuO_{3-\delta}$ (where $0 \leq \delta \leq 1.0$), $Li_{0.25}La_{0.50}TiO_{3-\delta}$ (where $0 \leq \delta \leq 1.0$), $Li_{0.25}La_{0.50}FeO_{3-\delta}$ (where $0 \leq \delta \leq 1.0$), $Li_{0.25}La_{0.50}PdO_{3-\delta}$ (where $0 \leq \delta \leq 1.0$), $Li_{0.25}La_{0.50}PbO_{3-\delta}$ (where $0 \leq \delta \leq 1.0$), $Li_{0.25}La_{0.50}RhO_{3-\delta}$ (where $0 \leq \delta \leq 1.0$), $Li_{0.25}La_{0.50}SnO_{3-\delta}$ (where $0 \leq \delta \leq 1.0$), $Li_{0.25}La_{0.50}VO_{3-\delta}$ (where $0 \leq \delta \leq 1.0$), $Li_{0.25}La_{0.50}ReO_{3-\delta}$ (where $0 \leq \delta \leq 1.0$), $Li_{0.25}La_{0.50}GeO_{3-\delta}$ (where $0 \leq \delta \leq 1.0$), $Li_{0.25}La_{0.50}WO_{3-\delta}$ (where $0 \leq \delta \leq 1.0$), $Li_{0.25}La_{0.50}ZrO_{3-\delta}$ (where $0 \leq \delta \leq 1.0$), $Li_{0.25}La_{0.50}MoO_{3-\delta}$ (where $0 \leq \delta \leq 1.0$), $Li_{0.25}La_{0.50}NbO_{3-\delta}$ (where $0 \leq \delta \leq 1.0$), $Li_{0.25}La_{0.50}TaO_{3-\delta}$ (where $0 \leq \delta \leq 1.0$), $Li_{0.25}La_{0.50}HfO_{3-\delta}$ (where $0 \leq \delta \leq 1.0$), $Li_{0.25}La_{0.50}BiO_{3-\delta}$ (where $0 \leq \delta \leq 1.0$), $Li_{0.05}La_{0.82}Ti_{0.70}O_{3-\delta}$ (where $0 \leq \delta \leq 1.0$), $Li_{0.05}La_{0.82}Mn_{0.70}O_{3-\delta}$ (where $0 \leq \delta \leq 1.0$), $Li_{0.10}La_{0.80}Mn_{0.70}O_{3-\delta}$ (where $0 \leq \delta \leq 1.0$), $Li_{0.20}La_{0.77}Mn_{0.70}O_{3-\delta}$ (where $0 \leq \delta \leq 1.0$), $Li_{0.05}La_{0.82}Nb_{0.70}O_{3-\delta}$ (where $0 \leq \delta \leq 1.0$), $Li_{0.10}La_{0.80}Nb_{0.70}O_{3-\delta}$ (where $0 \leq \delta \leq 1.0$), $Li_{0.20}La_{0.77}Nb_{0.70}O_{3-\delta}$ (where $0 \leq \delta \leq 1.0$), $Li_{0.05}La_{0.82}Ta_{0.70}O_{3-\delta}$ (where $0 \leq \delta \leq 1.0$), $Li_{0.10}La_{0.80}Ta_{0.70}O_{3-\delta}$ (where $0 \leq \delta \leq 1.0$), $Li_{0.20}La_{0.77}Ta_{0.70}O_{3-\delta}$ (where $0 \leq \delta \leq 1.0$), $Li_{0.05}La_{0.82}V_{0.70}O_{3-\delta}$ (where $0 \leq \delta \leq 1.0$), $Li_{0.10}La_{0.80}V_{0.70}O_{3-\delta}$ (where $0 \leq \delta \leq 1.0$), $Li_{0.20}La_{0.77}V_{0.70}O_{3-\delta}$ (where $0 \leq \delta \leq 1.0$), $Li_{0.05}La_{0.82}Bi_{0.70}O_{3-\delta}$ (where $0 \leq \delta \leq 1.0$), $Li_{0.10}La_{0.80}Bi_{0.70}O_{3-\delta}$ (where $0 \leq \delta \leq 1.0$), $Li_{0.20}La_{0.77}Bi_{0.70}O_{3-\delta}$ (where $0 \leq \delta \leq 1.0$), $Li_{0.05}La_{0.82}Mo_{0.70}O_{3-\delta}$ (where $0 \leq \delta \leq 1.0$), $Li_{0.10}La_{0.80}Mo_{0.70}O_{3-\delta}$ (where $0 \leq \delta \leq 1.0$), $Li_{0.20}La_{0.77}Mo_{0.70}O_{3-\delta}$ (where $0 \leq \delta \leq 1.0$), $Li_{0.05}La_{0.82}Bi_{0.70}O_{3-\delta}$ (where $0 \leq \delta \leq 1.0$), $Li_{0.10}La_{0.80}Bi_{0.70}O_{3-\delta}$ (where $0 \leq \delta \leq 1.0$), $Li_{0.20}La_{0.77}Bi_{0.70}O_{3-\delta}$ (where $0 \leq \delta \leq 1.0$), $Li_{0.05}La_{0.82}Cr_{0.70}O_{3-\delta}$ (where $0 \leq \delta \leq 1.0$), $Li_{0.10}La_{0.80}Cr_{0.70}O_{3-\delta}$ (where $0 \leq \delta \leq 1.0$), or $Li_{0.20}La_{0.77}Cr_{0.70}O_{3-\delta}$ (where $0 \leq \delta \leq 1.0$).

The perovskite compound may be, for example, $Li_{0.31}La_{0.56}TiO_3$, $Li_{0.34}La_{0.55}RuO_3$, $Li_{0.2}Ca_{0.6}Mn_{0.5}Ni_{0.5}O_3$, $Li_{0.34}La_{0.55}RuO_{3-\delta}$, or $Li_{0.2}Ca_{0.6}Mn_{0.5}Ni_{0.5}O_{3-\delta}$, but embodiments are not limited thereto, and any suitable material that is a perovskite compound including lithium and provides an electronic conductivity and an ion conductivity at the same time may be used.

At a temperature of 25° C., the perovskite compound may have, for example, an electron conductivity of about $1 \times 10^{-6}$ S/cm or more and an ion conductivity of about $1 \times 10^{-7}$ S/cm or more.

At a temperature of 25° C., the perovskite compound may have, for example, an electronic conductivity of about $5 \times 10^{-6}$ S/cm or more, about $1 \times 10^{-5}$ S/cm or more, about $5 \times 10^{-5}$ S/cm or more, about $1 \times 10^{-4}$ S/cm or more, about $5 \times 10^{-4}$ S/cm or more, about $1 \times 10^{-3}$ S/cm or more, about $5 \times 10^{-3}$ S/cm or more, about $1 \times 10^{-2}$ S/cm or more, about $5 \times 10^{-2}$ S/cm or more, or about $1 \times 10^{-1}$ S/cm or more. At a temperature of 25° C., the perovskite compound may have, for example, an electronic conductivity of about $1 \times 10^{-6}$ S/cm to about $1 \times 10^{1}$ S/cm, about $2 \times 10^{-6}$ S/cm to about $1 \times 10^{1}$ S/cm, about $2 \times 10^{-6}$ S/cm to about 5 S/cm, about $4 \times 10^{-6}$ S/cm to about 5 S/cm, about $4 \times 10^{-6}$ S/cm to about 1 S/cm, about $5 \times 10^{-6}$ S/cm to about 1 S/cm, about $1 \times 10^{-5}$ S/cm to about 1 S/cm, about $2 \times 10^{-5}$ S/cm to about 1 S/cm, about $4 \times 10^{-5}$ S/cm to about 1 S/cm, about $5 \times 10^{-5}$ S/cm to about 1 S/cm, about $1 \times 10^{-4}$ S/cm to about 1 S/cm, about $2 \times 10^{-4}$ S/cm to about 1 S/cm, about $2 \times 10^{-4}$ S/cm to about $5 \times 10^{-1}$ S/cm, or about $2 \times 10^{-4}$ S/cm to about $1 \times 10^{-1}$ S/cm. When the perovskite compound has an electronic conductivity in these ranges, an internal resistance of a cathode and a battery including the perovskite compound may be decreased. As a result, cycle characteristics of the battery may improve.

At a temperature of 25° C., the perovskite compound may have, for example, an ion conductivity of about $5 \times 10^{-7}$ S/cm or more, about $1 \times 10^{-6}$ S/cm or more, about $5 \times 10^{-6}$ S/cm or more, about $1 \times 10^{-5}$ S/cm or more, about $5 \times 10^{-5}$ S/cm or more, about $1 \times 10^{-4}$ S/cm or more, about $5 \times 10^{-4}$ S/cm or more, about $1\times10^{-3}$ S/cm or more, about $5\times10^{-3}$ S/cm or more, or about $1\times10^{-2}$ S/cm or more. At a temperature of 25° C., the perovskite compound may have, for example, an ionic conductivity of about $1\times10^{-7}$ S/cm to about $1\times10^{1}$ S/cm, about $2\times10^{-7}$ S/cm to about $1\times10^{1}$ S/cm, about $2\times10^{-6}$ S/cm to about 5 S/cm, about $4\times10^{-6}$ S/cm to about 5 S/cm, about $4\times10^{-6}$ S/cm to about 1 S/cm, about $5\times10^{-6}$ S/cm to about 1 S/cm, about $1\times10^{-5}$ S/cm to about 1 S/cm, about $2\times10^{-5}$ S/cm to about 1 S/cm, about $4\times10^{-5}$ S/cm to about 1 S/cm, about $5\times10^{-5}$ S/cm to about 1 S/cm, about $1\times10^{-4}$ S/cm to about 1 S/cm, about $2\times10^{-4}$ S/cm to about 1 S/cm, about $2\times10^{-4}$ S/cm to about $5\times10^{-1}$ S/cm, or about $2\times10^{-4}$ S/cm to about $1\times10^{-1}$ S/cm. When the perovskite compound has an ionic conductivity in these ranges, an internal resistance of a cathode and a battery including the perovskite compound may further decrease. As a result, cycle characteristics of the battery may improve.

The lithium-containing metal oxide may include, for example, a spinel compound represented by one of Formulae 2 and 3:

$$Li_{1+x}M_{2\pm y}O_{4-\delta 1} \qquad \text{Formula 2}$$

$$Li_{4\pm a}M_{5\pm b}O_{12-\delta 2} \qquad \text{Formula 3}$$

In Formulae 2 and 3, each M may independently be at least one of a Group 2 to Group 16 element; and $0<x<1$, $0<y<1$, $0\le\delta1\le1$, $0<a<2$, $0.3<b<5$, and $0\le\delta2\le3$.

The spinel compound may be a compound having a spinel crystal structure or a spinel-like crystal structure.

For example, in Formulae 2 and 3, each M may independently be at least one of Ni, Pd, Pb, Fe, Ir, Co, Rh, Mn, Cr, Ru, Re, Sn, V, Ge, W, Zr, Ti, Mo, Hf, U, Nb, Th, Ta, Bi, Li, H, Na, K, Rb, Cs, Ca, Sr, Ba, Y, La, Ce, Pr, Nd, Pm, Sm, Gd, Tb, Dy, Ho, Er, Mg, Al, Si, Sc, Zn, Ga, Rb, Ag, Cd, In, Sb, Pt, Au, or Pb; and $0<x<1$, $0<y<1$, $0\le\delta1$, $0<a<2$, $0.3<b<5$, and $0\le\delta2\le3$.

The spinel compound may be, for example, a compound represented by Formula 4.

$$Li_{4\pm a}Ti_{5-b}M'_{c}O_{12-\delta} \qquad \text{Formula 4}$$

In Formula 4, M' may be at least one of Cr, Mg, Ca, Sr, Sc, Y, La, Ce, Pr, Nd, Sm, Eu, Gd, Tb, Dy, Ho, Er, Tm, Yb, Lu, Zr, Hf, V, Nb, Ta, Mo, W, Mn, Tc, Re, Fe, Ru, Os, Co, Rh, Ir, Ni, Pd, Pt, Cu, Ag, Au, Zn, Cd, Hg, Al, Ga, In, Tl, Ge, Sn, Pb, Sb, Bi, Po, As, Se, or Te, and $0.3<a<2$, $0.3<b<5$, $0.3<c<2$, and $0\le\delta\le3$. For example, $0\le\delta\le2.5$, $0\le\delta1\le1$, $0<a<2$, $0.3<b<5$, and $0\le\delta\le0.5$.

The spinel compound of Formula 4 may have, for example, a ratio ($I_a/I_b$) of a peak intensity ($I_a$) with respect to the (111) crystal face at a diffraction angle $2\theta=18°\pm2.5°$ to a peak intensity (Ib) at a diffraction angle $2\theta=23.5°\pm2.5°$ in the XRD spectrum of about 1 or less, about 0.9 or less, about 0.8 or less, about 0.7 or less, about 0.6 or less, about 0.5 or less, or about 0.4 or less. When the spinel compound has the foregoing ratio of peak intensities, an electronic conductivity and an ionic conductivity of the spinel compound may further improve.

The spinel compound of Formula 4 may further include, for example, other phases in addition to a phase having a spinel-like crystal structure. For example, the mixed conductor includes a phase having a spinel-like crystal structure that belongs to the Fd-3m space group and another phase that is at least one of $Li_2TiO_3$, $Gd_2Ti_2O_7$, $GdTiO_3$, $LiNbO_3$, or $Nb_2O_5$ that is different from the phase having a spinel-like crystal structure. When the mixed conductor is polycrystalline including these different phases, an electronic conductivity and an ionic conductivity may improve.

A band gap between a valance band and a conduction band of the spinel compound of Formula 4 may be, for example, about 2 eV or less, about 1.8 eV or less, about 1.6 eV or less, about 1.4 eV or less, or about 1.2 eV or less. When the band gap between the valance band and the conduction band of the mixed conductor is below these limits, electrons may easily migrate from the valance band to the conduction band, and thus an electronic conductivity of the spinel compound may improve.

In the spinel compound of Formula 4, Ti may have, for example, at least one oxidation number of +3 or +4. For example, when Ti in the mixed conductor has a mixed valance state having plurality of different oxidation numbers, a new state density function is added near the Fermi energy ($E_f$), and a band gap between a valance band and a conduction band decreases. As a result, an electronic conductivity of the spinel compound may improve.

In the spinel compound of Formula 4, M' may have, for example, an oxidation number different from at least one oxidation number of Ti. For example, when the mixed conductor additionally includes M' having an oxidation number different from that of Ti, a new state density function is added near the Fermi energy ($E_f$), and thus a band gap between a valence band and a conduction band decreases. As a result, an electronic conductivity of the spinel compound may improve.

When the spinel compound of Formula 4 includes an oxygen vacancy, an ionic conductivity of the spinel compound may improve. For example, when the mixed conductor includes an oxygen vacancy, a location of the state density function moves near to the Fermi energy ($E_f$), and thus a band gap between a valance band and a conduction band decreases. As a result, an electronic conductivity of the spinel compound may improve.

The spinel compound may include, for example, at least one of $Li_{4\pm x}Ti_{5-y}Mg_zO_{12-\delta}$ (where $0.4<x\le1$, $0.4<y\le1$, $0.4<z\le1$, and $0<\delta\le3$), $Li_{4\pm x}Ti_{5-y}Ca_zO_{12-\delta}$ (where $0.4<x\le1$, $0.4<y\le1$, $0.4<z\le1$, and $0<\delta\le3$), $Li_{4\pm x}Ti_{5-y}Sr_zO_{12-\delta}$ (where $0.4<x\le1$, $0.4<y\le1$, $0.4<z\le1$, and $0<\delta\le3$), $Li_{4\pm x}Ti_{5-y}Sc_zO_{12-\delta}$ (where $0.4<x\le1$, $0.4<y\le1$, $0.4<z\le1$, and $0<\delta\le3$), $Li_{4\pm x}Ti_{5-y}Sm_zO_{12-\delta}$ (where $0.4<x\le1$, $0.4<y\le1$, $0.4<z\le1$, and $0<\delta\le3$), $Li_{4\pm x}Ti_{5-y}La_zO_{12-\delta}$ (where $0.4<x\le1$, $0.4<y\le1$, $0.4<z\le1$, and $0<\delta\le3$), $Li_{4\pm x}Ti_{5-y}Ce_zO_{12-\delta}$ (where $0.4<x\le1$, $0.4<y\le1$, $0.4<z\le1$, and $0<\delta\le3$), $Li_{4\pm x}Ti_{5-y}Pr_zO_{12-\delta}$ (where $0.4<x\le1$, $0.4<y\le1$, $0.4<z\le1$, and $0<\delta\le3$), $Li_{4\pm x}Ti_{5-y}Nd_zO_{12-\delta}$ (where $0.4<x\le1$, $0.4<y\le1$, $0.4<z\le1$, and $0<\delta\le3$), $Li_{4\pm x}Ti_{5-y}Sm_zO_{12-\delta}$ (where $0.4<x\le1$, $0.4<y\le1$, $0.4<z\le1$, and $0<\delta\le3$), $Li_{4\pm x}Ti_{5-y}Eu_zO_{12-\delta}$ (where $0.4<x\le1$, $0.4<y\le1$, $0.4<z\le1$, and $0<\delta\le3$), $Li_{4\pm x}Ti_{5-y}Gd_zO_{12-\delta}$ (where $0.4<x\le1$, $0.4<y\le1$, $0.4<z\le1$, and $0<\delta\le3$), $Li_{4\pm x}Ti_{5-y}Tb_zO_{12-\delta}$ (where $0.4<x\le1$, $0.4<y\le1$, $0.4<z\le1$, and $0<\delta\le3$), $Li_{4\pm x}Ti_{5-y}Dy_zO_{12-\delta}$ (where $0.4<x\le1$, $0.4<y\le1$, $0.4<z\le1$, and $0<\delta\le3$), $Li_{4\pm x}Ti_{5-y}Ho_zO_{12-\delta}$ (where $0.4<x\le1$, $0.4<y\le1$, $0.4<z\le1$, and $0<\delta\le3$), $Li_{4\pm x}Ti_{5-y}Er_zO_{12-\delta}$ (where $0.4<x\le1$, $0.4<y\le1$, $0.4<z\le1$, and $0<\delta\le3$), $Li_{4\pm x}Ti_{5-y}Tm_zO_{12-\delta}$ (where $0.4<x\le1$, $0.4<y\le1$, $0.4<z\le1$, and $0<\delta\le3$), $Li_{4\pm x}Ti_{5-y}Yb_zO_{12-\delta}$ (where $0.4<x\le1$, $0.4<y\le1$, $0.4<z\le1$, and $0<\delta\le3$), $Li_{4\pm x}Ti_{5-y}Lu_zO_{12-\delta}$ (where $0.4<x\le1$, $0.4<y\le1$, $0.4<z\le1$, and $0<\delta\le3$), $Li_{4\pm x}Ti_{5-y}Zr_zO_{12-\delta}$ (where $0.4<x\le1$, $0.4<y\le1$, $0.4<z\le1$, and $0<\delta\le3$), $Li_{4\pm x}Ti_{5-y}Hf_zO_{12-\delta}$ (where $0.4<x\le1$, $0.4<y\le1$, $0.4<z\le1$, and $0<\delta\le3$), $Li_{4\pm x}Ti_{5-y}V_zO_{12-\delta}$ (where $0.4<x\le1$, $0.4<y\le1$, $0.4<z\le1$, and $0<\delta\le3$), $Li_{4\pm x}Ti_{5-y}Nb_zO_{12-\delta}$ (where $0.4<x\le1$, $0.4<y\le1$, $0.4<z\le1$, and $0<\delta\le3$), $Li_{4\pm x}Ti_{5-y}Ta_zO_{12-\delta}$ (where $0.4<x\le1$, $0.4<y\le1$, $0.4<z\le1$, and $0<\delta\le3$), $Li_{4\pm x}Ti_{5-y}Mo_zO_{12-\delta}$ (where $0.4<x\le1$, $0.4<y\le1$, $0.4<z\le1$, and $0<\delta\le3$), $Li_{4\pm x}Ti_{5-y}W_zO_{12-\delta}$ (where $0.4<x\le1$, $0.4<y\le1$, $0.4<z\leq1$, and $0<\delta\leq3$), $Li_{4\pm x}Ti_{5-y}Mn_zO_{12-\delta}$ (where $0.4<x\leq1$, $0.4<y\leq1$, $0.4<z\leq1$, and $0<\delta\leq3$), $Li_{4\pm x}Ti_{5-y}Tc_zO_{12-\delta}$ (where $0.4<x\leq1$, $0.4<y\leq1$, $0.4<z\leq1$, and $0<\delta\leq3$), $Li_{4\pm x}Ti_{5-y}Re_zO_{12-\delta}$ (where $0.4<x\leq1$, $0.4<y\leq1$, $0.4<z\leq1$, and $0<\delta\leq3$), $Li_{4\pm x}Ti_{5-y}Fe_zO_{12-\delta}$ (where $0.4<x\leq1$, $0.4<y\leq1$, $0.4<z\leq1$, and $0<\delta\leq3$), $Li_{4\pm x}Ti_{5-y}Ru_zO_{12-\delta}$ (where $0.4<x\leq1$, $0.4<y\leq1$, $0.4<z\leq1$, and $0<\delta\leq3$), $Li_{4\pm x}Ti_{5-y}Os_zO_{12-\delta}$ (where $0.4<x\leq1$, $0.4<y\leq1$, $0.4<z\leq1$, and $0<\delta\leq3$), $Li_{4\pm x}Ti_{5-y}Co_zO_{12-\delta}$ (where $0.4<x\leq1$, $0.4<y\leq1$, $0.4<z\leq1$, and $0<\delta\leq3$), $Li_{4\pm x}Ti_{5-y}Rh_zO_{12-\delta}$ (where $0.4<x\leq1$, $0.4<y\leq1$, $0.4<z\leq1$, and $0<\delta\leq3$), $Li_{4\pm x}Ti_{5-y}Ir_zO_{12-\delta}$ (where $0.4<x\leq1$, $0.4<y\leq1$, $0.4<z\leq1$, and $0<\delta\leq3$), $Li_{4\pm x}Ti_{5-y}Ni_zO_{12-\delta}$ (where $0.4<x\leq1$, $0.4<y\leq1$, $0.4<z\leq1$, and $0<\delta\leq3$), $Li_{4\pm x}Ti_{5-y}Pd_zO_{12-\delta}$ (where $0.4<x\leq1$, $0.4<y\leq1$, $0.4<z\leq1$, and $0<\delta\leq3$), $Li_{4\pm x}Ti_{5-y}Pt_zO_{12-\delta}$ (where $0.4<x\leq1$, $0.4<y\leq1$, $0.4<z\leq1$, and $0<\delta\leq3$), $Li_{4\pm x}Ti_{5-y}Cu_zO_{12-\delta}$ (where $0.4<x\leq1$, $0.4<y\leq1$, $0.4<z\leq1$, and $0<\delta\leq3$), $Li_{4\pm x}Ti_{5-y}Ag_zO_{12-\delta}$ (where $0.4<x\leq1$, $0.4<y\leq1$, $0.4<z\leq1$, and $0<\delta\leq3$), $Li_{4\pm x}Ti_{5-y}Au_zO_{12-\delta}$ (where $0.4<x\leq1$, $0.4<y\leq1$, $0.4<z\leq1$, and $0<\delta\leq3$), $Li_{4\pm x}Ti_{5-y}Zn_zO_{12-\delta}$ (where $0.4<x\leq1$, $0.4<y\leq1$, $0.4<z\leq1$, and $0<\delta\leq3$), $Li_{4\pm x}Ti_{5-y}Cd_zO_{12-\delta}$ (where $0.4<x\leq1$, $0.4<y\leq1$, $0.4<z\leq1$, and $0<\delta\leq3$), $Li_{4\pm x}Ti_{5-y}Hg_zO_{12-\delta}$ (where $0.4<x\leq1$, $0.4<y\leq1$, $0.4<z\leq1$, and $0<\delta\leq3$), $Li_{4\pm x}Ti_{5-y}Al_zO_{12-\delta}$ (where $0.4<x\leq1$, $0.4<y\leq1$, $0.4<z\leq1$, and $0<\delta\leq3$), $Li_{4\pm x}Ti_{5-y}Ga_zO_{12-\delta}$ (where $0.4<x\leq1$, $0.4<y\leq1$, $0.4<z\leq1$, and $0<\delta\leq3$), $Li_{4\pm x}Ti_{5-y}In_zO_{12-\delta}$ (where $0.4<x\leq1$, $0.4<y\leq1$, $0.4<z\leq1$, and $0<\delta\leq3$), $Li_{4\pm x}Ti_{5-y}Ti_zO_{12-\delta}$ (where $0.4<x\leq1$, $0.4<y\leq1$, $0.4<z\leq1$, and $0<\delta\leq3$), $Li_{4\pm x}Ti_{5-y}Ge_zO_{12-\delta}$ (where $0.4<x\leq1$, $0.4<y\leq1$, $0.4<z\leq1$, and $0<\delta\leq3$), $Li_{4\pm x}Ti_{5-y}Sn_zO_{12-\delta}$ (where $0.4<x\leq1$, $0.4<y\leq1$, $0.4<z\leq1$, and $0<\delta\leq3$), $Li_{4\pm x}Ti_{5-y}Pb_zO_{12-\delta}$ (where $0.4<x\leq1$, $0.4<y\leq1$, $0.4<z\leq1$, and $0<\delta\leq3$), $Li_{4\pm x}Ti_{5-y}Sb_zO_{12-\delta}$ (where $0.4<x\leq1$, $0.4<y\leq1$, $0.4<z\leq1$, and $0<\delta\leq3$), $Li_{4\pm x}Ti_{5-y}Bi_zO_{12-\delta}$ (where $0.4<x\leq1$, $0.4<y\leq1$, $0.4<z\leq1$, and $0<\delta\leq3$), $Li_{4\pm x}Ti_{5-y}P_zO_{12-\delta}$ (where $0.4<x\leq1$, $0.4<y\leq1$, $0.4<z\leq1$, and $0<\delta\leq3$), $Li_{4\pm x}Ti_{5-y}As_zO_{12-\delta}$ (where $0.4<x\leq1$, $0.4<y\leq1$, $0.4<z\leq1$, and $0<\delta\leq3$), $Li_{4\pm x}Ti_{5-y}Se_zO_{12-\delta}$ (where $0.4<x\leq1$, $0.4<y\leq1$, $0.4<z\leq1$, and $0<\delta\leq3$), or $Li_{4\pm x}Ti_{5-y}Te_zO_{12-\delta}$ (where $0.4<x\leq1$, $0.4<y\leq1$, $0.4<z\leq1$, and $0<\delta\leq3$).

The spinel compound may be, for example, $LiMn_2O_4$, $LiTiNbO_4$, $Li_4Ti_5O_{12}$, $Li_4Mn_5O_{12}$, or $Li_{4.5}Ti_{4.5}Gd_{0.5}O_{12}$, but embodiments are not limited thereto, and any suitable material that is available as a spinel compound including lithium and provides an electronic conductivity and an ionic conductivity at the same time may be used.

At a temperature of 25° C., the spinel compound may have, for example, an electronic conductivity of about $1\times10^{-6}$ S/cm or more and an ionic conductivity of about $1\times10^{-7}$ S/cm or more.

At a temperature of 25° C., the spinel compound may have, for example, an electronic conductivity of about $5\times10^{-6}$ S/cm or more, about $1\times10^{-5}$ S/cm or more, about $5\times10^{-5}$ S/cm or more, about $1\times10^{-4}$ S/cm or more, about $5\times10^{-4}$ S/cm or more, about $1\times10^{-3}$ S/cm or more, about $5\times10^{-3}$ S/cm or more, about $1\times10^{-2}$ S/cm or more, about $5\times10^{-2}$ S/cm or more, or about $1\times10^{-1}$ S/cm or more. At a temperature of 25° C., the spinel compound may have, for example, an electronic conductivity of about $1\times10^{-6}$ S/cm to about $1\times10^{1}$ S/cm, about $2\times10^{-6}$ S/cm to about $1\times10^{1}$ S/cm, about $2\times10^{-6}$ S/cm to about 5 S/cm, about $4\times10^{-6}$ S/cm to about 5 S/cm, about $4\times10^{-6}$ S/cm to about 1 S/cm, about $5\times10^{-6}$ S/cm to about 1 S/cm, about $1\times10^{-5}$ S/cm to about 1 S/cm, about $2\times10^{-5}$ S/cm to about 1 S/cm, about $4\times10^{-5}$ S/cm to about 1 S/cm, about $5\times10^{-5}$ S/cm to about 1 S/cm, about $1\times10^{-4}$ S/cm to about 1 S/cm, about $2\times10^{-4}$ S/cm to about 1 S/cm, about $1\times10^{-4}$ S/cm, about 1 S/cm, about $2\times10^{-4}$ S/cm to about $5\times10^{-1}$ S/cm, or about $2\times10^{-4}$ S/cm to about $1\times10^{-1}$ S/cm. When the spinel compound has electronic conductivity in these ranges, an internal resistance of a cathode and a battery including the spinel compound may decrease. As a result, cycle characteristics of the battery may improve.

At a temperature of 25° C., the spinel compound may have, for example, an ionic conductivity of about $5.0\times10^{-7}$ S/cm or more, about $1.0\times10^{-6}$ S/cm or more, about $5.0\times10^{-6}$ S/cm or more, about $1.0\times10^{-5}$ S/cm or more, about $5.0\times10^{-5}$ S/cm or more, about $1.0\times10^{-4}$ S/cm or more, about $5.0\times10^{-4}$ S/cm or more, about $1.0\times10^{-3}$ S/cm or more, about $5.0\times10^{-3}$ S/cm or more, or about $1.0\times10^{-2}$ S/cm or more. At a temperature of 25° C., the spinel compound may have, for example, an ionic conductivity of about $1\times10^{-7}$ S/cm to about $1\times10^{1}$ S/cm, about $2\times10^{-7}$ S/cm to about $1\times10^{1}$ S/cm, about $2\times10^{-6}$ S/cm to about 5 S/cm, about $4\times10^{-6}$ S/cm to about 5 S/cm, about $4\times10^{-6}$ S/cm to about 1 S/cm, about $5\times10^{-6}$ S/cm to about 1 S/cm, about $1\times10^{-5}$ S/cm to about 1 S/cm, about $2\times10^{-5}$ S/cm to about 1 S/cm, about $4\times10^{-5}$ S/cm to about 1 S/cm, about $5\times10^{-5}$ S/cm to about 1 S/cm, about $1\times10^{-4}$ S/cm to about 1 S/cm, about $2\times10^{-4}$ S/cm to about 1 S/cm, about $2\times10^{-4}$ S/cm to about $5\times10^{-1}$ S/cm, or about $2\times10^{-4}$ S/cm to about $1\times10^{-1}$ S/cm. When the spinel compound has ionic conductivity in these ranges, an internal resistance of a cathode and a battery including the spinel compound may decrease. As a result, cycle characteristics of the battery may improve.

The lithium-containing metal oxide may include, for example, at least one of a layered compound, a garnet compound, a NASICON compound, a LISICON compound, a phosphate compound, a tavorite compound, a triplite compound, an anti-perovskite compound, a silicate compound, or a borate compound. When the lithium-containing metal oxide includes a compound having these crystal structures, decomposition of the cathode caused by radicals involved in electrochemical reactions may be suppressed.

The lithium-containing metal oxide may include, for example, a layered compound represented by Formula 5:

   Formula 5

In Formula 5, M may be at least one of a Group 2 to Group 16 element; and $0<x<0.5$, $0<y<1$, and $0\leq\delta\leq1$.

The layered compound may be a compound having a layered crystal structure.

The layered compound may be, for example, a compound represented by at least one of $Li_aA_{1-b}B'_bD_2$ (where $0.90\leq a\leq1.8$ and $0\leq b\leq0.5$); $Li_aE_{1-b}B'_bO_{2-c}D_c$ (where $0.90\leq a\leq1.8$, $0\leq b\leq0.5$, and $0\leq c\leq0.05$); $LiE_{2-b}B'_bO_{4-c}D_c$ (where $0\leq b\leq0.5$ and $0\leq c\leq0.05$); $Li_aNi_{a-b-c}Co_bB'_cD_a$ (where $0.90\leq a\leq1.8$, $0\leq b\leq0.5$, $0\leq c\leq0.05$, and $0<a<2$); $Li_aNi_{1-b-c}Co_bB'_cO_{2-\alpha}F'_\alpha$ (where $0.90\leq a\leq1.8$, $0\leq b\leq0.5$, $0\leq c\leq0.05$, and $0<\alpha<2$); $Li_aNi_{1-b-c}Co_bB'_cO_{2-\alpha}F'_2$ (where $0.90\leq a\leq1.8$, $0\leq b\leq0.5$, $0\leq c\leq0.05$, and $0<\alpha<2$); $Li_aNi_{1-b-c}Mn_bB'_cD_a$ (where $0.90\leq a\leq1.8$, $0\leq b\leq0.5$, $0\leq c\leq0.05$, and $0<a<2$); $Li_aNi_{1-b-c}Mn_bB'_cO_{2-\alpha}F'_\alpha$ (where $0.90\leq a\leq1.8$, $0\leq b\leq0.5$, $0\leq c\leq0.05$, and $0<\alpha<2$); $Li_aNi_{1-b-c}Mn_bB'_cO_{2-\alpha}F'_2$ (where $0.90\leq a\leq1.8$, $0\leq b\leq0.5$, $0\leq c\leq0.05$, and $0<\alpha<2$); $Li_aNi_bE_cG_dO_2$ (where $0.90\leq a\leq1.8$, $0\leq b\leq0.9$, $0\leq c\leq0.5$, and $0.001\leq d\leq0.1$); $Li_aNi_bCo_cMn_dGeO_2$ (where $0.90\leq a\leq1.8$, $0\leq b\leq0.9$, $0\leq c\leq0.5$, $0\leq d\leq0.5$, and $0.001\leq e\leq0.1$); $Li_aNiG_bO_2$ (where $0.90\leq a\leq1.8$ and $0.001\leq b\leq0.1$); $Li_aCoG_bO_2$ (where $0.90\leq a\leq1.8$ and $0.001\leq b\leq0.1$); and $Li_aMnG_bO_2$ (where $0.90\leq a\leq1.8$ and $0.001\leq b\leq0.1$).

A is Ni, Co, Mn, or a combination thereof; B' is Al, Ni, Co, Mn, Cr, Fe, Mg, Sr, V, a rare earth element, or a combination thereof; D is O, F, S, P, or a combination thereof; E is Co, Mn, or a combination thereof; F' is F, S, P, or a combination thereof; G is Al, Cr, Mn, Fe, Mg, La, Ce, Sr, V, or a combination thereof.

The layered compound may be, for example, $LiNiO_2$, $LiCoO_2$, $LiMnO_2$, $LiNi_{1-x}Mn_xO_2$ (where $0<x<1$), $LiNi_{1-x-y}Co_xMn_yO_2$ (where $0<x\le0.5$ and $0<y\le0.5$), $LiNi_{0.8}Co_{0.1}Mn_{0.1}O_2$, or $LiNi_{1-x-y}Co_xAl_yO_2$ (where $0<x\le0.5$ and $0<y\le0.5$), but embodiments are not limited thereto, and any suitable material available as a layered compound including lithium may be used.

The lithium-containing metal oxide may include, for example, a NASICON compound represented by Formula 6:

$Li_{1+x}A_xM_{2-x}(XO_4)_3$    Formula 6

In Formula 6, A and M may be each independently at least one of a Group 2 to Group 16 element; X is As, P, Mo, or S, and $0<x<1.0$.

The NASICON compound may be a compound having a NASICON crystal structure or a NASICON-like crystal structure.

The NASICON compound may be, for example, $Li_{1.3}Al_{0.3}Ti_{1.7}(PO_4)_3$, $Li_{1.3}Al_{0.3}Ge_{1.7}(PO_4)_3$, or $Li_{1.3}Al_{0.3}Zr_{1.7}(PO_4)_3$, but embodiments are not limited thereto, and any suitable material available as a NASICON compound including lithium may be used.

The lithium-containing metal oxide may include, for example, a LISICON compound represented by Formula 7:

$Li_{8-c}A_aB'_bO_4$    Formula 7

In Formula 7, A and B' may be each independently at least one of a Group 2 to Group 16 element; $c=ma+nb$, where m is an oxidation number of A, and n is an oxidation number of B; and $0<x<8$, $0<a\le1$, and $0\le b\le1$.

The LISICON compound may be a compound having a LISICON crystal structure of a LISICON-like crystal structure.

The LISICON compound may be, for example, $Li_4SiO_4$, $Li_{3.75}Si_{0.75}P_{0.25}O_4$, $Li_{14}Zn(GeO_4)_4$, $Li_{3.4}V_{0.6}Ge_{0.4}O_4$, or $Li_{3.5}V_{0.5}Ti_{0.5}O_4$, but embodiments are not limited thereto, and any suitable material available as a LISICON compound including lithium may be used.

The lithium-containing metal oxide may include, for example, a garnet compound represented by Formula 8:

$Li_xA_3B'_2O_{12}$    Formula 8

In Formula 8, A and B' may be each independently at least one of a Group 2 to Group 16 element; and $3.0\le x\le7.0$.

The garnet compound may be a compound having a garnet crystal structure or a garnet-like crystal structure.

The garnet compound may be, for example, $Li_3Tb_3Te_2O_{12}$, $Li_{4.22}Al_{0.26}La_3Zr_2WO_{12}$, $Li_5La_3Nb_2O_{12}$, $Li_6BaLa_2Ta_2O_{12}$, or $Li_7La_3Zr_2O_{12}$, but embodiments are not limited thereto, and any suitable material available as a garnet compound including lithium may be used.

The lithium-containing metal oxide may include, for example, a phosphate compound represented by at least one of Formulae 9 or 10:

$Li_{1+x}MPO_4$    Formula 9

$Li_2MP_2O_7$    Formula 10

In Formulae 9 and 10, each M may independently be at least one of a Group 2 to Group 16 element, and $0\le x\le1.0$.

The phosphate compound represented by Formula 9 may be an olivine compound. The olivine compound may be a compound having an olivine crystal structure or an olivine-like crystal structure.

The phosphate compound may be, for example, $LiFePO_4$, $LiMnPO_4$, $LiCoPO_4$, $LiNiPO_4$, $Li_2MnP_2O_7$, or $Li_2FeP_2O_7$, but embodiments are not limited thereto, and any suitable material available as a phosphate compound including lithium may be used.

The lithium-containing metal oxide may include, for example, a tavorite compound or a triplite compound represented by Formula 11:

$Li_{1+x}M(TO_4)X$    Formula 11

In Formula 11, M may be at least one of a Group 2 to Group 16 element; T is P or S; X is F, O, or OH; and $0\le x\le1.0$.

The tavorite compound may be a compound having a tavorite crystal structure or a tavorite-like crystal structure. The triplite compound may be a compound having a triplite crystal structure or a triplite-like crystal structure.

The tavorite or triplite compound may be, for example, $LiVO(PO_4)$, $LiV(PO_4)F$, $LiFe(SO_4)F$, or $Li_2Fe(PO_4)F$, but embodiments are not limited thereto, and any suitable material available as a tavorite or triplite compound including lithium may be used. The tavorite compound and the triplite compound may have the same composition with different crystal structures.

The lithium-containing metal oxide may include, for example, an anti-perovskite compound represented by Formula 12:

$Li_xM_yOA$    Formula 12

In Formula 12, M may be at least one of a Group 2 to Group 16 element; A is F, Cl, Br, I, S, Se, or Te, and $2.0\le x\le3.0$ and $0\le y\le1.0$.

The anti-perovskite compound may be a compound having a perovskite crystal structure or a perovskite-like crystal structure, in which locations of anions and cations are arranged opposite to those of the perovskite compound.

The anti-perovskite compound may be, for example, $Li_3OCl$, $Li_2OHBr$, $Li_2(OH)_{0.9}F_{0.1}Cl$, or $Li_3OCl_{0.5}Br_{0.5}$, but embodiments are not limited thereto, and any suitable material available as an anti-perovskite including lithium may be used.

The lithium-containing metal oxide may include, for example, at least one of a silicate compound represented by Formula 13:

$Li_{2+x}MSiO_4$    Formula 13

In Formula 13, M may be at least one of a Group 2 to Group 16 element; and $0\le x\le1.0$.

The silicate compound may be a crystalline compound including anions, e.g., $SiO_4^{4-}$.

The silicate compound may be, for example, $Li_2MnSiO_4$ or $Li_2FeSiO_4$, but embodiments are not limited thereto, and any suitable material available as a silicate compound including lithium may be used.

The lithium-containing metal oxide may include, for example, at least one of a borate compound represented by Formula 14:

$Li_{1+x}MBO_3$    Formula 14

In Formula 14, M may be at least one of a Group 2 to Group 16 element; and $0\le x\le1.0$.

The silicate compound may be a crystalline compound including anions, e.g., $BO_3^{3-}$.

The borate compound may be, for example $LiFeBO_3$ or $LiCoBO_3$, but embodiments are not limited thereto, and any suitable material available as a borate compound including lithium may be used.

At a temperature of 25° C., the layered compound represented by Formula 5, the NASICON compound represented by Formula 6, the LISICON compound represented by Formula 7, the garnet compound represented by Formula 8, the phosphate compound represented by at least one of Formulae 9 or Formula 10, the tavorite or triplite compound represented by Formula 11, the anti-perovskite represented by Formula 12, the silicate compound represented by Formula 13, and/or the borate compound represented by Formula 14 may have, for example, an ionic conductivity of about $1.0 \times 10^{-6}$ S/cm or more, about $5.0 \times 10^{-6}$ S/cm or more, about $1.0 \times 10^{-5}$ S/cm or more, about $5.0 \times 10^{-5}$ S/cm or more, about $1.0 \times 10^{-4}$ S/cm or more, about $5.0 \times 10^{-4}$ S/cm or more, about $1.0 \times 10^{-3}$ S/cm or more, about $5.0 \times 10^{-3}$ S/cm or more, about $1.0 \times 10^{-2}$ S/cm or more, about $5.0 \times 10^{-2}$ S/cm or more, or about $1.0 \times 10^{-1}$ S/cm or more. The ionic conductivity may be in a range of about $1.0 \times 10^{-6}$ S/cm to about $1.0 \times 10^{1}$ S/cm, about $2.0 \times 10^{-6}$ S/cm to about $1.0 \times 10^{1}$ S/cm, about $2.0 \times 10^{-6}$ S/cm to about 5.0 S/cm, about $4.0 \times 10^{-6}$ S/cm to about 5.0 S/cm, about $4.0 \times 10^{-6}$ S/cm to about 1.0 S/cm, about $5.0 \times 10^{-6}$ S/cm to about 1.0 S/cm, about $1.0 \times 10^{-5}$ S/cm to about 1.0 S/cm, about $2.0 \times 10^{-5}$ S/cm to about 1.0 S/cm, about $4.0 \times 10^{-5}$ S/cm to about 1.0 S/cm, about $5.0 \times 10^{-5}$ S/cm to about 1.0 S/cm, about $1.0 \times 10^{-4}$ S/cm to about 1.0 S/cm, about $2.0 \times 10^{-4}$ S/cm to about 1.0 S/cm, about $2.0 \times 10^{-4}$ S/cm to about $5.0 \times 10^{-1}$ S/cm, or about $2.0 \times 10^{-4}$ S/cm to about $1.0 \times 10^{-1}$ S/cm.

When the compounds of Formulae 5 to 14 have an ionic conductivity in these ranges, internal resistance of a cathode and a lithium-air battery including the compound of Formulae 5 to 14 may decrease.

The lithium-containing metal oxide in the porous framework substrate 10a and/or the coating layer 10b may be, for example, electrochemically stable within a voltage range of about 2.0 V to about 4.0 V versus a lithium metal. Thus, the cathode 10 including the porous framework substrate 10a and/or the coating layer 10b may be used for a long time in a battery having a driving potential of about 2.0 V to about 4.0 V versus a lithium metal.

According to an embodiment, a lithium-air battery includes a cathode; an anode including lithium; and an electrolyte disposed between the cathode and the anode.

Referring to FIGS. 2A and 2B, when the lithium-air battery 100 includes the cathode 10, structural stability of the lithium-air battery 100 may improve, irregular production of discharge products may be suppressed, charge/discharge overvoltage may be suppressed, and lifespan characteristics of the battery 100 may improve. As a result, deterioration of the lithium-air battery 100 may be suppressed. Also, a structure of the lithium-air battery 100 may be simplified.

The lithium-air battery 100 includes a cathode 10. The cathode 10 is an air electrode. The cathode 10 includes a porous framework substrate 10a having an electronic conductivity; and a coating layer 10b disposed along surfaces of the porous framework substrate 10a, wherein the coating layer 10b includes at least one of a lithium-containing metal oxide or a composite of a lithium-containing metal oxide. For example, a current collector (not shown) is disposed on the cathode 10.

An amount of the lithium-containing metal oxide based on 100 parts by weight of the cathode 10 was, for example, in a range of about 0.1 part by weight to about 100 parts by weight, about 0.1 parts by weight to about 90 parts by weight, about 0.2 parts by weight to about 85 parts by weight, about 0.5 parts by weight to about 80 parts by weight, about 0.7 parts by weight to about 70 parts by weight, about 0.9 parts by weight to about 60 parts by weight, or about 1 part by weight to about 50 parts by weight. The cathode 10 may have, for example, a composite structure formed of the porous framework substrate 10a and the coating layer 10b. Also, the coating layer 10b may be, for example, substantially formed of a lithium-containing metal oxide. When the cathode 10 includes the porous framework substrate 10a formed of conductive carbon or metal; and the coating layer 10b including a lithium-containing metal oxide, a structure and preparation of the cathode 10 may be simplified. Since the cathode 10 is porous, oxygen or air may be easily diffused into the cathode 10, lithium ions and/or electrons may easily migrate through the lithium-containing metal oxide in the cathode 10, and thus increased electrochemical reactions including oxygen, lithium ions, and electrons in the cathode 10 may occur.

According to an embodiment, the cathode 10 may include, for example, commercially available cathode materials other than the lithium-containing metal oxide.

The cathode 10 may further include, for example, a conductive material. For example, the conductive material may be porous. When the conductive material has porosity, air may easily permeate the conductive material. The conductive material may be any suitable material having a porosity and/or a conductivity. An example of the conductive material is a carbonaceous material having a porosity. Examples of the carbonaceous material may include carbon black, graphite, graphene, active carbon, or carbon fiber, but embodiments are not limited thereto, and any suitable material used as a carbonaceous material may be used. The conductive material may be, for example, a metallic material. The metallic material may be, for example, metal fiber, metal mesh, or metal powder. The metal powder may be, for example, copper, silver, nickel, or aluminum. The conductive material may be, for example, an organic conductive material. The organic conductive material may be, for example, a polyphenylene derivative or a polythiophene derivative. The conductive material may be, for example, used alone or as a mixture. The cathode 10 includes a mixed conductor as a conductive material, and the cathode 10 may include the conductive material in addition to the mixed conductor.

The cathode 10 may include, for example, a catalyst for oxidation/reduction of oxygen. Examples of the catalyst may include a noble metal-based catalyst such as platinum, gold, silver, palladium, ruthenium, rhodium, or osmium; an oxide-based catalyst such as a manages oxide, an iron oxide, a cobalt oxide, or a nickel oxide; or an organic metal-based catalyst such as a cobalt phthalocyanine, but embodiments are not limited thereto, and any suitable material available as an oxidation/reduction catalyst of oxygen may be used.

The catalyst may be, for example, contained in a carrier. Examples of the carrier may include an oxide carrier, a zeolite carrier, a clay mineral carrier, or a carbon carrier. The oxide carrier may be, for example, a metal oxide carrier that includes at least one of Al, Si, Zr, Ti, Ce, Pr, Sm, Eu, Tb, Tm, Yb, Sb, Bi, V, Cr, Mn, Fe, Co, Ni, Cu, Nb, Mo, or W. The oxide carrier may include, for example, alumina, silica, zirconium oxide, or titanium dioxide. Examples of the carbon carrier may include carbon black such as ketjen black, acetylene black, channel black, or lamp black; graphite such as natural graphite, artificial graphite, or expanded graphite; active carbons; or carbon fibers, but embodiments are not limited thereto, and any suitable material available as a carrier may be used.

The cathode 10 may further include, for example, a binder. The binder may include, for example, a thermoplastic resin or a thermosetting resin. Examples of the binder may include polyethylene, polypropylene, polytetrafluoroethylene (PTFE), polyvinylidene fluoride (PVDF), styrene-butadiene rubber, tetrafluoroethylene-perfluoroalkylvinylether copolymer, vinylidene fluoride-hexafluoropropylene copolymer, vinylidene fluoride-chlorotrifluoroethylene copolymer, ethylene-tetrafluoroethylene copolymer, polychlorotrifluoroethylene, vinylidene fluoride-pentafluoropropylene copolymer, propylene-tetrafluoroethylene copolymer, ethylene-chlorotrifluoroethylene copolymer, vinylidene fluoride-hexafluoropropylene-tetrafluoroethylene copolymer, vinylidene fluoride-perfluoromethylvinylether-tetrafluoroethylene copolymer, or ethylene-acrylic acid copolymer, which may be used alone or as a mixture thereof, but embodiments are not limited thereto, and any suitable material available as a binder may be used.

The cathode 10 may be prepared, for example, by mixing a conductive material, an oxygen oxidation/reduction catalyst, and a binder and adding an appropriate solvent to the mixture to prepare a cathode slurry, and then coating and drying the slurry on a substrate; or by press-molding the slurry on a substrate to improve electrode density. The substrate may be, for example, a porous film including the porous framework substrate 10a and the coating layer 10b.

The lithium-air battery 100 may include an anode 20 that includes lithium.

The anode 20 may be, for example, a lithium metal thin film or a lithium-based alloy thin film. The lithium-based alloy thin film may be, for example, an alloy of lithium with aluminum, tin, magnesium, indium, calcium, titanium, or vanadium.

The lithium-air battery 100 includes an electrolyte layer 30 between the cathode 10 and the anode 20.

A thickness of the electrolyte layer 30 may be, for example, in a range of about 1 μm to about 1000 μm, about 1.5 μm to about 500 μm, about 2 μm to about 300 μm, about 2.5 μm to about 200 μm, about 3 μm to about 100 μm, about 3.5 μm to about 50 μm, about 4 μm to about 40 μm, about 4.5 μm to about 30 μm, about 5 μm to about 20 μm, or about 5.5 μm to about 10 μm.

The electrolyte layer 30 includes at least one electrolyte of a solid electrolyte, a gel electrolyte, or a liquid electrolyte. The solid electrolyte, gel electrolyte, or liquid electrolyte are not particularly limited, and any suitable material available as an electrolyte may be used.

The solid electrolyte includes at least one of a solid electrolyte including an ion conductive inorganic material, a solid electrolyte including a polymeric ionic liquid (PIL) and a lithium salt, a solid electrolyte including an ionically conducting polymer and a lithium salt, or a solid electrolyte including an electronic conductive polymer, but embodiments are not limited thereto, and any suitable material available as a solid electrolyte may be used.

The ion conductive inorganic material includes at least one of a glass or amorphous metal ion conductor, a ceramic active metal ion conductor, or a glass ceramic active metal ion conductor, but embodiments are not limited thereto, and any suitable material available as an ion conductive inorganic material may be used. The ion conductive inorganic material is, for example, ion conductive inorganic particles or a molded product thereof in the form of sheet.

The ion conductive inorganic material may be, for example, at least one of LiPON, $BaTiO_3$, $Pb(Zr_aTi_{1-a})O_3$ where $0 \leq a \leq 1$ (PZT), $Pb_{1-x}La_xZr_{1-y}Ti_yO_3$ (PLZT) (where $0 \leq x < 1$ and $0 \leq y < 1$), $Pb(Mg_{1/3}Nb_{2/3})O_3$—$PbTiO_3$ (PMN-PT), $HfO_2$, $SrTiO_3$, $SnO_2$, $CeO_2$, $Na_2O$, MgO, NiO, CaO, BaO, ZnO, $ZrO_2$, $Y_2O_3$, $Al_2O_3$, $TiO_2$, $SiO_2$, SiC, lithium phosphate ($Li_3PO_4$), lithium titanium phosphate ($Li_xTi_y(PO_4)_3$, where $0<x<2$ and $0<y<3$), lithium aluminum titanium phosphate ($Li_xAl_yTi_z(PO_4)_3$, where $0<x<2$, $0<y<1$, and $0<z<3$), $Li_{1+x+y}(Al_aGa_{1-a})_x(Ti_bGe_{1-b})_{2-x}Si_yP_{3-y}O_{12}$ (where $0 \leq x \leq 1$ $0 \leq y \leq 1$, $0 \leq a \leq 1$, and $0 \leq b \leq 1$), lithium lanthanum titanate ($Li_xLa_yTiO_3$, where $0<x<2$ and $0<y<3$), lithium germanium thiophosphate ($Li_xGe_yP_zS_w$, where $0<x<4$, $0<y<1$, $0<z<1$, and $0<w<5$), lithium nitride ($Li_xN_y$, where $0<x<4$ and $0<y<2$), $SiS_2$-based glass ($Li_xSi_yS_z$, where $0<x<3$, $0<y<2$, and $0<z<4$), $P_2S_5$-based glass ($Li_xP_yS_z$, where $0<x<3$, $0<y<3$, and $0<z<7$), $Li_2O$, LiF, LiOH, $Li_2CO_3$, $LiAlO_2$, $Li_2O$—$Al_2O_3$—$SiO_2$—$P_2O_5$—$TiO_2$—$GeO_2$-based ceramic, garnet-based ceramic, or $Li_{3+x}La_3M_2O_{12}$ (M=Te, Nb, or Zr).

When the solid electrolyte layer includes LiPON, a thickness of the solid electrolyte layer may be about 10 μm or less, about 9 μm or less, about 8 μm or less, about 7 μm or less, about 6 μm or less, about 5 μm or less, about 4 μm or less, about 3 μm or less, about 2 μm or less, or about 1 μm or less. A thickness of the solid electrolyte layer including LiPON may be, for example, in a range of about 0.1 μm to about 10 μm, about 0.15 μm to about 9 μm, about 0.2 μm to about 8 μm, about 0.25 μm to about 7 μm, about 0.3 μm to about 6 μm, about 0.35 μm to about 5 μm, about 0.4 μm to about 4 μm, about 0.45 μm to about 3 μm, about 0.5 μm to about 2 μm, or about 0.55 μm to about 1 μm.

The polymeric ionic liquid (PIL) may contain, for example, a repeating unit including i) at least one cation of an ammonium-based cation, a pyrrolidinium-based cation, a pyridinium-based cation, a pyridinium-based cation, an imidazolium-based cation, a piperidinium-based cation, a pyrazolium-based cation, an oxazolium-based cation, a pyridazinium-based cation, a phosphonium-based cation, a sulfonium-based cation, a triazole-based cation, or a mixture thereof; and ii) at least one anion of $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $Cl^-$, $Br^-$, $I^-$, $BF_4^-$, $SO_4^-$, $PF_6^-$, $ClO_4^-$, $CF_3SO_3^-$, $CF_3CO_2^-$, $(C_2F_5SO_2)_2N^-$, $(C_2F_5SO_2)(CF_3SO_2)N^-$, $NO_3^-$, $Al_2Cl_7^-$, $AsF_6^-$, $SbF_6^-$, $CF_3COO^-$, $CH_3COO^-$, $CF_3SO_3^-$, $(CF_3SO_2)_3C^-$, $(CF_3CF_2SO_2)_2N^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_{20})_2PO^-$, or $(CF_3SO_2)_2N^-$. Examples of the polymer ionic liquid may include poly(diallyldimethylammoniumtrifluoromethanesulfonylimide) (poly(diallyldimethylammonium)TFSI), poly(1-allyl-3-methylimidazolium trifluoromethanesulfonylimide), or poly(N-methyl-N-propylpiperidinium bis(trifluoromethanesulfonyl)imide).

For example, the ionically conducting polymer may include at least one ion conductive repeating unit of an ether-based monomer, an acryl-based monomer, a methacryl-based monomer, or a siloxane-based monomer.

Examples of the ionically conducting polymer may include at least one of polyethylene oxide (PEO), polyvinyl alcohol (PVA), polyvinyl pyrrolidone (PVP), polysulfone polypropylene oxide (PPO), polymethyl methacrylate, polyethyl methacrylate, polydimethyl siloxane, polyacrylic acid, polymethacrylic acid, polymethyl acrylate, polyethyl acrylate, poly(2-ethylhexyl acrylate), polybutyl methacrylate, poly(2-ethylhexyl methacrylate), poly(decyl acrylate), polyethylene vinyl acetate, phosphoric ester polymer, polyester sulfide, polyvinylidene fluoride (PVdF), and Li-substituted Nafion, but embodiments are not limited thereto, and any suitable material available as an ionically conducting polymer may be used.

Examples of the electronic conductive polymer may include a polyphenylene derivative and a polythiophene derivative, but embodiments are not limited thereto, and any material available as an electronic conductive polymer in the art may be used.

For example, the gel electrolyte may be obtained by adding a low-molecular-weight solvent to the solid electrolyte disposed between the cathode 10 and the anode 20. The gel electrolyte may be, for example, a gel electrolyte that is obtained by adding a solvent or an oligomer, which is a low-molecular-weight organic compound, to a polymer. The gel electrolyte may be, for example, a gel electrolyte that is obtained by adding a solvent or an oligomer, which is a low-molecular-weight organic compound, to the polymer electrolyte.

The liquid electrolyte may include a solvent and a lithium salt.

The solvent may include at least one of an organic solvent, an ionic liquid, or an oligomer, but embodiments are not limited thereto, and any suitable material that is liquid at room temperature (25° C.) available as a solvent may be used.

Examples of the organic solvent may include at least one of an ether-based solvent, a carbonate-based solvent, an ester-based solvent, or a ketone-based solvent. Examples of the organic solvent may include at least one of propylene carbonate, ethylene carbonate, fluoroethylene carbonate, vinylethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, dimethylacetamide, dimethylsulfoxide, dioxane, 1,2-dimethoxyethane, sulfolane, dichloroethane, chlorobenzene, nitrobenzene, succinonitrile, diethylene glycol dimethyl ether (DEGDME), tetraethylene glycol dimethyl ether (TEGDME), polyethylene glycol dimethyl ether (PEGDME, Mn=~500), dimethylether, diethylether, dibutylether, dimethoxyethane, 2-methyltetrahydrofuran, or tetrahydrofuran, but embodiments are not limited thereto, and any suitable material that is liquid at room temperature and available as an organic solvent may be used.

For example, the ionic liquid (IL) may include i) at least one cation of an ammonium-based cation, a pyrrolidinium-based cation, a pyridinium-based cation, a pyrimidinium-based cation, an imidazolium-based cation, a piperidinium-based cation, a pyrazolium-based cation, an oxazolium-based cation, a pyridazinium-based cation, a phosphonium-based cation, a sulfonium-based cation, a triazole-based cation, or a mixture thereof; and ii) at least one anion of $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $Cl^-$, $Br^-$, $I^-$, $BF_4^-$, $SO_4^-$, $PF_6^-$, $ClO_4^-$, $CF_3SO_3^-$, $CF_3CO_2^-$, $(C_2F_5SO_2)_2N^-$, $(C_2F_5SO_2)(CF_3SO_2)N^-$, $NO_3^-$, $Al_2Cl_7^-$, $AsF_6^-$, $SbF_6^-$, $CF_3COO^-$, $CH_3COO^-$, $CF_3SO_3^-$, $(CF_3SO_2)_3C^-$, $(CF_3CF_2SO_2)_2N^-$, $(CF_3)_2PF_4^-$, $(CF_3)_3PF_3^-$, $(CF_3)_4PF_2^-$, $(CF_3)_5PF^-(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_{20})_2PO^-$, or $(CF_3SO_2)_2N^-$.

Examples of the lithium salt may include at least one of LiTFSI, $LiPF_6$, $LiBF_4$, $LiAsF_6$, $LiClO_4$, $LiNO_3$, lithium bis(oxalato) borate (LiBOB), $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlCl_4$, or lithium trifluoromethanesulfonate (LiTfO), but embodiments are not limited thereto, and any suitable material available as a lithium salt may be used. A concentration of the lithium salt may be, for example, in a range of about 0.01 M to about 5.0 M.

The lithium-air battery 100 may include, for example, a separator between the cathode 10 and the anode 20. The separator may be any separator having a composition which may be used in the lithium-air battery 100. For example, a polymer non-woven fabric such as a polypropylene non-woven fabric or a polyphenylene sulfide non-woven fabric, a porous film of an olefin resin such as polyethylene or polypropylene, glass fibers, or a combination of the foregoing, may be used as the separator.

The electrolyte layer 30 may have, for example, a structure in which the separator is impregnated with a solid polymer electrolyte or a structure in which the separator is impregnated with a liquid electrolyte. The electrolyte layer 30 having a structure in which the separator is impregnated with a solid polymer electrolyte is prepared by disposing the solid polymer electrolyte film on one or more surfaces of the separator and then roll-pressing the separator and the film at the same time. The electrolyte layer 30 having a structure in which the separator is impregnated with a liquid electrolyte is prepared by injecting a liquid electrolyte including a lithium salt to the separator.

The anode 20 is disposed on one surface of an anode current collector 21 on one surface in a case, the electrolyte layer 30 is disposed on the anode, the cathode 10 is disposed on the electrolyte layer 30, a porous cathode current collector (not shown) is disposed on the cathode 10, a pressing member (not shown) through which air may be moved to an air electrode is disposed on the porous cathode current collector (not shown), and the battery 100 is pressed and fixed by the pressing member, thereby completing preparation of the lithium-air battery 100. The case may have an upper portion in contact with the anode 20 and a lower portion in contact with the air electrode, where an insulating resin is disposed between the upper part and the lower part so that the cathode 10 and the anode 20 are electrically insulated.

Although not shown in FIGS. 2A and 2B, the lithium-air battery 100 may have a cathode interlayer further disposed between the cathode 10 and the electrolyte layer 30. The cathode interlayer may include, for example, at least one of platinum, gold, silver, palladium, ruthenium, rhodium, or osmium. The cathode interlayer may be disposed to decrease an interfacial resistance and to increase an ionic conductivity by improving contact between the cathode 10 and the electrolyte layer 30. A thickness of the cathode interlayer may be, for example, in a range of about 1 nm to about 5 nm. When the thickness of the cathode interlayer is too thin, contact between the cathode 10 and the electrolyte layer 30 may be reduced. When the thickness of the cathode interlayer is too thick, an ionic conductivity between the cathode 10 and the electrolyte layer 30 may be degraded.

The lithium-air battery 100 may be used as a lithium primary battery or a lithium secondary battery. Also, a shape of the lithium-air battery 100 is not limited, and examples of the shape of the lithium-air battery 100 may include coin, button, sheet, stack, cylinder, flat, or cone. The lithium-air battery 100 may be a large-sized battery that is used in an electric vehicle.

Referring to FIGS. 2A and 2B, the lithium-air battery 100 according to an embodiment includes the cathode 10 that uses oxygen as an active material and includes the porous framework structure 10a and the coating layer 10b, the anode 20 including lithium; and the solid electrolyte layer 30 disposed between the cathode 10 and the anode 20. A solid electrolyte layer in the solid electrolyte layer 30 may be, for example, a compound having a structure or a composition different from that of a lithium-containing metal oxide in the cathode 10. The solid electrolyte may be, for example, LATP. An anode interlayer 40 may be further disposed between the anode 20 and the solid electrolyte layer 30. The anode interlayer 40 may be liquid or solid. When the anode interlayer 40 is liquid, a liquid electrolyte may be an electrolyte solution impregnated in the separator. When the anode interlayer 40 is solid, the solid electrolyte may be LiPON. Therefore, the lithium-air battery 100 may be a solid battery that does not include a liquid electrolyte/gel electrolyte when the anode interlayer 40 is solid.

Figure 12:
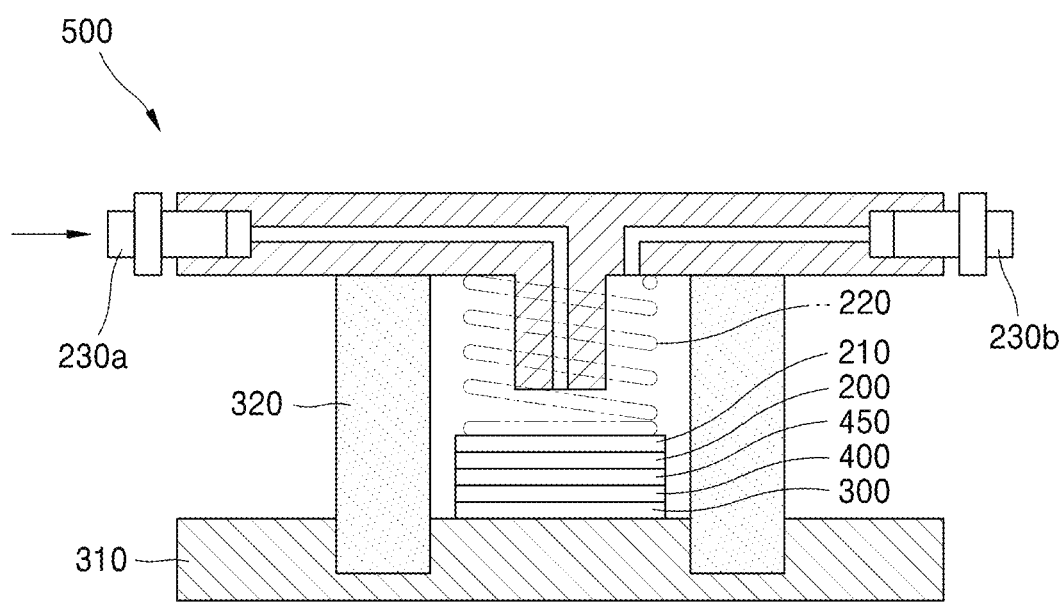
FIG. 12 is a schematic view of a structure of a lithium-air battery according to an embodiment.

Referring to FIG. 12, a lithium-air battery 500 according to another embodiment includes a cathode 200 that is adjacent to a first current collector 210 and uses oxygen as an active material; an anode 300 that is adjacent to a second current collector 310 and includes lithium; and a first electrolyte layer 400 disposed between the cathode 200 and the anode 300. The first electrolyte layer 400 is a separator impregnated with a liquid electrolyte. The first electrolyte layer 400 may be omitted. A second electrolyte layer 450 is disposed between the cathode 200 and the first electrolyte layer 400. The second electrolyte layer 450 is a lithium ion conductive solid electrolyte layer. The first current collector 210 is porous and thus may serve as a gas diffusion layer which allows air diffusion. In some embodiments, a gas diffusion layer may be further disposed between the first current collector 210 and the cathode 200. A pressing member 220, through which air moves to the cathode 200, is disposed on the first current collector 210. A case 320 of an insulating resin material electrically separates the cathode 200 and the anode 300. Air is supplied through an air inlet 230a and discharged through an air outlet 230b. The lithium-air battery 500 may be accommodated in a stainless steel container. The cathode 200 has an integrated structure including a porous layer and a barrier layer.

The "air" of the lithium-air battery 500 is not limited to the atmospheric air but may include a combination of gases including oxygen or a pure oxygen gas. The term "air," as described herein, may be applied to an air battery, air, or an air electrode.

According to another embodiment, a method of preparing a cathode includes providing a suspension including lithium-containing metal oxide particles; and depositing the lithium-containing metal oxide particles on a porous framework substrate by electrophoresis. Since the method of preparing a cathode does not include heat-treating, deterioration occurring in the heat-treating process may be prevented, and a material having a weak thermal resistance may be used in the method.

The suspension may include a lithium-containing metal oxide, a dispersant, and a solvent.

A type of the dispersant is not particularly limited, and any suitable material available as a dispersant may be used. For example, the dispersant may be polyacrylic acid. An amount of the dispersant may be in a range of about 0.01 parts by weight to about 5 parts by weight, based on 100 parts by weight of the suspension.

An amount of the lithium-containing metal oxide may be in a range of about 0.01 parts by weight to about 10 parts by weight, about 0.01 parts to about 1 part by weight, or about 0.05 parts by weight to about 0.5 parts by weight, based on 100 parts by weight of the suspension.

A size of the lithium-containing metal oxide particles may be in a range of about 10 nm to about 500 nm, about 50 nm to about 450 nm, about 100 nm to about 400 nm, about 150 nm to about 350 nm, about 200 nm to about 350 nm, or about 250 nm to about 350 nm.

When the size of the lithium-containing metal oxide particles is too large, electrophoretic deposition may not be effectively performed. When the size of the lithium-containing metal oxide particles is too small, a homogenous suspension may not be obtained due to aggregation of the particles. Examples of the solvent may include an alcohol such as ethanol or N-methylpyrrolidone (NMP). An amount of the solvent is appropriately controlled such that each component constituting the composition may be dissolved or dispersed.

An electrode formed of a porous framework substrate is disposed in the suspension, a counter electrode is disposed, and the lithium-containing metal oxide particles are deposited on the porous framework substrate by applying a voltage between the electrodes.

The applied voltage may be, for example, in a range of about 10 V to about 200 V, or about 50 V to about 100 V. A time of applying the voltage may be, for example, in a range of about 1 minute to about 60 minutes, about 1.5 minutes to about 50 minutes, about 2 minutes to about 40 minutes, about 2.5 minutes to about 30 minutes, about 3 minutes to about 20 minutes, or about 3.5 minutes to about 10 minutes.

The porous framework substrate may be, for example, carbon paper, SUS mesh, or Ni mesh.

The lithium-containing metal oxide particles may cover a surface of fibrous carbon of carbon paper. This results in the formation of a conformal coating layer on the lithium-containing metal oxide.

The porous framework substrate having the lithium-containing metal oxide particles deposited on the surface thereon is removed from the suspension and dried to prepare a cathode.

One or more embodiments will now be described in greater detail with reference to the following examples. However, these examples are not intended to limit the scope of the one or more embodiments.

EXAMPLES

Preparation of Lithium-Containing Metal Oxide

Preparation Example 1: Preparation of Spinel Compound ($Li_{4.5}Ti_{4.5}Nb_{0.5}O_{12-\delta}$)

$Li_2CO_3$ as a lithium precursor, $TiO_2$ as a titanium precursor, and $Nb_2O_5$ as a niobium precursor were mixed in a stoichiometric ratio. The precursors were ground and mixed using ball milling with ethanol and zirconia balls at 280 rpm for 4 hours to obtain a mixture. Thus obtained mixture was dried at a temperature of 90° C. for 6 hours and then primary heat-treated in the air atmosphere at a temperature of 700° C. for 5 hours. The resultant of the primary heat-treatment was ground using ball milling and pressed at an isostatic pressure to prepare a pellet. Thus prepared pellet was secondary heat-treated in a reducing atmosphere at a temperature of 950° C. for 24 hours to prepare a composite conductor. The reducing atmosphere included 5% of hydrogen gas and 95% of argon gas. A composition of the lithium-containing metal oxide was $Li_{4.5}Ti_{4.5}Nb_{0.5}O_{12-\delta}$ ($0<\delta<3$).

Preparation Example 2: Preparation of Spinel Compound ($Li_{3.5}Ti_{4.0}Nb_{1.0}O_{12-\delta}$)

A composite conductor was prepared in the same manner as in Example 1, except that a stoichiometric ratio of the lithium precursor, the titanium precursor, and the niobium precursor was changed.

A composition of the lithium-containing metal oxide was $Li_{3.5}Ti_{4.0}Nb_{1.0}O_{12-\delta}$ (0<δ<3).

Preparation Example 3: Preparation of Spinel Compound ($Li_{3.5}Ti_{4.0}Ta_{1.0}O_{12-\delta}$)

A composite conductor was prepared in the same manner as in Example 1, except that $Ta_2O_5$ as a tantalum precursor was used instead of the niobium precursor and a stoichiometric ratio of the lithium precursor, the titanium precursor, and the tantalum precursor was changed.

A composition of the lithium-containing metal oxide was $Li_{3.5}Ti_{4.0}Ta_{1.0}O_{12-\delta}$ (0<δ<3).

Preparation Example 4: Preparation of Spinel Compound ($Li_{4.5}Ti_{4.5}Gd_{0.5}O_{12-\delta}$)

A composite conductor was prepared in the same manner as in Example 1, except that $Gd_2O_3$ as a gadolinium precursor was used instead of the niobium precursor.

A composition of the lithium-containing metal oxide was $Li_{4.5}Ti_{4.5}Gd_{0.5}O_{12-\delta}$ (0<δ<3).

Preparation Example 5: Preparation of Spinel Compound ($Li_{5.0}Ti_{4.0}Gd_{1.0}O_{12-\delta}$)

A composite conductor was prepared in the same manner as in Example 1, except that $Gd_2O_3$ as a gadolinium precursor was used instead of the niobium precursor and a stoichiometric ratio of the lithium precursor, the titanium precursor, and the gadolinium precursor was changed.

A composition of the lithium-containing metal oxide was $Li_{5.0}Ti_{4.0}Gd_{1.0}O_{12-\delta}$ (0<δ<3).

Preparation Example 6: Preparation of Spinel Compound ($Li_{4.5}Ti_{4.5}In_{0.5}O_{12-\delta}$)

A composite conductor was prepared in the same manner as in Example 1, except that $In_2O_3$ as an indium precursor was used instead of the niobium precursor.

A composition of the lithium-containing metal oxide was $Li_{4.5}Ti_{4.5}Nb_{0.5}O_{12-\delta}$ (0<δ<3).

Preparation Example 7: Preparation of Spinel Compound ($Li_{5.0}Ti_{4.0}In_{1.0}O_{12-\delta}$)

A composite conductor was prepared in the same manner as in Example 1, except that $In_2O_3$ as an indium precursor was used instead of the niobium precursor and a stoichiometric ratio of the lithium precursor, the titanium precursor, and the indium precursor was changed.

A composition of the lithium-containing metal oxide was $Li_{5.0}Ti_{4.0}In_{1.0}O_{12-\delta}$ (0<δ<3).

Preparation Example 8: Preparation of Spinel Compound ($Li_4Ti_5O_{12}$)

Commercially obtained $Li_4Ti_5O_{12}$ was used as received.

Preparation Example 9: Preparation of Perovskite Compound ($Li_{0.34}La_{0.55}TiO_3$)

$Li_2CO_3$, $La_2O_3$, and $TiO_2$ powders were added to ethanol and mixed according to a composition ratio of $Li_{0.34}La_{0.55}TiO_3$. An amount of the ethanol was about 4 parts by weight, based on 100 parts by weight as the total weight of the $Li_2CO_3$, $La_2O_3$, and $TiO_2$ powders.

The mixture was placed in a ball-milling device and ground and mixed for 4 hours. The resulting mixture was dried and then heated to a temperature of about 800° C. at a temperature increase rate of about 5° C./min, and the resultant was primary heat-treated at a temperature of about 800° C. in an air atmosphere for about 4 hours to obtain a powder.

A powder of primary particles having a size of about 0.3 μm was prepared by grinding the powder obtained from the primary heat-treatment. Thus prepared powder was pressure-treated to prepare a cylindrical pellet having a diameter of about 1.3 cm, a height of about 0.5 cm, and a weight of about 0.3 g. Thus prepared pellet was secondary heat-treated in an air atmosphere at a temperature of about 1100° C. for about 24 hours to prepare a target product. A temperature increase rate to increase a temperature to about 1100° C. for the secondary heat-treatment was about 5° C./min. A composition of the obtained lithium-containing metal oxide was $Li_{0.34}La_{0.55}TiO_3$.

Preparation Example 10: Preparation of Perovskite Compound ($Li_{0.34}La_{0.55}RuO_3$)

A target product was obtained in the same manner as in Preparation Example 9, except that $RuO_2$ was used instead of $TiO_2$ and the secondary heat-treatment was performed at a temperature of about 1200° C.

A composition of the obtained lithium-containing metal oxide was $Li_{0.34}La_{0.55}RuO_3$ (LLRuO).

Preparation Example 11: Preparation of Perovskite Compound ($Li_{0.34}La_{0.55}MnO_{3-\delta}$)

A target product was obtained in the same manner as in Preparation Example 9, except that $MnO_2$ was used instead of $TiO_2$ and the secondary heat-treatment was performed at a temperature of about 1200° C.

A composition of the obtained lithium-containing metal oxide was $Li_{0.34}La_{0.55}MnO_3$.

Preparation Example 12: Preparation of Perovskite Compound ($Li_{0.34}La_{0.55}NiO_3$)

A target product was obtained in the same manner as in Preparation Example 9, except that $Ni(OH)_2$ was used instead of $TiO_2$ and the secondary heat-treatment was performed at a temperature of about 1200° C.

A composition of the obtained lithium-containing metal oxide was $Li_{0.34}La_{0.55}NiO_3$.

Preparation Example 13: Preparation of Perovskite Compound ($Li_{0.34}La_{0.55}CrO_3$)

A target product was obtained in the same manner as in Preparation Example 9, except that $Cr_2O_3$ was used instead of $TiO_2$ and the secondary heat-treatment was performed at a temperature of about 1200° C.

A composition of the obtained lithium-containing metal oxide was $Li_{0.34}La_{0.55}CrO_3$.

Preparation Example 14: Preparation of Perovskite Compound ($Li_{0.34}La_{0.55}IrO_3$)

A target product was obtained in the same manner as in Preparation Example 9, except that $IrO_2$ was used instead of $TiO_2$ and the secondary heat-treatment was performed at a temperature of about 1200° C.

A composition of the obtained lithium-containing metal oxide was $Li_{0.34}La_{0.55}IrO_3$.

Preparation Example 15: Preparation of Perovskite Compound ($Li_{0.34}La_{0.55}CoO_3$)

A target product was obtained in the same manner as in Preparation Example 9, except that $Co_2O_3$ was used instead of $TiO_2$ and the secondary heat-treatment was performed at a temperature of about 1200° C.

A composition of the obtained lithium-containing metal oxide was $Li_{0.34}La_{0.55}CoO_3$.

Preparation of Cathode

Example 1: Electrophoretic Deposition, Loading Level of 5.8 mg/cm²

The lithium-containing metal oxide, $Li_{0.34}La_{0.55}RuO_3$ (LLRuO), prepared in Preparation Example 10 was ground in a ball mill to obtain a powder of primary particles having a size of about 300 nm.

The powder of the lithium-containing metal oxide and polyacrylic acid (having a molecular weight of 1,800 Dalton) as a dispersant were each added to ethanol, and the mixture was stirred to prepare a suspension. An amount of the lithium-containing metal oxide was about 0.1 wt %, and an amount of the dispersant was about 0.05 wt %.

Carbon paper (29BA, available from SGL) was used as an anode and a cathode in the suspension. The carbon paper had a thickness of about 190 μm, a porosity of about 89%, and an areal resistance (or a through-plane resistance) of less than about 10 milliohms per cubic centimeter (ma cm³).

An average diameter of fibrous carbon in the carbon paper was about 7 μm. A voltage of about 100 V was applied between the cathode and the anode for 10 minutes to deposit the lithium-containing metal oxide on the carbon paper by electrophoretic deposition.

A loading level of a coating layer of the deposited lithium-containing metal oxide was about 5.8 mg/cm². A thickness of the coating layer was about 4 μm.

The carbon paper on which the lithium-containing metal oxide was deposited was removed from the suspension and dried at a temperature of 25° C. for 2 hours to prepare a cathode. A porosity of the cathode was about 89%.

Weights of the cathode and the carbon paper were each measured, and a weight of the coated lithium-containing metal oxide was calculated by using the weights. A volume of the coated lithium-containing metal oxide was calculated from a theoretical density of the lithium-containing metal oxide.

A volume of carbon was calculated from a theoretical density of carbon. A porosity of the cathode was calculated by subtracting the volumes of carbon and lithium-containing metal oxide from a measured volume of the cathode.

Figure 3A:
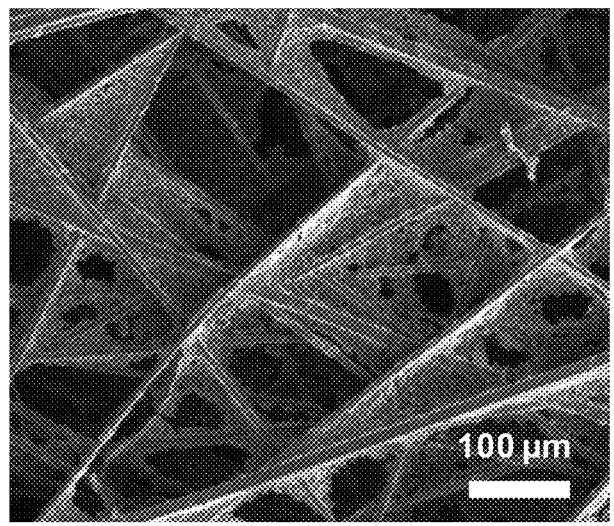
FIG. 3A is a scanning electron microscope (SEM) image a cathode having bare carbon paper before forming a coating layer with a lithium-containing metal oxide, as prepared in Example 1.

FIG. 3A is a scanning electron microscope (SEM) image of bare carbon paper before a lithium-containing metal oxide formed a coating layer.

Figure 3B:
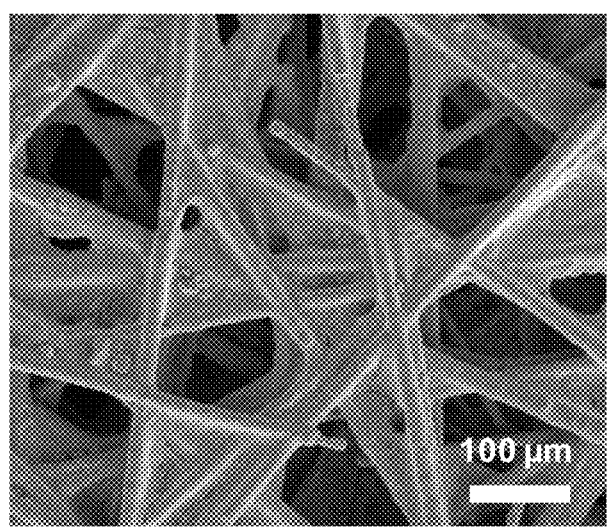
FIG. 3B is an SEM image of a cathode having carbon paper coated with a lithium-containing metal oxide prepared in Example 1.

FIG. 3B is an SEM image of a cathode having carbon paper coated with the lithium-containing metal oxide.

Figure 3C:
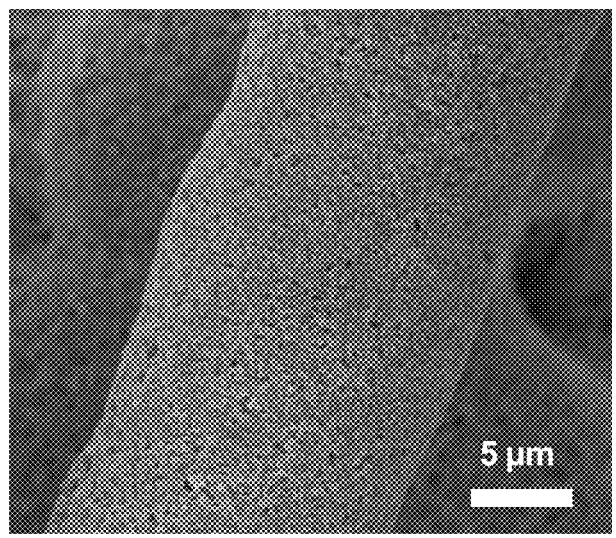
FIG. 3C is an enlarged view of a portion of FIG. 3B.

FIG. 3C is an enlarged view of a portion of FIG. 3B. As shown in FIG. 3C, it was confirmed that a coating layer including a lithium-containing metal oxide was evenly arranged along a surface of fibrous carbon of carbon paper.

Figure 3D:
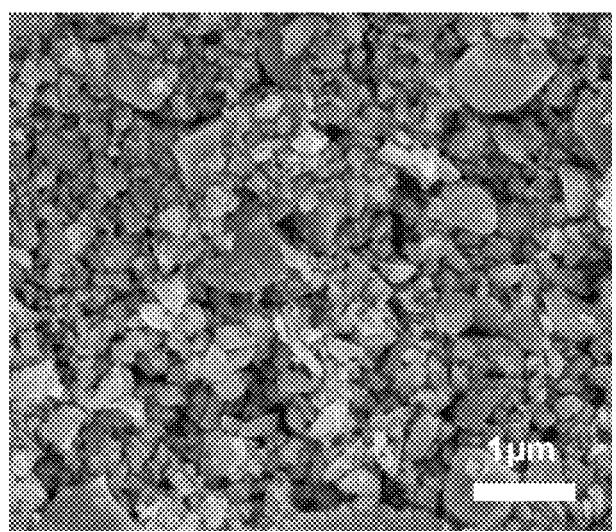
FIG. 3D is an enlarged view of a portion of FIG. 30.

FIG. 3D is an enlarged view of a portion of FIG. 3C. It was confirmed that the coating layer including a plurality of lithium-containing metal oxide particles was formed.

Since the prepared cathode did not undergo additional heat-treating processes, there was no decrease in a specific surface area caused by sintering of the lithium-containing metal oxide on a surface of the cathode.

Example 2: Electrophoretic Deposition, Loading Level of 4.4 mg/cm²

A cathode was prepared in the same manner as in Example 1, except that a time for applying a voltage of 100 V/cm was changed to 5 minutes.

A loading level of the deposited lithium-containing metal oxide coating layer was 4.4 mg/cm².

Example 3: Electrophoretic Deposition, Loading Level of 3 mg/cm²

A cathode was prepared in the same manner as in Example 1, except that a time for applying a voltage of 100 V/cm was changed to 2 minutes.

A loading level of the deposited lithium-containing metal oxide coating layer was 3 mg/cm².

Example 4: Electrophoretic Deposition, Loading Level of 1.4 mg/cm²

A cathode was prepared in the same manner as in Example 1, except that a time for applying a voltage of 100 V/cm was changed to 1 minute.

A loading level of the deposited lithium-containing metal oxide coating layer was 1.4 mg/cm².

Example 5: Electrophoretic Deposition, Loading Level of 3 mg/cm²

A cathode was prepared in the same manner as in Example 1, except that the applied voltage was changed to 50 V/cm.

A loading level of the deposited lithium-containing metal oxide coating layer was 3 mg/cm².

Example 6: Electrophoretic Deposition, Loading Level of 2.2 mg/cm²

A cathode was prepared in the same manner as in Example 1, except that the applied voltage was changed to 50 V/cm and a time for applying the voltage was changed to 5 minutes.

A loading level of the deposited lithium-containing metal oxide coating layer was 2.2 mg/cm².

Example 7: Electrophoretic Deposition, Loading Level of 1.2 mg/cm²

A cathode was prepared in the same manner as in Example 1, except that the applied voltage was changed to 50 V/cm and a time for applying the voltage was changed to 2 minutes.

A loading level of the deposited lithium-containing metal oxide coating layer was 1.2 mg/cm².

Example 8: Electrophoretic Deposition, Loading Level of 0.6 mg/cm²

A cathode was prepared in the same manner as in Example 1, except that the applied voltage was changed to 50 V/cm and a time for applying the voltage was changed to 1 minute.

A loading level of the deposited lithium-containing metal oxide coating layer was 0.6 mg/cm².

Comparative Example 1: Dip Coating+Heat-Treating

The lithium-containing metal oxide, $Li_{0.34}La_{0.55}RuO_3$, prepared in Preparation Example 10 was ground in a ball mill to obtain a powder having a primary particle size of about 300 nm.

Thus obtained lithium-containing metal oxide powder and a binder (B79, available from Eastman) were mixed at a weight ratio of 100:50, and ethanol as a solvent was added to the mixture and mixed to prepare a slurry. Carbon paper (29BA, available from SGL) was dipped in the slurry for 5 minutes and taken out from the slurry and dried in the air for 2 hours to obtain a composite. Thus obtained composite was heat-treated in the air atmosphere at a temperature of 450° C. for 1 hour to remove an organic component of the binder or more, and thus a cathode was prepared.

Figure 4A:
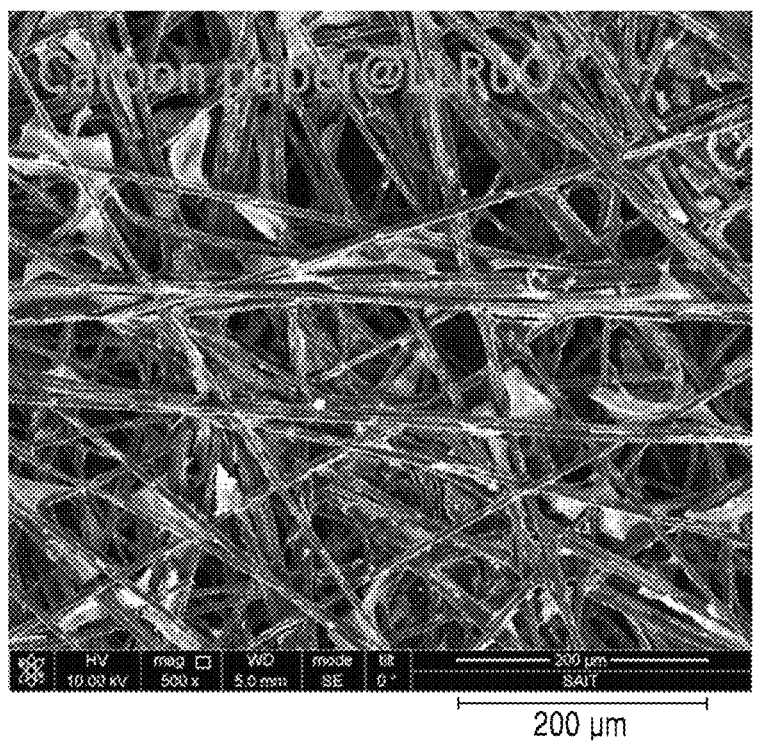
FIG. 4A is an SEM image of a cathode having carbon paper coated with a lithium-containing metal oxide prepared in Comparative Example 1.

FIG. 4A is an SEM image of a cathode having carbon paper coated with a lithium-containing metal oxide.

Figure 4B:
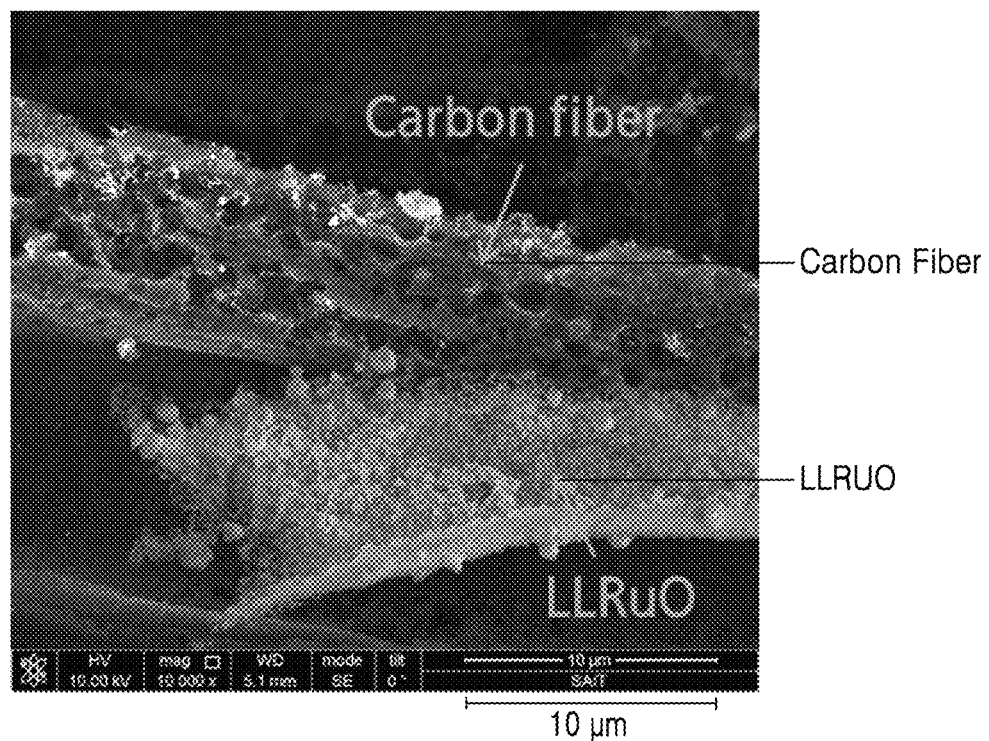
FIG. 4B is an enlarged view of a portion of FIG. 4A.

FIG. 4B is an enlarged view of a portion of FIG. 4A; As shown in FIG. 4B, separation between fibrous carbon and the coating layer occurred due to shrinkage difference during the heat-treatment. Thus, the cathode was not appropriated to be used as a cathode.

Comparative Example 2: Cathode without Porous Substrate, Loading Level of 6 mg/cm²

The lithium-containing metal oxide, $Li_{0.34}La_{0.55}RuO_3$, prepared in Preparation Example 10 was ground in a ball mill to obtain a powder having a primary particle size of about 300 nm.

Thus obtained lithium-containing metal oxide powder and a binder (B79, available from Eastman) were mixed at a weight ratio of 100:50, and ethanol as a solvent was added to the mixture and mixed to prepare a slurry. Polyethylene terephthalate (PET) release film was coated with the slurry by using a doctor blade, and the resultant was dried in the air for 2 hours to obtain a self-standing film form.

The lithium-containing metal oxide self-standing film cut in a size of an electrode was attached on a lithium aluminum titanium phosphate (LATP) layer (having a thickness of about 250 μm available from Ohara Corp., Japan) to prepare a LATP/cathode layer stack. The stack was heat-treated in an air atmosphere at 450° C. for 1 hour to prepare a LATP/cathode stack. A porosity of the cathode was lower than 40%.

A loading level of the lithium-containing metal oxide in the cathode was about 6 mg/cm².

Comparative Example 3: Cathode without Porous Substrate, Loading Level of 4 mg/cm²

A cathode was prepared in the same manner as in Comparative Example 2, except that a loading level of the lithium-containing metal oxide in the cathode was changed to 4 mg/cm².

Preparation of lithium-air battery

Example 9: SUS Current Collector/Cathode/Au Interlayer/LATP/Anode Interlayer/Li Anode A separator (Celgard 3501) was disposed on a lithium metal foil anode.

0.2 mL of an electrolyte solution including 1 M lithium bis(trifluoromethanesulfonyl)imide (LiTFSI) dissolved in propylene carbonate (PC) was injected to the separator to prepare an anode interlayer.

A gold (Au) layer having a thickness of about 5 nm was coated on one surface of a lithium-aluminum titanium phosphate (LATP) solid electrolyte layer (having a thickness of about 250 μm, available from Ohara Corp., Japan) by sputtering.

The LATP layer coated with the Au interlayer was disposed on the separator to prepare a structure of anode/anode interlayer/solid electrolyte layer/Au interlayer.

The structure was covered with a pouch in which aluminum was coated on a polyolefin base. A window of a fixed size was provided on an upper part of the pouch, and thus a portion of the Au interlayer was exposed to the outside of the pouch.

The cathode prepared in Example 1 was disposed on the Au interlayer exposed to the outside of the pouch. Subsequently, a SUS mesh was disposed on the top of the cathode, and a pressing member allowing air to reach the cathode was disposed on the SUS mesh to press and fix a cell, thereby completing preparation of a lithium-air battery.

Examples 10 to 16: SUS Current Collector/Cathode/Au Interlayer/LATP/Anode Interlayer/Li Anode Lithium-air batteries were each prepared in the same manner as in Example 9, except that the cathodes prepared in Examples 2 to 8 were respectively used.

Comparative Example 4: SUS Current Collector/Gas Diffusion Layer/Cathode/LATP/Anode Interlayer/Li Anode A separator (Celgard 3501) was disposed on a lithium metal foil anode.

0.2 mL of an electrolyte solution including 1 M LiTFSI dissolved in PC was injected to the separator to prepare an anode interlayer.

The LATP/cathode stack prepared in Comparative Example 2 was disposed on the separator to prepare a structure form of anode/anode interlayer/solid electrolyte layer/cathode.

The structure was covered with a pouch in which aluminum was coated on a polyolefin base. A window of a fixed size was provided on an upper part of the pouch, and thus a portion of the cathode was exposed to the outside of the pouch.

A gas diffusion layer (GDL) (25BC, available from SGL) was disposed on the top of the cathode exposed to the outside of the pouch, a SUS mesh was disposed on the GDL, and a pressing member allowing air to reach the cathode was disposed on the SUS mesh to press and fix a cell, thereby completing preparation of a lithium-air battery.

Comparative Example 5: SUS Current Collector/GDL/Cathode/LATP/Anode Interlayer/Li Anode A lithium-air battery was prepared in the same manner as in Comparative Example 4, except that the cathode/LATP stack prepared in Comparative Example 3 was used instead of the cathode/LATP stack prepared in Comparative Example 2.

Evaluation Example 1: Electronic Conductivity Evaluation

Ion blocking cells were prepared by sputtering Au on two surfaces of each of the spinel compound pellets and the perovskite compound pellets prepared in Preparation Examples 1 to 15. Electronic conductivities of the cells were measured by using a direct current (DC) polarization method at a temperature of 25° C.

Time dependent currents were measured by applying a constant voltage of 100 mV to the prepared cells for 30 minutes. Electronic resistances of the composite conductors were calculated from the measured currents, and the electronic conductivities were measured from the currents. The results of electronic conductivities are shown in Tables 1 and 2.

Evaluation Example 2: Ion Conductivity Evaluation

Separator layers impregnated with liquid electrolyte (1 M LiTFSI in PC) were disposed on two surfaces of the spinel compound pellets and the perovskite compound pellets prepared in Preparation Examples 1 to 15, and then stainless steel/SUS was disposed on the electrolyte layer as a current collector, thereby completing electron blocking cells. Ion conductivities of the cells were measured by using a DC polarization method at a temperature of 25° C.

Time dependent currents were measured by applying a constant voltage of 100 mV to the prepared symmetric cells for 30 minutes. Ionic resistances of the cells were calculated from the measured currents, ionic resistances of the solid electrolyte layers were subtracted from the ionic resistances of the cells to calculate ionic resistances of the composite conductors, and then ionic conductivities were calculated from the ionic resistances of the composite conductors. Thus obtained ion conductivities are shown in Tables 1 and 2.

TABLE 1

| | Composition | Electronic conductivity [S/cm] | Ion conductivity [S/cm] |
|---|---|---|---|
| Preparation Example 1 | $Li_{4.5}Ti_{4.5}Nb_{0.5}O_{12-\delta}$ | $1.4 \times 10^{-3}$ | $4.7 \times 10^{-5}$ |
| Preparation Example 2 | $Li_{3.5}Ti_{4.0}Nb_{1.0}O_{12-\delta}$ | $3.5 \times 10^{-4}$ | $2.0 \times 10^{-7}$ |
| Preparation Example 3 | $Li_{3.5}Ti_{4.0}Ta_{1.0}O_{12-\delta}$ | $1.2 \times 10^{-4}$ | $1.8 \times 10^{-7}$ |
| Preparation Example 4 | $Li_{4.5}Ti_{4.5}Gd_{0.5}O_{12-\delta}$ | $2.1 \times 10^{-4}$ | $3.2 \times 10^{-7}$ |
| Preparation Example 5 | $Li_{5.0}Ti_{4.0}Gd_{1.0}O_{12-\delta}$ | $9.6 \times 10^{-6}$ | $5.1 \times 10^{-6}$ |
| Preparation Example 6 | $Li_{4.5}Ti_{4.5}In_{0.5}O_{12-\delta}$ | $7.4 \times 10^{-5}$ | $8.1 \times 10^{-7}$ |
| Preparation Example 7 | $Li_{5.0}Ti_{4.0}In_{1.0}O_{12-\delta}$ | $1.1 \times 10^{-5}$ | $2.9 \times 10^{-6}$ |
| Preparation Example 8 | $Li_4Ti_5O_{12}$ | $4.3 \times 10^{-9}$ | $6.8 \times 10^{-5}$ |

As shown in Table 1, the spinel compounds prepared in Preparation Examples 1 to 8 were crystalline ion conductors having an ion conductivity of about $1 \times 10^{-8}$ or more.

Also, electronic conductivities and ionic conductivities of the spinel compounds prepared in Preparation Examples 1 to 7 improved compared to those of the spinel compound prepared in Preparation Example 8.

TABLE 2

| | Composition | Electronic conductivity [S/cm] | Ionic conductivity [S/cm] |
|---|---|---|---|
| Preparation Example 9 | $Li_{0.34}La_{0.55}TiO_3$ | $3.8 \times 10^{-9}$ | $1.2 \times 10^{-5}$ |
| Preparation Example 10 | $Li_{0.34}La_{0.55}RuO_3$ | $5.6 \times 10^{-2}$ | $2.1 \times 10^{-5}$ |
| Preparation Example 11 | $Li_{0.34}La_{0.55}MnO_3$ | $2.0 \times 10^{-3}$ | $8.8 \times 10^{-5}$ |
| Preparation Example 12 | $Li_{0.34}La_{0.55}NiO_3$ | $2.8 \times 10^{-2}$ | $3.0 \times 10^{-6}$ |
| Preparation Example 13 | $Li_{0.34}La_{0.55}CrO_3$ | $2.6 \times 10^{-4}$ | $2.0 \times 10^{-6}$ |
| Preparation Example 14 | $Li_{0.34}La_{0.55}IrO_3$ | $4.3 \times 10^{-3}$ | $1.7 \times 10^{-5}$ |
| Preparation Example 15 | $Li_{0.34}La_{0.55}CoO_3$ | $4.5 \times 10^{-4}$ | $4.6 \times 10^{-6}$ |

As shown in Table 2, the perovskite compounds prepared in Preparation Examples 9 to 15 were crystalline ion conductors having an ion conductivity of about $1 \times 10^{-7}$ or more.

Also, electronic conductivities of the perovskite compounds prepared in Preparation Examples 10 to 15 significantly improved compared to that of the perovskite compound prepared in Preparation Example 9.

Evaluation Example 3: XRD Spectrum Evaluation

Figure 5:
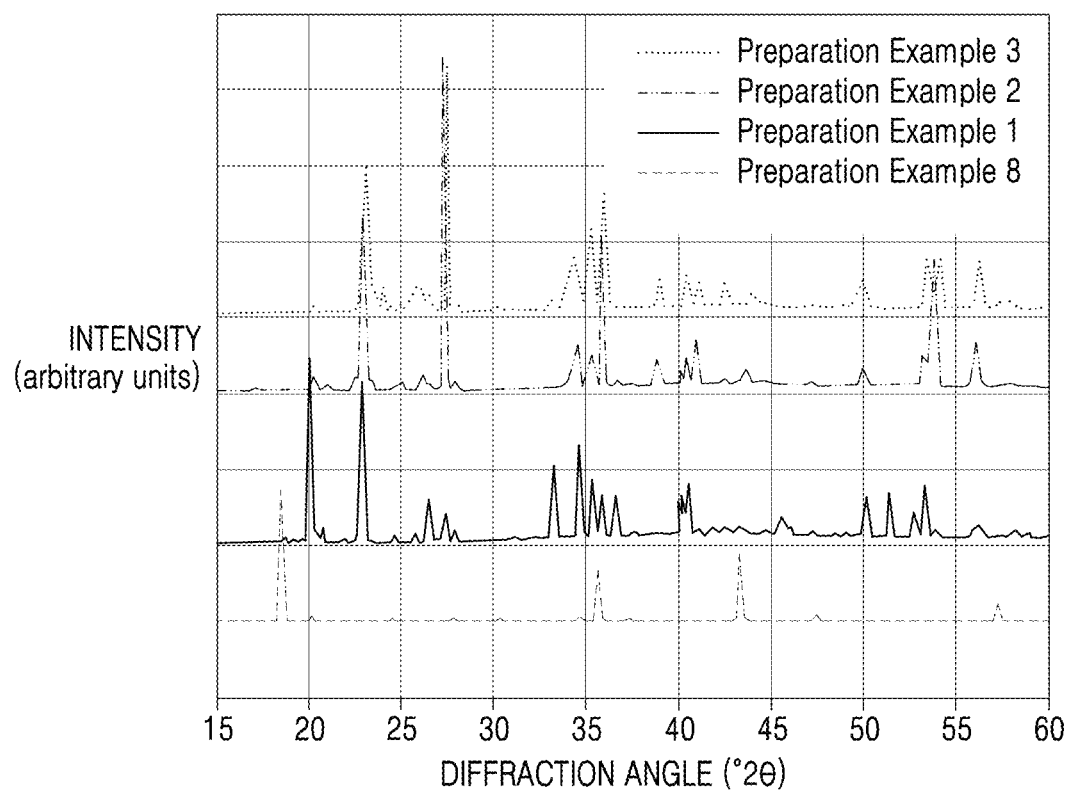
FIG. 5 is a graph of intensity (arbitrary units) versus diffraction angle (°2θ) illustrating the results of X-ray diffraction (XRD) analysis of spinel compounds prepared in Preparation Examples 1 to 3 and 8, measured using Cu Kα radiation.

XRD spectra of the spinel compounds prepared in Preparation Examples 1, 2, 3, and 8 were measured, and the results are shown in FIG. 5. The XRD spectrum measurement was performed using Cu Kα radiation.

As shown in FIG. 5, $Li_4Ti_5O_{12}$ of Preparation Example 8 had a peak corresponding to a spinel crystal structure, and the spinel compounds prepared in Preparation Examples 1 to 3 had spectra similar to that of $Li_4Ti_5O_{12}$ of Preparation Example 8.

Also, as shown in FIG. 5, the spinel compounds of Preparation Examples 1 to 3 had a new peak at a diffraction angle $2\theta=23.5°\pm2.5°$, and an intensity ($I_b$) of the new peak was greater than a peak intensity ($I_a$) with respect to the (111) crystal face.

That is, the spinel compounds of Preparation Examples 1 to 3 had a peak intensity ratio ($I_a/I_b$) of about 1 or less. The peak intensity ratio ($I_a/I_b$) was a peak intensity ($I_a$) of a (111) crystal face at a diffraction angle $2\theta=18°\pm2.5°$ with respect to a peak intensity ($I_b$) at a diffraction angle $2\theta=23.5°\pm2.5°$.

Figure 6:
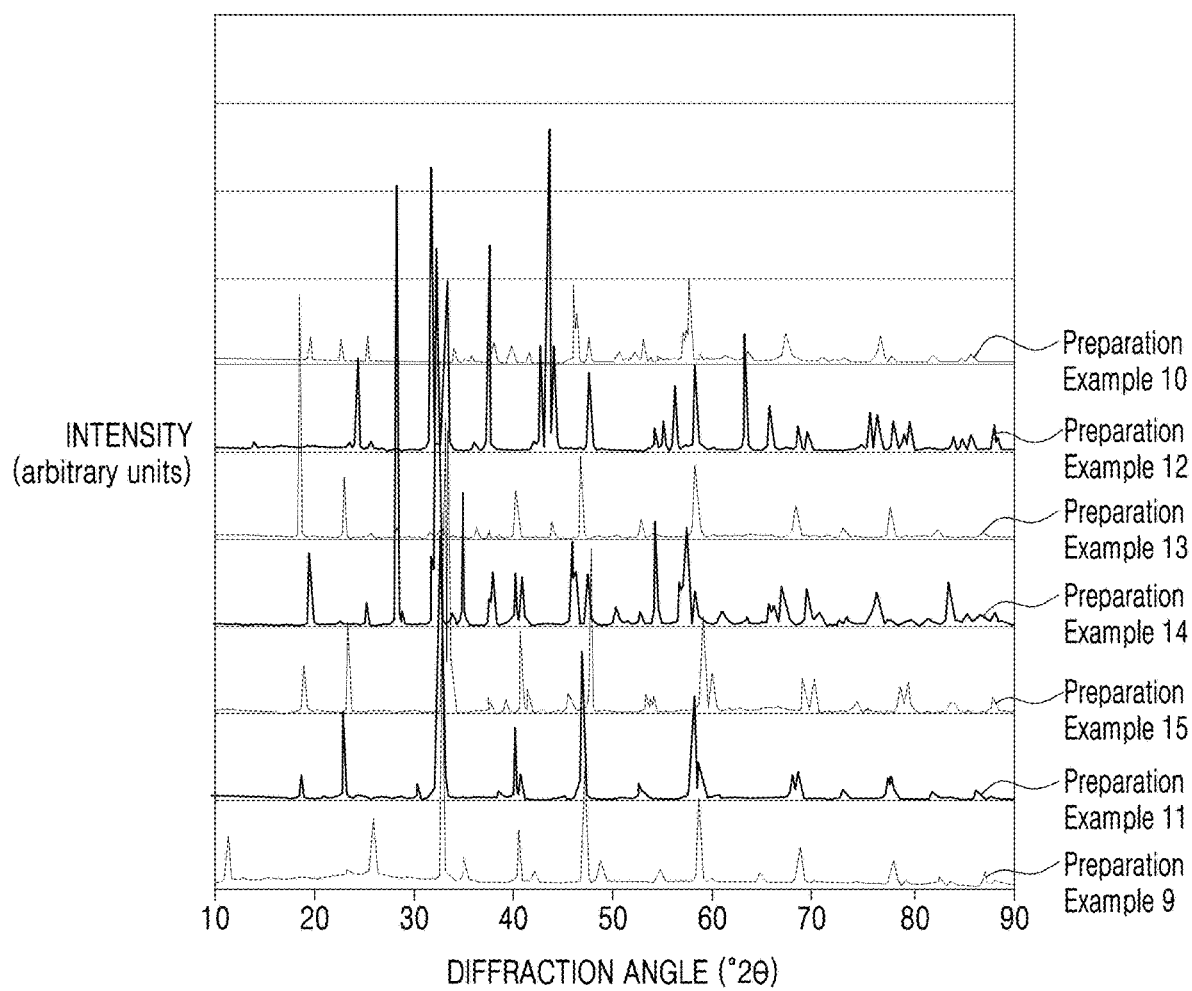
FIG. 6 is a graph of intensity (arbitrary units) versus diffraction angle (°2θ) illustrating the results of XRD analysis of perovskite compounds prepared in Preparation Examples 9 to 15, measured using Cu Kα radiation.

The X-ray diffraction (XRD) spectra of the perovskite compounds prepared in Preparation Examples 9 to 15 were measured, and the results are shown in FIG. 6. The XRD spectrum measurement was performed using Cu Kα radiation.

As shown in FIG. 6, the perovskite compounds prepared in Preparation Examples 9 to 15 had a peak corresponding to a perovskite crystal structure.

In the XRD spectrum, an intensity ratio ($I_b/I_a$) of a peak intensity ($I(46.5°\pm2.5°)=I_b$) at a diffraction angle $2\theta=46.5°\pm2.5°$ to a peak intensity ($I(32.5°\pm2.5°)=I_a$) at a diffraction angle $2\theta=32.5°\pm2.5°$ and an intensity ratio ($I_b/I_a$) of a peak intensity ($I(57.5°\pm2.5°)=I_c$) at a diffraction angle $2\theta=57.5°\pm2.5°$ to a peak intensity ($I(32.5°\pm2.5°)=I_a$) at a diffraction angle $2\theta=32.5°\pm2.5°$ were measured and shown in Table 3.

TABLE 3

| | Composition | Intensity ratio $I_b/I_a$ | Intensity ratio $I_c/I_a$ |
|---|---|---|---|
| Preparation Example 9 | $Li_{0.34}La_{0.55}TiO_3$ | 0.3 | 0.3 |
| Preparation Example 10 | $Li_{0.34}La_{0.55}RuO_3$ | 0.2 | 0.2 |
| Preparation Example 11 | $Li_{0.34}La_{0.55}MnO_3$ | 0.5 | 0.4 |
| Preparation Example 12 | $Li_{0.34}La_{0.55}NiO_3$ | 0.3 | 0.3 |
| Preparation Example 13 | $Li_{0.34}La_{0.55}CrO_3$ | 0.3 | 0.3 |
| Preparation Example 14 | $Li_{0.34}La_{0.55}IrO_3$ | 0.2 | 0.3 |
| Preparation Example 15 | $Li_{0.34}La_{0.55}CoO_3$ | 0.6 | 0.3 |

As shown in FIG. 6, the perovskite compound of Preparation Example 9 had a peak at a diffraction angle 11.3°±0.5°, whereas the perovskite compounds of Preparation Examples 10 to 15 did not have a peak at a diffraction angle 11.3°±0.5°.

Evaluation Example 4: Evaluation of Lithium-Air Battery Life Characteristics

After removing $CO_2$ from the cells by using calcium hydroxide $(Ca(OH)_2)$ at 40° C. and 1 atm in an oxygen atmosphere with 100% relative humidity, the cells were charged and discharged.

One cycle of charge and discharge was performed so that the lithium-air batteries prepared in Example 9 and Comparative Example 4 were each discharged to a voltage of 2.0 V (vs. Li) with a constant current of 0.06 mA/cm², and then charged to a voltage of 4.5 V with the same current (a formation process).

Next, another cycle of charge and discharge was performed so that the lithium-air batteries were discharged to a voltage of 2.0 V (vs. Li) with a constant current of 0.3 mA/cm², and then charged to a voltage of 4.5 V with the same current. During the charge and discharge, the current was cut-off at a charge/discharge capacity of 3 milliampere hours per square centimeter (mAh/cm²).

The lifespan characteristics of the batteries were evaluated based on the number of cycles providing a cut-off discharge capacity of 3 mAh/cm² at a voltage of 2.0 V (vs. Li) or more.

Figure 7:
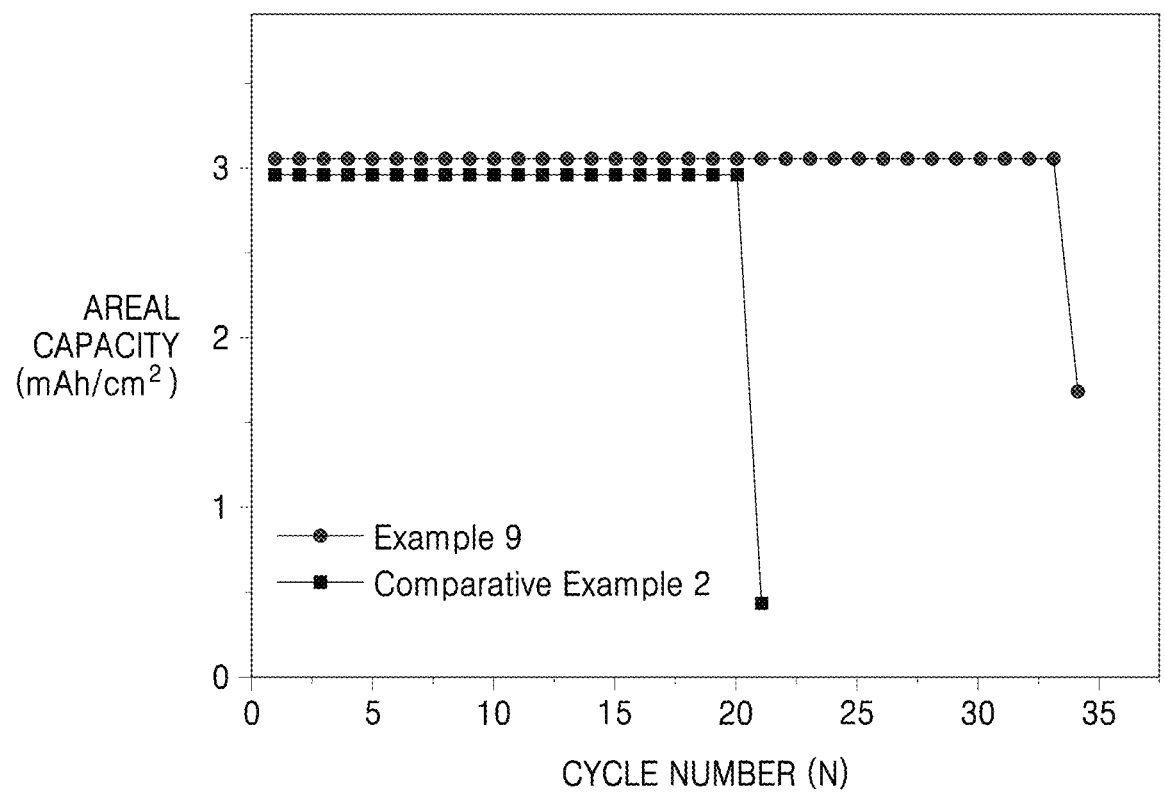
FIG. 7 is a graph of areal capacity (milliampere hours per square centimeter ($mAh/cm^2$)) versus charge/discharge cycle number (N) that illustrates lifespan characteristics of lithium-air batteries prepared in Example 9 and Comparative Example 4.

As shown in FIG. 7, the lifespan characteristics of the lithium-air battery prepared in Example 9 significantly improved as it was 33 cycles compared to 20 cycles of the lifespan characteristics of the lithium-air battery prepared in Comparative Example 2.

Evaluation Example 5: Evaluation of Lithium-Air Battery High-Rate Characteristics After removing $CO_2$ from the cells by using calcium hydroxide $(Ca(OH)_2)$ at 40° C. and 1 atm in an oxygen atmosphere with 100% relative humidity, the cells were charged and discharged.

One cycle of charge and discharge was performed so that the lithium-air battery prepared in Example 9 was discharged to a voltage of 2.0 V (vs. Li) with a constant current of 0.06 mA/cm² (0.02 C), and then charged to a voltage of 4.5 V with the same current (a formation process).

Next, another cycle of charge and discharge was performed so that the lithium-air battery was discharged to a voltage of 2.0 V (vs. Li) with a constant current of 0.3 mA/cm² (0.1 C), and then charged to a voltage of 4.5 V with the same current.

Then, another cycle of charge and discharge was performed so that the lithium-air battery was discharged to a voltage of 2.0 V (vs. Li) with a constant current of 0.6 mA/cm² (0.2 C), and then charged to a voltage of 4.5 V with the same current.

Subsequently, the temperature was changed to 60° C., and another cycle of charge and discharge was performed so that the lithium-air battery was discharged to a voltage of 2.0 V (vs. Li) with a constant current of 1.5 mA/cm² (0.5 C), and then charged to a voltage of 4.5 V with the same current.

During the charge and discharge in each cycle, the current was cut-off at a charge/discharge capacity of 3 mAh/cm².

Figure 8:
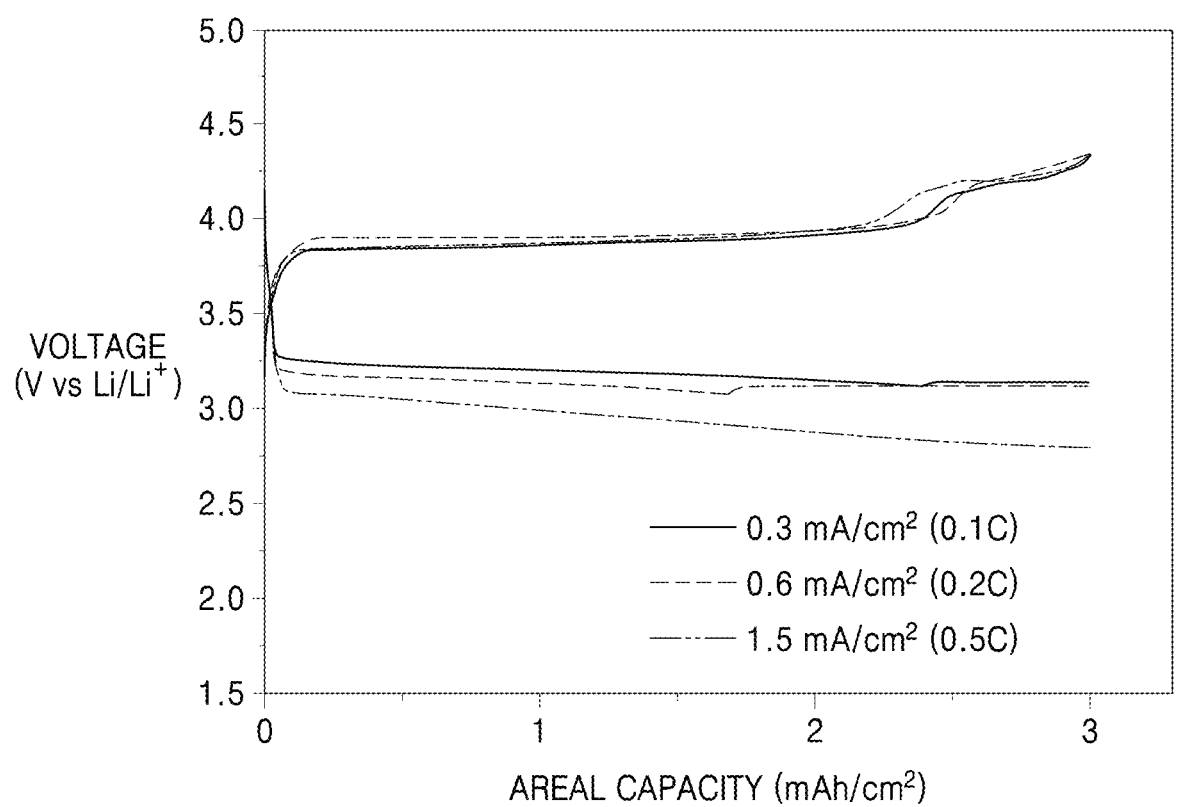
FIG. 8 is a graph of voltage (V vs. $Li/Li^+$) versus areal capacity ($mAh/cm^2$) that illustrates a charge/discharge profile of the lithium-air battery prepared in Example 9.

As shown in FIG. 8, in spite of a current density increase at 0.1 C, 0.2 C, and 0.5 C, a voltage decrease during a discharge process was insignificant at 0.5 V or less.

Thus, it was confirmed that the lithium-air battery of Example 9 had excellent high-rate characteristics.

Although not shown in the drawings, when the lithium-air battery of Comparative Example 4 was discharged at a constant current of 0.3 mA/cm² (0.1 C), a discharge voltage at a discharge capacity of 1.8 mAh/cm² rapidly decreased to 2.0 V (vs. Li). Therefore, it was confirmed that the lithium-air battery of Comparative Example 4 had poor high-rate characteristics.

Evaluation Example 6: Evaluation of Lithium-Air Battery Overvoltage

After removing $CO_2$ from the cells by using calcium hydroxide $(Ca(OH)_2)$ at 40° C. and 1 atm in an oxygen atmosphere with 100% relative humidity, the cells were charged and discharged.

One cycle of charge and discharge was performed so that the lithium-air batteries prepared in Example 10 and Comparative Example 5 were discharged to a voltage of 2.0 V (vs. Li) with a constant current of 0.3 mA/cm², and then charged to a voltage of 4.5 V with the same current. During the charge and discharge, the current was cut-off at a charge/discharge capacity of 3 mAh/cm².

Figure 9:
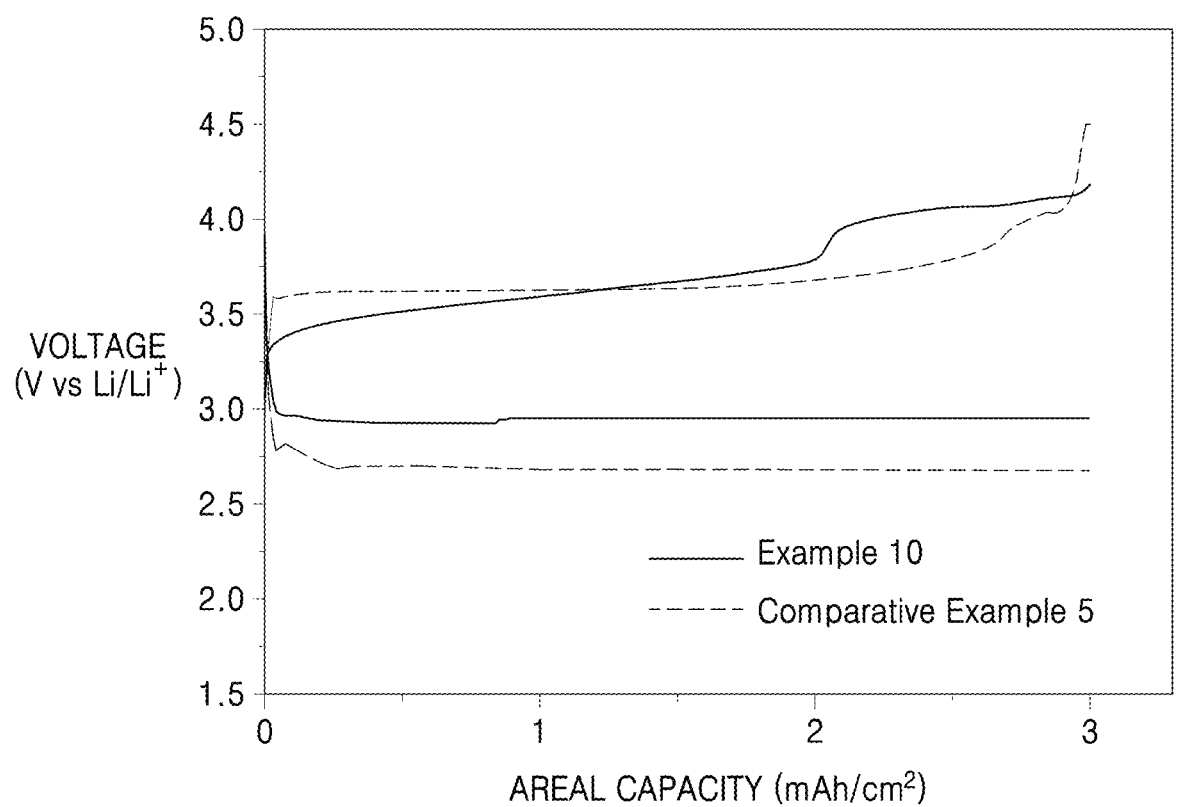
FIG. 9 is a graph of voltage (V vs. $Li/Li^+$) versus areal capacity ($mAh/cm^2$) and illustrates charge/discharge profiles of lithium-air batteries prepared in Example 10 and Comparative Example 5.

As shown in FIG. 9, a difference between a charge voltage and a discharge voltage of the lithium-air battery prepared in Example 10 at cut-off was about 1.6 V, whereas the difference of the lithium-air battery prepared in Comparative Example 5 was about 2.3 V.

In this regard, it was confirmed that a charge/discharge overvoltage of the lithium-air battery of Example 10 decreased as reversibility of production/decomposition reaction of the discharge products improved, compared to that of the lithium-air battery of Comparative Example 2.

Figure 10A:
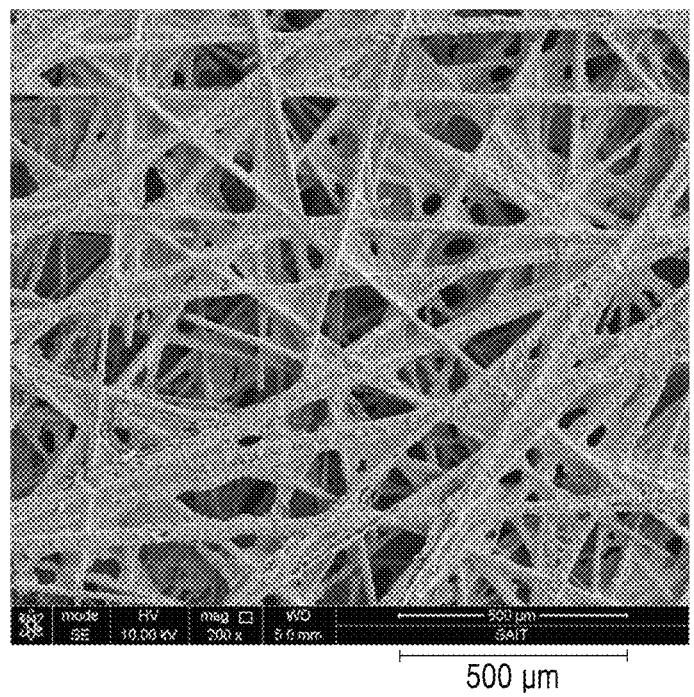
FIG. 10A is an SEM image of a cathode before initial discharge of the lithium-air battery of Example 10.
Figure 10B:
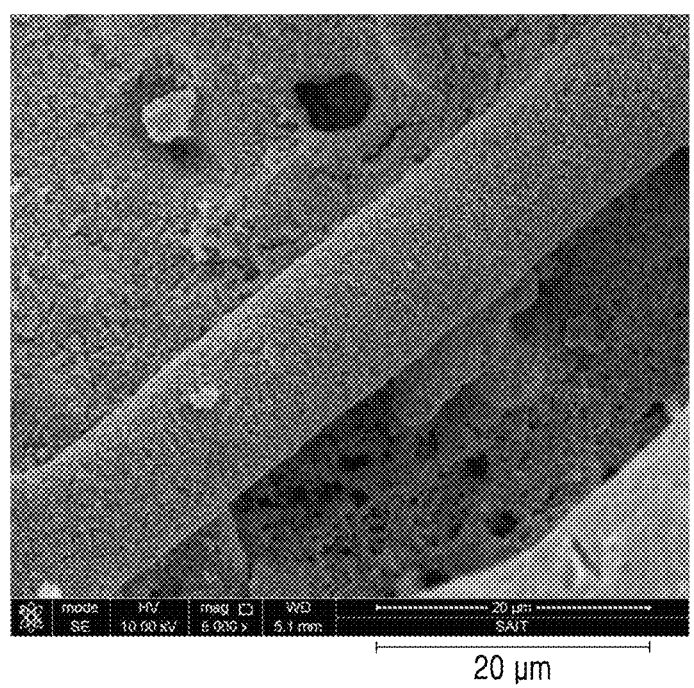
FIG. 10B is an enlarged view of a part of FIG. 10A.

FIG. 10A is an SEM image of a cathode surface having a lithium-containing metal oxide coated on carbon paper used in the lithium-air battery of Example 10 before discharging. FIG. 10B is an enlarged view of a portion of FIG. 10A.

As shown in FIGS. 10A and 10B, it was confirmed that the cathode had a porous framework structure. It was confirmed that the coating layer was disposed along a surface contour of the fibrous framework.

Figure 10C:
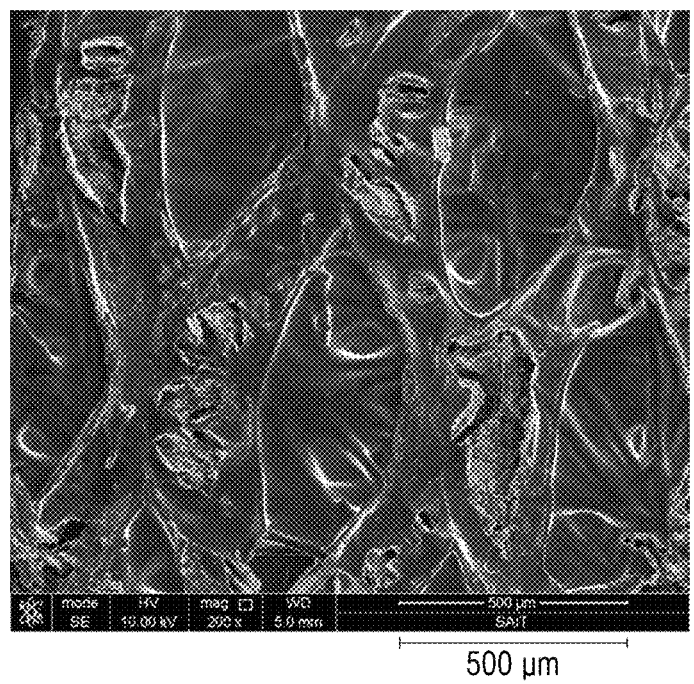
FIG. 10C is an SEM image of a cathode before initial discharge of the lithium-air battery of Example 10.
Figure 10D:
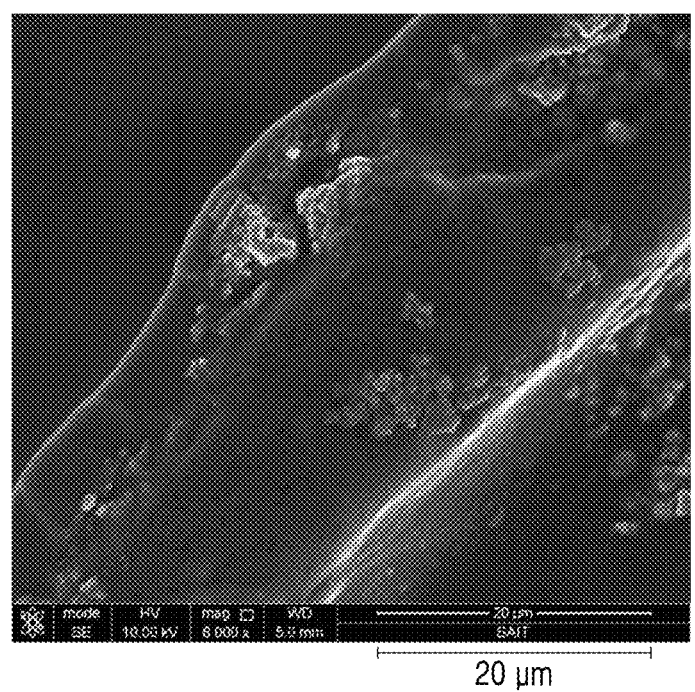
FIG. 10D is an enlarged view of a portion of FIG. 10C.

FIG. 10C is an SEM image of the cathode surface of the lithium-air battery of Example 10 after discharge. FIG. 10D is an enlarged view of a portion of FIG. 10C.

As shown in FIGS. 10C and 10D, it was confirmed that the discharge products were produced in the cathode. It was confirmed that the discharge products were produced on the coating layer disposed along surfaces of the fibrous framework.

Figure 10E:
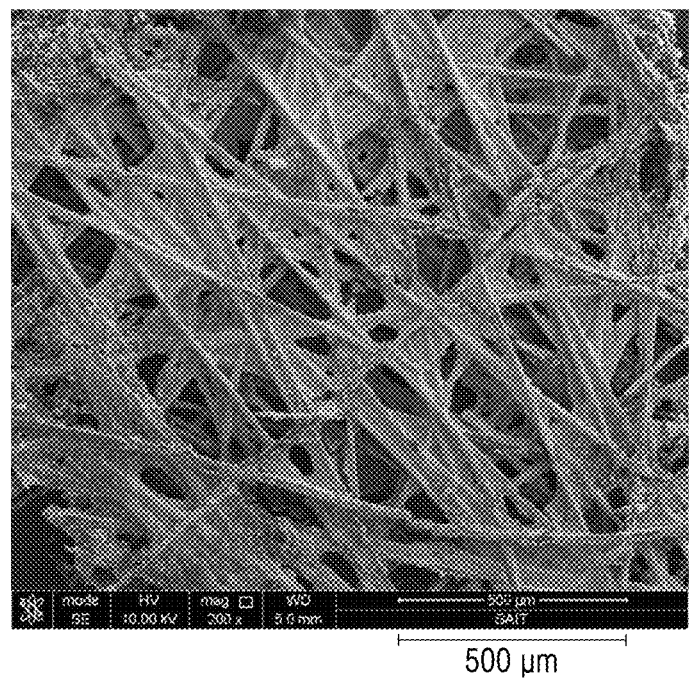
FIG. 10E is an SEM image of a cathode after initial discharge of the lithium-air battery of Example 10.
Figure 10F:
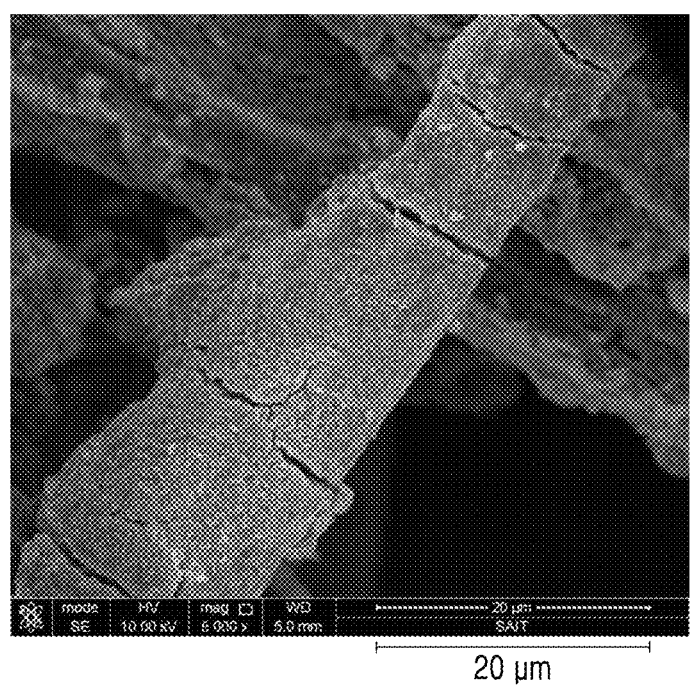
FIG. 10F is an enlarged view of a portion of FIG. 10E.

FIG. 10E is an SEM image of a cathode surface of the lithium-air battery of Example 10 after charge. FIG. 10F is an enlarged view of a portion of FIG. 10E.

As shown in FIGS. 10E and 10F, it was confirmed that the discharge products in the cathode were decomposed and removed. It was confirmed that the coating layer disposed along the surfaces of the fibrous framework was restored to its initial form.

Therefore, it was confirmed that the discharge products were reversibly produced and decomposed during the charge/discharge process.

Evaluation Example 7: Confirmation of Distribution of Discharge Product

After removing $CO_2$ from the cells by using calcium hydroxide $(Ca(OH)_2)$ at 40° C. and 1 atm in an oxygen atmosphere with 100% relative humidity, the cells were discharged.

The lithium-air batteries prepared in Example 9 and Comparative Example 4 were discharged to a voltage of 2.0 V (vs. Li) with a constant current of 3 $mA/cm^2$, and the lithium-air batteries were each disassembled to observe distribution of discharge products produced in the cathode by using a scanning electron microscope.

Figure 11A:
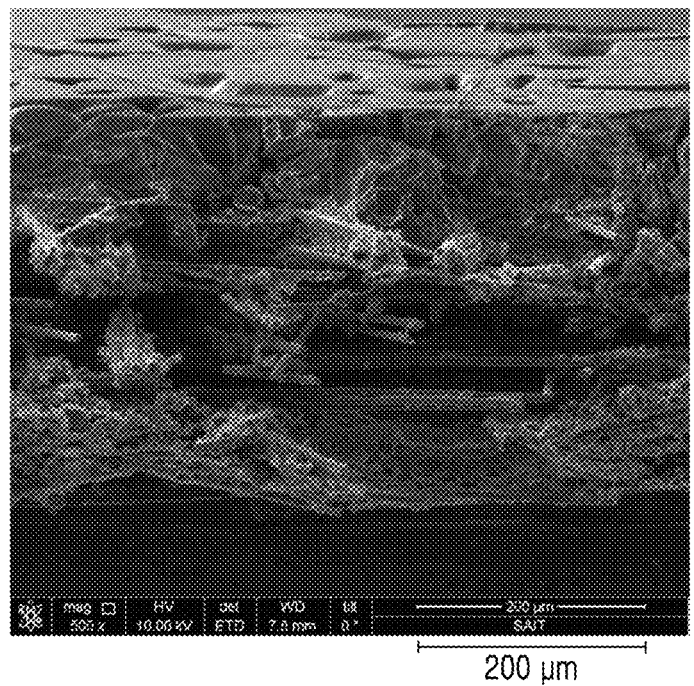
FIG. 11A is an SEM image of a gas diffusion layer (GDL) of the lithium-air battery of Comparative Example 4 after discharging.

FIG. 11A is the GDL separated from the lithium-air battery of Comparative Example 4 flipped upside down. That is, the upper portion of FIG. 11A is a part that contacts the cathode, and the lower portion of FIG. 11A is the GDL.

As shown in FIG. 11A, it was confirmed that the discharge products were produced at a constant thickness on one surface of the GDL contacting the cathode, that is the upper portion of FIG. 11A.

Referring to FIGS. 1A and 1B, discharge reactions mainly occurred at an interface between the cathode and the GDL of the lithium-air battery of Comparative Example 4 since migration of lithium ions to the GDL was limited due to a low porosity of the cathode.

Thus, when the discharge products were irregularly produced at the interface of the cathode and the GDL, change in a volume of the lithium-air battery during discharge was significant.

Figure 11B:
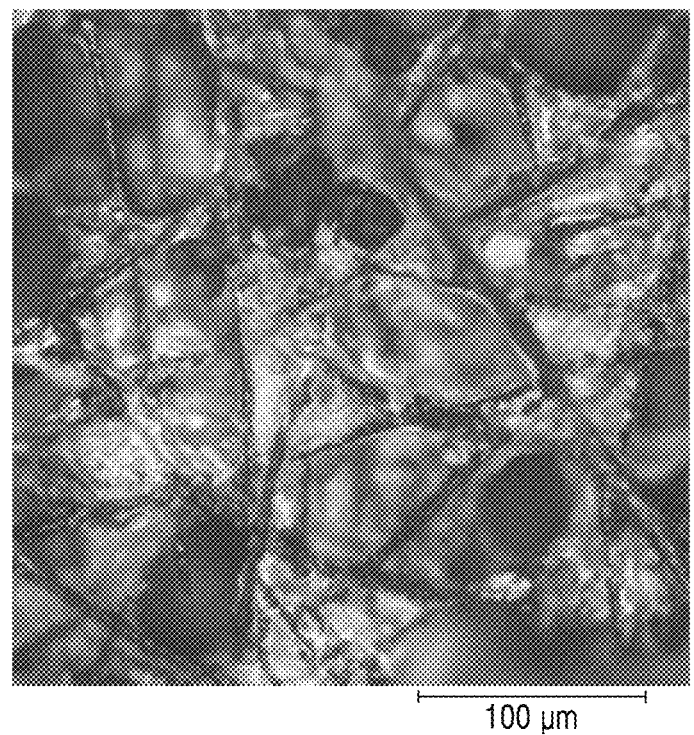
FIG. 11B is an SEM image of a cathode of the lithium-air battery of Example 9 after discharging.

On the other hand, as shown in FIG. 11B, the cathode of the lithium-air battery of Example 9 had the discharge products which were regularly produced throughout the inside of the cathode.

Referring to FIGS. 2A and 2B, the cathode of the lithium-air battery of Example 9 had a high porosity, and thus lithium ions may migrate along the surface of the coating layer.

Also, electrons may migrate through a porous framework substrate included in the cathode, and thus a reaction surface area increases. Therefore, electrode reactions may regularly occur throughout the inside of the cathode.

As a result, volume change of the lithium-air battery during discharging may be minimized due to regular production of the discharge products in the cathode.

As described above, according to one or more embodiments, when a cathode has a coating layer comprising a lithium-containing metal oxide disposed on a porous framework structure, irregular production of discharge products in the cathode may be suppressed, and reversibility of an electrode reaction may improve.

When a lithium-air battery includes the cathode, volume change of the battery may be suppressed, an overvoltage of the battery may decrease, and cycle characteristics of the battery may improve.

It should be understood that embodiments described herein should be considered in a descriptive sense only and not for purposes of limitation. Descriptions of features, aspects, or advantages within each embodiment should be considered as available for other similar features, aspects, or advantages in other embodiments. While one or more embodiments have been described with reference to the figures, it will be understood by those of ordinary skill in the art that various changes in form and details may be made therein without departing from the spirit and scope as defined by the following claims.

What is claimed is:

1. A cathode configured to use oxygen as a cathode active material, the cathode comprising:
   a porous electrically conductive framework substrate; and
   a coating layer disposed on a surface of the porous electrically conductive framework substrate,
   wherein the coating layer comprises at least one of a lithium-containing metal oxide or a composite comprising a lithium-containing metal oxide,
   wherein a porosity of the porous electrically conductive framework substrate is about 70 percent to about 99 percent, based on a total volume of the cathode, and
   wherein an areal resistance of the porous electrically conductive framework substrate is about 0.01 milliohms per square centimeter to about 100 milliohms per square centimeter.

2. The cathode of claim 1, wherein a thickness of the porous electrically conductive framework substrate is in a range of about 1 micrometer to about 500 micrometers.

3. The cathode of claim 1, wherein the porous electrically conductive framework substrate comprises a fibrous framework,
   wherein the fibrous framework comprises a plurality of fibers, and
   wherein an average diameter of a fiber of the fibrous framework is in a range of about 0.1 micrometer to about 10 micrometers.

4. The cathode of claim 1, wherein the porous electrically conductive framework substrate comprises at least one of a carbon, a metal, or a metal oxide,
   wherein the carbon is at least one of a carbon fiber or a carbon tube,
   the metal is at least one of Ni, Cu, Ti, V, Cr, Mn, Fe, Co, Zn, Mo, W, Ag, Au, Ru, Pt, Ir, Al, Sn, Bi, Si, Sb, stainless steel, or an alloy thereof, and
   the metal oxide is an oxide of a metal comprising at least one of Ru, Sb, Ba, Ga, Ge, Hf, In, La, Ma, Se, Si, Ta, Se, Ti, V, Y, Zn, or Zr.

5. The cathode of claim 1, wherein the porous electrically conductive framework substrate is at least one of a carbon paper, a carbon woven fabric, a carbon non-woven fabric, a carbon mesh, a carbon foam, a metal mesh, or a metal foam.

6. The cathode of claim 3, wherein a thickness of the coating layer is in a range of about 50 nanometers to about 3 micrometers,
   wherein the thickness of the coating layer is about 30% or less of an average diameter of the fiber of the fibrous framework.

7. The cathode of claim 1, wherein a size of the lithium-containing metal oxide in the coating layer is in a range of about 10 nanometers to about 500 nanometers, wherein a loading level of the coating layer is in a range of about 0.1 milligrams per square centimeter to about 50 milligrams per square centimeter, and
a porosity of the cathode is about 70% or more.

8. The cathode of claim 1, wherein the lithium-containing metal oxide is at least one of a crystalline lithium-ion conductor, a crystalline electron conductor, or a mixed conductor.

9. The cathode of claim 1, wherein the lithium-containing metal oxide, has an electronic conductivity of equal to or greater than about $1 \times 10^{-6}$ Siemens per centimeter and an ion conductivity of equal to or greater than about $2 \times 10^{-7}$ Siemens per centimeter, at a temperature of 25° C.

10. The cathode of claim 1, wherein the lithium-containing metal oxide comprises at least one of a perovskite compound or a spinel compound.

11. The cathode of claim 1, wherein the lithium-containing metal oxide comprises a perovskite compound represented by Formula 1:

$$Li_xA_yG_zO_{3-\delta} \quad \text{Formula 1}$$

wherein, in Formula 1,
A and G are each independently at least one of a Group 2 to Group 16 element; and
$0<x<1$, $0<y<1$, $0<(x+y)\leq1$, $0<z\leq1.5$, and $0\leq\delta\leq1.5$.

12. The cathode of claim 11, wherein A is at least one of H, Na, K, Rb, Cs, Ca, Sr, Ba, Y, La, Ce, Pr, Nd, Pm, Sm, Gd, Tb, Dy, Ho, or Er;
G is at least one of Ti, Pd, Pb, Fe, Ir, Co, Rh, Mn, Cr, Ru, Re, Sn, V, Ge, W, Zr, Ti, Mo, Hf, U, Nb, Th, Ta, Bi, Li, H, Na, K, Rb, Cs, Ca, Sr, Ba, Y, La, Ce, Pr, Nd, Pm, Sm, Gd, Tb, Dy, Ho, Er, Mg, Al, Si, Sc, Zn, Ga, Rb, Ag, Cd, In, Sb, Pt, Au, or Pb; and
$0.2<x\leq0.7$, $0<y\leq0.7$, $0<(x+y)<1$, $0<z\leq1.2$, and $0\leq\delta\leq1.2$.

13. The cathode of claim 1, wherein the lithium-containing metal oxide comprises a spinel compound represented by at least one of Formula 2 or Formula 3:

$$Li_{1\pm x}M_{2\pm y}O_{4-\delta 1}, \quad \text{Formula 2}$$

$$Li_{4\pm a}M_{5\pm b}O_{12-\delta 2} \quad \text{Formula 3}$$

wherein, in Formulae 2 and 3,
M is each independently at least one of a Group 2 to Group 16 element; and
$0<x<1$, $0<y<1$, $0\leq\delta1\leq1$, $0<a<2$, $0.3<b<5$, and $0\leq\delta2\leq3$.

14. The cathode of claim 13, wherein
M is at least one of Ni, Pd, Pb, Fe, Ir, Co, Rh, Mn, Cr, Ru, Re, Sn, V, Ge, W, Zr, Ti, Mo, Hf, U, Nb, Th, Ta, Bi, Li, H, Na, K, Rb, Cs, Ca, Sr, Ba, Y, La, Ce, Pr, Nd, Pm, Sm, Gd, Tb, Dy, Ho, Er, Mg, Al, Si, Sc, Zn, Ga, Rb, Ag, Cd, In, Sb, Pt, Au, or Pb; and
$0<x<1$, $0<y<1$, $0\leq\delta1\leq1$, $0<a<2$, $0.3<b<5$, and $0\leq\delta2\leq3$.

15. The cathode of claim 13, wherein the spinel compound is represented by Formula 4:

$$Li_{4\pm a}Ti_{5-b}M'_cO_{12-\delta} \quad \text{Formula 4}$$

wherein, in Formula 4,
M' is at least one of Cr, Mg, Ca, Sr, Sc, Y, La, Ce, Pr, Nd, Sm, Eu, Gd, Tb, Dy, Ho, Er, Tm, Yb, Lu, Zr, Hf, V, Nb, Ta, Mo, W, Mn, Tc, Re, Fe, Ru, Os, Co, Rh, Ir, Ni, Pd, Pt, Cu, Ag, Au, Zn, Cd, Hg, Al, Ga, In, Tl, Ge, Sn, Pb, Sb, Bi, Po, As, Se, or Te; and
$0.3<a<2$, $0.3<b<2$, $0.3<c<2$, and $0\leq\delta\leq3$.

16. The cathode of claim 1, wherein the lithium-containing metal oxide comprises at least one of a layered compound, a garnet compound, a NASICON compound, a LISICON compound, a phosphate compound, a tavorite compound, a triplite compound, an anti-perovskite compound, a silicate compound, or a borate compound.

17. The cathode of claim 1, wherein the lithium-containing metal oxide comprises at least one of a layered compound represented by Formula 5, a NASICON compound represented by Formula 6, a LISICON compound represented by Formula 7, a garnet compound represented by Formula 8, a phosphate compound represented by at least one of Formulae 9 or 10, a tavorite compound or a triplite compound represented by Formula 11, an anti-perovskite compound represented by Formula 12, a silicate compound represented by Formula 13, or a borate compound represented by Formula 14:

$$Li_{1\pm x}M_{1\pm y}O_{2\pm\delta} \quad \text{Formula 5}$$

wherein, in Formula 5,
M is at least one of a Group 2 to Group 16 element; and
$0<x<0.5$, $0<y<1$, and $0\leq\delta\leq1$, $$Li_{1+x}A_xM_{2-x}(XO_4)_3 \quad \text{Formula 6}$$

wherein, in Formula 6,
A and M are each independently at least one of a Group 2 to Group 16 element;
X is As, P, Mo, or S; and
$0<x<1.0$, $$Li_{8-c}A_aB'_bO_4 \quad \text{Formula 7}$$

wherein, in Formula 7,
A and B' are each independently at least one of a Group 2 to Group 16 element;
$c=ma+nb$, wherein m is an oxidation number of A, and n is an oxidation number of B'; and
$0<x<8$, $0<a\leq1$, and $0\leq b\leq 1$, $$Li_xA_3B'_2O_{12} \quad \text{Formula 8}$$

wherein, in Formula 8,
A and B' are each independently at least one of a Group 2 to Group 16 element; and
$3.0\leq x\leq7.0$, $$Li_{1\pm x}MPO_4 \quad \text{Formula 9}$$

$$Li_2MP_2O_7 \quad \text{Formula 10}$$

wherein, in Formulae 9 and 10,
M is each independently at least one of a Group 2 to Group 16 element; and
$0\leq x\leq1.0$ $$Li_{1\pm x}M(TO_4)X \quad \text{Formula 11}$$

wherein, in Formula 11,
M is at least one of a Group 2 to Group 16 element;
T is P or S,
X is F, O, or OH; and $$Li_xM_yOA \quad \text{Formula 12}$$

wherein, in Formula 12,
M is at least one of a Group 2 to Group 16 element;
A is F, Cl, Br, I, S, Se, or Te; and
$2.0\leq x\leq3.0$ and $0\leq y\leq1.0$, $$Li_{2\pm x}MSiO_4 \quad \text{Formula 13}$$

wherein, in Formula 13,
M is at least one of a Group 2 to Group 16 element; and
$0\leq x\leq1.0$, $$Li_{1\pm x}MBO_3 \quad \text{Formula 14}$$

wherein, in Formula 14,
M is at least one of a Group 2 to Group 16 element; and
$0 \leq x \leq 1.0$.

18. A lithium-air battery comprising:
the cathode of claim 1;
an anode comprising lithium; and
an electrolyte disposed between the cathode and the anode.

19. The lithium-air battery of claim 18, wherein the electrolyte comprises a solid electrolyte,
wherein the solid electrolyte is a compound having a crystalline structure or a composition different from that of the lithium-containing metal oxide.

20. A method of preparing a cathode, the method comprising:
providing a suspension comprising a lithium-containing metal oxide particle; and
electrophoretically depositing the lithium-containing metal oxide particle on a porous electrically conductive framework substrate to prepare the cathode,
wherein an areal resistance of the porous electrically conductive framework substrate is about 0.01 milliohms per square centimeter to about 100 milliohms per square centimeter.

21. A cathode configured to use oxygen as a cathode active material, the cathode comprising:
a porous electrically conductive framework substrate; and
a coating layer disposed on a surface of the porous electrically conductive framework substrate,
wherein the coating layer comprises at least one of a perovskite compound represented by Formula 1, a spinel compound represented by Formula 2, or a spinel compound represented by Formula 3:

$$Li_xA_yG_zO_{3-\delta} \qquad \text{Formula 1}$$

wherein, in Formula 1,
A and G are each independently at least one of a Group 2 to Group 16 element; and
$0<x<1$, $0<y<1$, $0<(x+y)\leq 1$, $0<z\leq 1.5$, and $0\leq\delta\leq 1.5$, $$Li_{1\pm x}M_{2\pm y}O_{4-\delta 1} \qquad \text{Formula 2}$$

$$Li_{4\pm a}M_{5\pm b}O_{12-\delta 2} \qquad \text{Formula 3}$$

wherein, in Formulae 2 and 3,
each M is independently selected and is at least one of a Group 2 to Group 16 element; and
$0<x<1$, $0<y<1$, $0\leq\delta 1\leq 1$, $0<a<2$, $0.3<b<5$, and $0\leq\delta 2\leq 3$.

* * * * *